United States Patent [19]

Berry et al.

[11] 4,387,365
[45] Jun. 7, 1983

[54] REAL TIME DIGITAL SCAN CONVERTER

[75] Inventors: Raymond J. Berry, Bellevue; Ken R. Linkhart; Edward J. Parker, both of Seattle, all of Wash.

[73] Assignee: Advanced Technology Laboratories, Inc., Bellevue, Wash.

[21] Appl. No.: 264,108

[22] Filed: May 15, 1981

[51] Int. Cl.³ .............................................. H03K 13/24
[52] U.S. Cl. ............................... 340/347 DD; 358/140; 364/731; 343/5 SC
[58] Field of Search ............. 340/347 DD; 343/5 SC, 343/5 DP, 6 TV; 364/731, 456; 358/140

[56] References Cited

U.S. PATENT DOCUMENTS

| | | | |
|---|---|---|---|
| 4,002,827 | 1/1977 | Nevin | 358/140 |
| 4,149,252 | 4/1979 | Miller | 364/456 |
| 4,214,269 | 7/1980 | Parker | 358/140 |
| 4,245,250 | 1/1981 | Tiemann | 358/140 |
| 4,275,415 | 6/1981 | Engle | 358/140 |
| 4,310,907 | 1/1982 | Tachita | 358/140 |

Primary Examiner—C. D. Miller
Attorney, Agent, or Firm—Christensen, O'Connor, Johnson & Kindness

[57] ABSTRACT

A digital scan converter is disclosed wherein signal information supplied by a sector scanning surveillance system relative to a polar coordinate system is converted to a signal for driving a television-type display or other Cartesian coordinate device by: (a) sampling the signal associated with each consecutive scanning path of the surveillance system at a rate determined by the azimuthal angle that defines the scanning path of interest; (b) storing each set of signal samples as a column of data in a rectangular memory array; (c) accessing the stored data on a row-by-row basis; and (d) utilizing a previously determined mapping strategy to cause each accessed signal sample to form a segment of a line of display within the Cartesian-formulated display devices so that the length of the segment formed by each signal sample is determined by the row and column address of the storage location that is associated therewith when forming a television compatible signal, each signal sample dictates video signal level during a portion of a corresponding horizontal sweep period that is determined by the mapping strategy.

14 Claims, 21 Drawing Figures

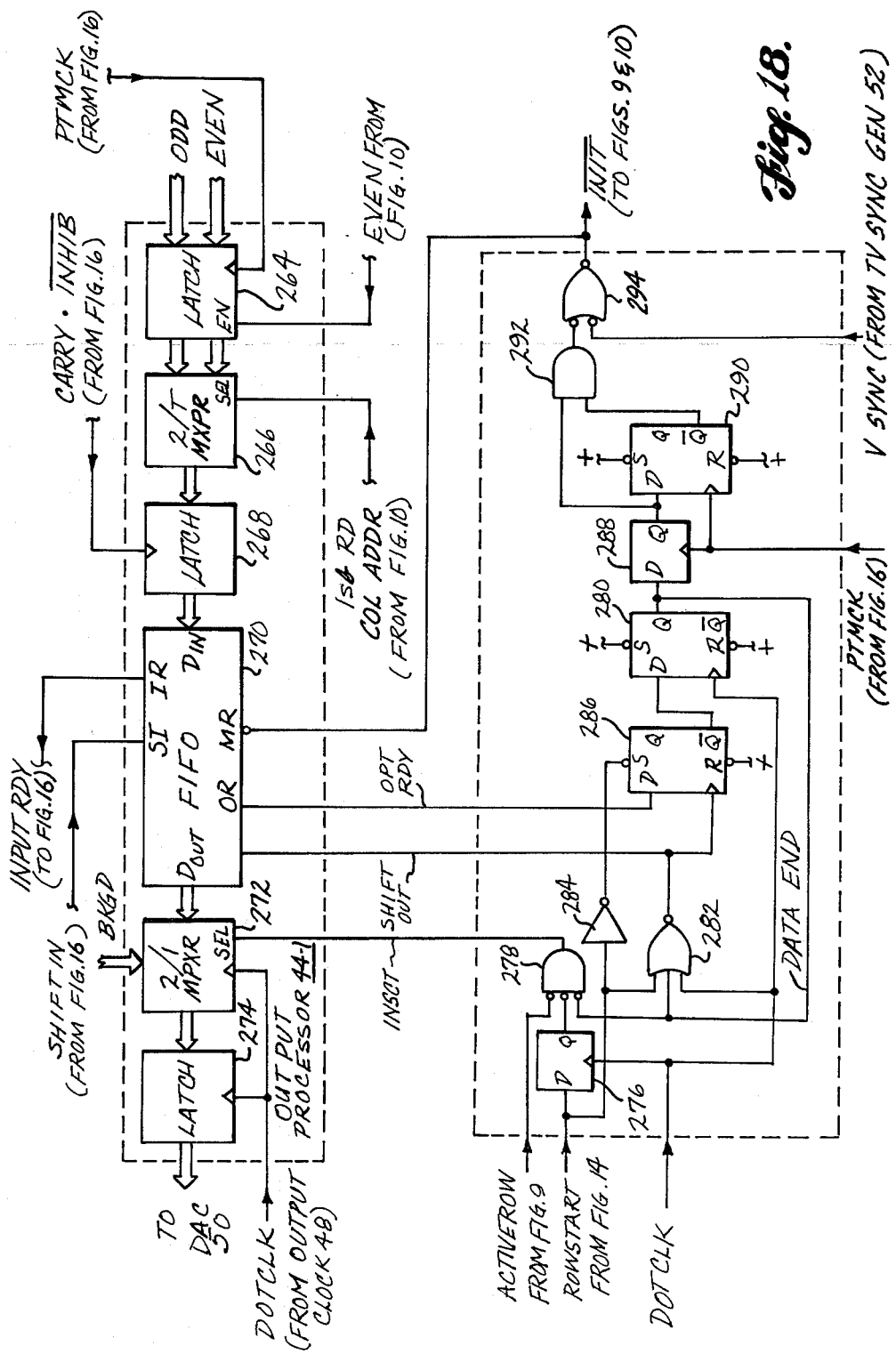

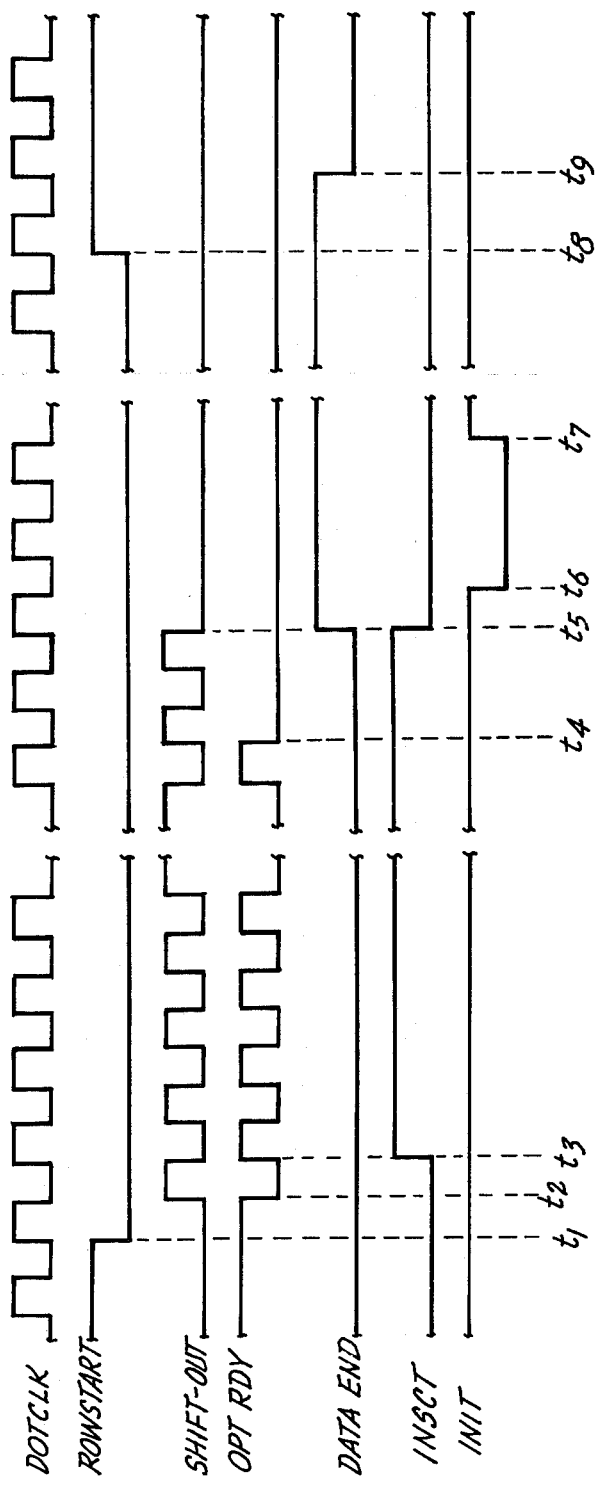

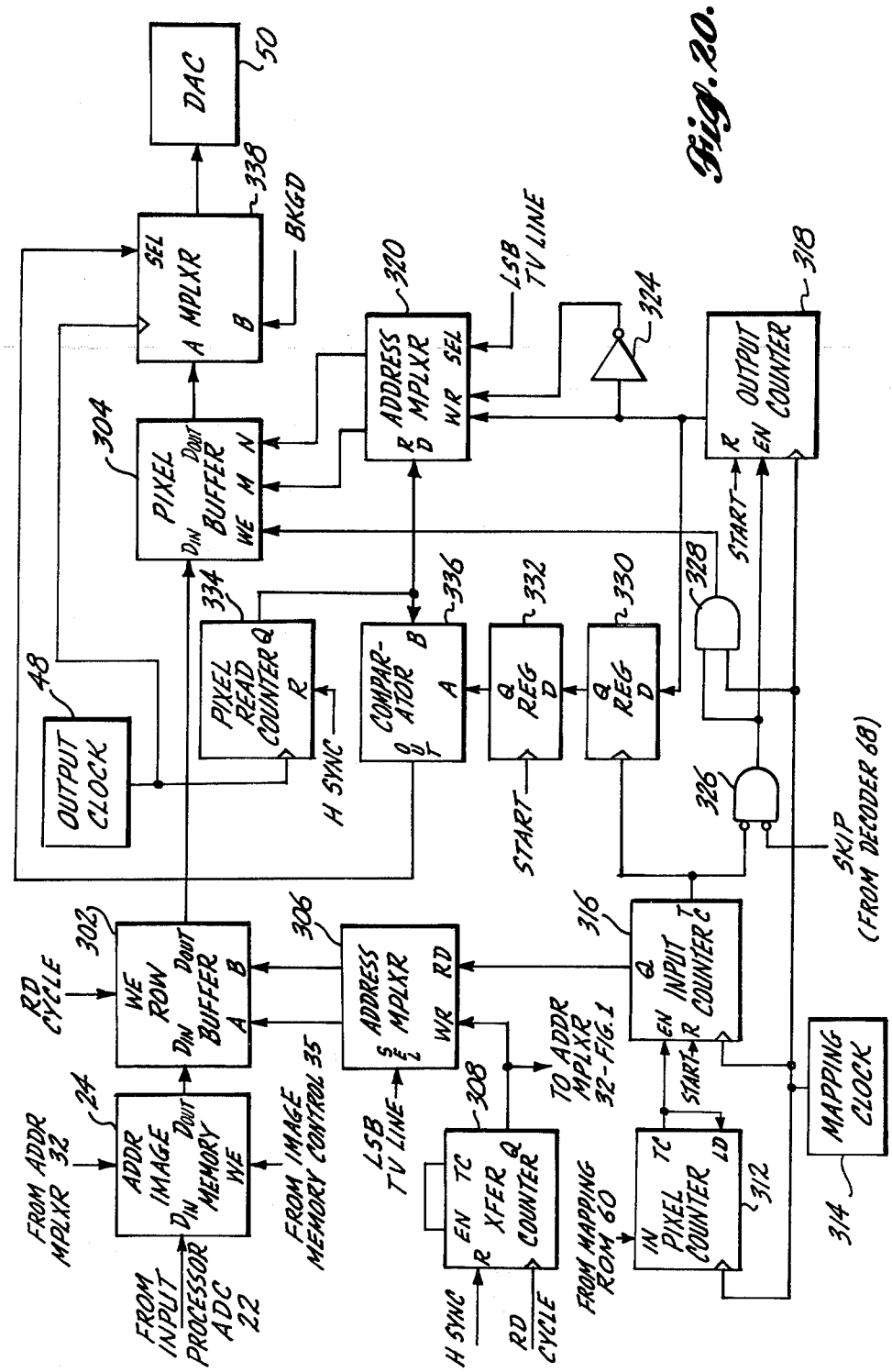

REAL TIME DIGITAL SCAN CONVERTER

BACKGROUND OF THE INVENTION

This invention relates to digital scan converters of the type that convert analog signal information that is referenced to a polar coordinate system into signals for activating a display device that operates in a Cartesian coordinate format. More specifically, this invention relates to improvements in the type of digital scan converters which effect polar-to-Cartesian coordinate conversion by a signal processing technique wherein: (a) a first portion of the conversion process transforms analog image information that is a function of polar coordinate vectors (r and $\theta$) into a set of stored digital signals that are functions of one polar coordinate vector and one Cartesian coordinate vector (e.g., each stored signal is a function of $\theta$ and y); and (b) the final portion of the conversion process is effected as the stored digital signals are read from the system memory and converted to a signal that is compatible with a conventional raster scan television system or another type of Cartesian format display device.

As is known in the art, various surveillance apparatus such as slow scan radar, ultrasonic imaging and sonar systems scan a sectorial region of an object or the surrounding environment by emitting a series of energy pulses which propagate outwardly along angularly spaced apart, radially directed paths and by detecting return or echo signals that occur when the emitted pulses are scattered by reflective structure that lies within the propagation paths. Since the time that elapses between the emission of a particular energy pulse and the associated return signal (or any portion thereof) is related to the distance between the structure causing the signal reflection and the source of the energy, a return signal can be processed to provide a two dimensional, visual representation of the scanned region. In this respect and regardless of the transmission techniques employed, the operation of such surveillance systems is equivalent to the rotation of the single-element transducer through a total scanning angle by repeatedly moving the transducer through small, incremental, angular steps while emitting a pulse of energy and receiving the associated return signal at each angular position of the transducer. Thus, the signals provided by sector scanning surveillance systems are inherently based on a polar coordinate system wherein the emitted energy can be mathematically modeled as originating at a point source that is located at the origin of the polar coordinate system; the value of the angular or azimuthal coordinte, $\theta$, expresses the direction of an emitted energy pulse and the associated return signal; and the value of the radial coordinate, r, expresses the radial distance between the transducer and the structure causing the reflective energy scattering.

Although the image data of sector scanning surveillance systems is gathered or collected in polar format, the operation of most modern display devices is based on a Cartesian coordinate system in which the image being displayed is generated by rapidly and successively producing small incremental regions of illumination on the face of a cathode ray tube or a mosaic of electroilluminescent elements while modulating the intensity of the illumination in accordance with the amplitude vs. time characteristics of the surveillance system return signals. In this respect, in order to provide high image resolution, the incremental elements of such display devices must be relatively small and must be successively energized at a relatively high rate in order to update or refresh the visual display at a rate which provides "flicker free" viewing. The rate at which return signals are provided by a surveillance system may, of course, differ substantially from the rates at which flicker free visual displays can be produced and, in many situations, the display rate may be fixed by convention or by design constraints. For example, in accordance with the convention utilized in the United States and various other countries, the electron beam of a television display is swept horizontally across the face of the television screen at a rate of 15,750 traces per second while being swept from the top to the bottom of the screen at a 60 Hz rate. Therefore, each image frame is comprised of 525 horizontal traces with the electron bean travelling across the screen in approximately 55 microseconds and retracing to the original vertical border of the screen in approximately 8 microseconds. With reference to vertical displacement, the horizontal traces are interlaced with one another by effecting one half of the horizontal traces during one period of the 60 Hz vertical scanning rate and effecting the remaining sweeps in spatial alternation with the previously generated horizontal sweeps during the next period of the 60 Hz vertical scanning rate. Thus, the image being displayed by this type of television system is completely updated or refreshed at a rate of approximately 30 Hz.

Various digital scan converters have been proposed for accepting data at the rate at which it is made available by a surveillance system or other source that, in effect, operates with reference to a polar coordinate system and providing the data at a different rate while simultaneously facilitating display with a device that operates in a Cartesian coordinate system. Basically, such prior art digital scan converters sample each surveillance system reflection signal at a predetermined rate to provide a set of digitally encoded signals (digital words) that represent the amount of reflection occurring from spaced apart locations along the radially extending scanning path that was traversed by both the transmitted energy pulse and the associated return signal. Since, as was previously noted, sector scanning surveillance systems sequentially emit pulses along a plurality of angularly oriented scanning paths in order to provide a two-dimensional surveillance region of sectorial geometry, one complete scanning sequence produces a plurality of sets of digital words wherein each set of digital words represents reflections occurring along a particular scanning path and successive sets of digital words occur at the pulse repetition rate of the surveillance system. The sets of digital words are then stored in a memory device such as a random access memory (RAM) in a format which identifies each digital word with a corresponding spatial position within the scanned region. The stored digital words are then read from the system memory device at a rate compatible with the display apparatus of interest and are typically converted to a television-compatible analog signal or a signal suitable for use with other Cartesian coordinate display apparatus.

In the type of prior art scan converter that is most relevant to this invention, each reflection signal is digitized (sampled) at a rate proportional to the cosine of the azimuthal angle that defines the associated scanning path relative to a $\theta=0$ axis that bisects the sectorial region imaged by the surveillance system. This causes the successive digital words produced for each scanning path to represent reflection occurring from small spatial regions that are formed or defined by the intersection of the current scanning path and a set of parallel, spaced apart traces that are perpendicular to the $\theta=0$ axis. Thus, if the $\theta=0$ axis of the polar system exhibits a constant x coordinate in Cartesian space, it can be recognized that digitizing the successive surveillance system reflection signals in this manner provides a collection of digital signals wherein each signal represents reflection occurring at a location most easily defined in terms of the $\theta$ coordinate value of the original polar format and the y coordinate value of the desired Cartesian format.

The prior art includes various proposals for completing the polar-to-Cartesian coordinate conversion in scan converters of the above-described type, i.e., for converting the signal stored in memory on the basis of a $\theta$ and y coordinate to a signal associated with an x and y location. For example, U.S. Pat. No. 4,002,827, issued to Nevin, utilizes a random access memory (RAM) that can be considered to be a rectangular array that bears a one-to-one correspondence with rectangular or square spatial elements formed on the face of a display device such as a cathode-ray tube. As each digitized sample of a particular return signal is being derived in the above-indicated manner, the x coordinate associated therewith is calculated by determining the radial coordinate of the digital sample and multiplying that value by the sine of the azimuthal angle that defines the current scanning path. This signal is then utilized to determine the x address (column address) of the RAM storage location which receives the digital image information and the successive digital words associated with each return signal are supplied to RAM storage locations of successively increasing y addresses (row addresses). Since each row of the rectangular memory array can be associated with one complete horizontal line of the Cartesian display format, an analog signal compatible with conventional black and white television systems can be formed in the type of system proposed by the Nevin patent by successively reading the stored data on a row-by-row basis with each row of data being clocked to a digital-to-analog converter (DAC) at a constant rate that is dictated by the horizontal sweep rate of the television system.

One of the primary disadvantages and drawbacks of a system such as the type disclosed in the Nevin patent is that an extremely large memory is required in order to represent each small incremental region of the face of a television set or other Cartesian format display device. For example, in one embodiment of the Nevin scan converter for displaying a sectorial surveillance region on a television screen, the display region of the television screen is considered to comprise 512 horizontal traces consisting of 512 spaced apart "dots" so that the display is, in effect, an array containing 262,144 incremental regions. Thus, if the sampling technique utilized to digitize the surveillance system reflection signals results in four-bit digital words, a RAM having a 1-megabit storage capability is required even though relatively few of the storage locations will actually hold signal information. In particular, in displaying a sectorial surveillance region on the substantially rectangular face of a television screen, a major portion of the screen area will be outside of the display sector and hence the RAM storage locations corresponding to this region of the television screen are not utilized to store image information but are necessary so that the system DAC will supply an analog signal having the proper amplitude versus time characteristics when the stored data is read from memory at a constant clock rate.

Other prior art polar format to Cartesian format scan converters of the type being discussed overcome the requirement for an extremely large memory size that is encountered in the system proposed by Nevin by controlling the manner in which data is read from the RAM, both as to the time intervals in which data is read and as to the rate at which data is read. More specifically, U.S. Pat. No. 4,214,269 issued to Parker et al., and assigned to the assignee of this invention, and U.S. Pat. No. 4,245,250, issued to Tiemann, each discloses digital scan converter arrangements wherein the image memory is equivalent to a rectangular array of storage locations with the number of columns equal to the number of surveillance system scanning paths and the number of rows equal to the number of horizontal television traces that are to include image information (i.e., the number of television lines required to establish the vertical dimension of the display sector). To properly display the stored information, each row of stored image information is loaded into a buffer memory and sequentially clocked therefrom under the control of a conventional television horizontal sync system so that data is provided to the system DAC at a rate that varies inversely with the y coordinate that is associated with that particular row of data (i.e., data is clocked to the DAC at a rate that is inversely proportional to the width of the sectorial surveillance pattern at that particular position within the surveillance pattern so that image information associated with display traces near the apex of the display sector are read at a faster rate than image information associated with subsequent display traces. In addition, the systems disclosed in the Parker et al. and Tiemann patents include means for controlling the time at which data is read from the buffer memory so that the portions of the analog signal provided by the DAC which represent image information begin at the boundary edge of the sectorial display pattern. This requires that the first clock pulse that controls the transfer of data from buffer storage to and through the system DAC must be delayed relative to the television system horizontal sync signal by an amount of time that is a function of the y coordinate of the image being fromed and displayed.

Although the arrangements disclosed by the Parker et al. and the Tiemann patents greatly reduce the system storage requirements in that the RAM for storing the image information need only exhibit n columns of storage locations and m rows of storage locations, where the surveillance system employs n scanning paths and m rows (e.g., TV lines) contain image, other disadvantages and drawbacks are encountered. For example, in order to provide image information that is associated with locations that are equally spaced apart from one another relative to the x coordinate of the Cartesian display format, the system proposed in the Tiemann reference is limited to the use of scanning paths that are oriented so that the difference between the tangents of the azimuthal angles that define adjacent scanning paths remains constant throughout the entire surveillance region.

The system disclosed in the Parker et al. patent is not subject to the limitation associated with the system proposed by Tiemann since it includes an arrangement for modulating the pulse repetition rate of the signal which clocks data from the output buffer memory into the DAC at a rate which is a function of the column location of the data entry being read. In particular, in the system of the Parker et al. patent, the rate at which data is read from the output buffer memory not only varies on a row-by-row basis relative to the storage locations of the RAM but also is varied while reading a particular row of information so that the rate increases as successive column entries are read until the data entry being read corresponds to the $\theta=0$ axis of the surveillance system and then decreases in a like manner until the last data entry is read.

Although the arrangement disclosed in the Parker et al. patent thus overcomes numerous prior art problems, certain areas remain open for improvement. For example, in order to generate the signals that cause data to be read from the output buffer memory at the proper time and at the proper rate, the Parker et al. arrangement includes analog circuitry which generates ramp signals that are respectively synchronized to the horizontal and vertical timing of the television display system. These ramp signals are coupled to compartor circuits which supply an output signal that is delayed relative to the horizontal sync signal by an amount of time which will properly position the displayed image relative to the vertical boundaries of the television screen. The signals supplied by the comparator are utilized to enable a gate circuit which causes a voltage-controlled oscillator to supply the clock pulses that transfer data from the output buffer memory to the system DAC to thereby provide image data to the DAC at the proper time. In addition, to control the VCO so that the rate at which the output buffer memory is read will vary inversely relative to the y coordinate of the horizontal line associated with the image being formed, the above-mentioned ramp signal that is synchronized to the vertical sync signal is utilized as the VCO frequency control. To modulate the pulse repetition rate of the VCO in the above-mentioned manner, the frequency control signal is, in effect, multiplied by a scale factor that is stored in a read only memory and varies with the column address of the data being read from the buffer memory.

Although the above-discussed analog circuits provide satisfactory system operation, there are several advantages to be obtained with a system that employs only digital logic circuitry. In this regard, analog circuits such as those circuits utilized to generate the ramp signals in the scan converter disclosed by Parker et al. are generally more sensitive to component variations than are digital circuit arrangements and, as a result, far more extensive calibration or adjustment procedures may be necessary during the manufacturing process. Oftentimes, further component variations occur during the service life of the system and an analog arrangement may require a more extensive calibration and maintenance procedure both in the amount of testing and adjustment and in the frequency of such calibration and maintenance. Further, circuitry that is embodied in digital form is often more economical to manufacture than an analog realization of a system that performs the same function, even though the digital arrangement may include a higher parts count than an analog circuit arrangement which provides similar system performance.

Accordingly, it is an object of this invention to provide an improved digital scan converter for use with apparatus such as sector scanning surveillance systems wherein image signal information is provided that is compatible with a display device operating in a Cartesian coordinate format.

It is another object of this invention to provide a real-time digital scan converter for use with a conventional television system wherein the first portion of a signal processing method which converts signals gathered by the surveillance system in a polar coordinate format into signals compatible with the television system Cartesian format is effected by sampling the surveillance system reflection signals at a rate proportional to the cosine of the azimuthal angle of the associated scanning path and the second portion of such signal processing method is effected as stored digital signals representative of the reflection signal samples are read from a memory and converted to an analog signal.

Still further, it is an object of this invention to provide a digital scan converter of the above-mentioned type wherein the second portion of the signal processing method which converts the polar coordinate format signal information into Cartesian coordinate signal information is implemented entirely with digital circuit arrangements.

Further yet, it is an object of this invention to provide a digital scan converter, which not only meets the above-stated objects, but is of minimal structural complexity and therefore relatively economical to fabricate and maintain.

SUMMARY OF THE INVENTION

These and other objects are achieved in accordance with this invention through utilization of signal processing methods and apparatus wherein sets of digital words representative of the adjacent, successive scanning paths of a sector scanning surveillance system are obtained by digitizing the reflection signal associated with each such scanning path at a rate proportional to the cosine of the azimuthal angle that defines the scanning path being digitized and storing the sets of digital words obtained in this manner as successive columns of a rectangular memory array. As was described relative to the teaching of the previously-discussed patent to Parker et al., digitizing and storing the image information in such a manner effects a first portion of the desired polar-to-Cartesian coordinate conversion in that successive digital words that are stored in each column of the memory array are representative of the signal reflection occurring from small incremental portions of the imaged region that are defined by the azimuthal angle, $\theta$ of an associated scanning path and by a y coordinate value (where the $\theta=0$ axis of the polar coordinate space that inherently describes the imaged area bisects the region scanned and is parallel to the y axis of the desired Cartesian coordinate system). To complete the polar-to-Cartesian format conversion in real-time and in a manner that is compatible with digital circuit implementations, the present invention employs a mapping or transformation technique wherein each stored digital word is converted into a portion of the system output signal which energizes a predetermined portion (length) of an associated trace of the system display, with the length of display trace that is occupied being a function of the surveillance system scanning path ($\theta$ in the polar coordinate format) and the y coordinate of the display trace within the system display format.

By storing image information in the above-discussed manner, a mapping value that represents the incremental length of an associated display line that is to be occupied by a word of stored image information can be associated with the row and column location (address) of that image information within the system image memory. If the stored image information is then read on a successive, row-by-row basis and if the length of time each stored word of image information contributes to or controls the system display signal is controlled in accordance with the mapping value associated with the corresponding memory address, the image information within each portion of the display signal that represents a single display trace (e.g., one sweep interval of a television compatible output signal) will exhibit an amplitude versus time characteristic that imparts proper polar perspective to the resulting image display.

More specifically, in accordance with this invention, each horizontal line of a television raster or the similar display traces of other types of Cartesian coordinate display devices is considered to comprise a sequence of small, rectangular picture elements ("pixels") having a height dimension $\Delta y$ that is determined by the display geometry (i.e., the vertical portion of the TV display that is excited by a single horizontal sweep of the television receiver electron beam) and a preselected incremental horizontal dimension $\Delta x$. In this regard, in the embodiments disclosed herein the scan converter produces a television compatible signal and the horizontal dimension of each pixel is determined by a high frequency clock that, in effect, divides each horizontal sweep interval into a plurality of intervals that are equal to the clock period.

Regardless of the type of display being employed, the mapping value for each address within the system image memory is determined by the geometry of the sectorial scanning region to be depicted. In this regard, although various computational techniques can be utilized to determine satisfactory mapping values for each word of stored image information, the basis for most such techniques involves selecting a group or collection of pixels which approximate a sectorial portion of the display area which exhibits polar perspective corresponding to the imaged region and a desired scale factor. In particular, if the sectorial display pattern is partitioned into radially extending angular sections having an incremental angle substantially identical to the angle between the surveillance system scanning paths, the number of pixels included between the radially extending boundary edges of each angular section determines the mapping value for the storage location of the image memory that has a column address identifying that particular scanning angle and a row address identifying that particular line of the display.

The disclosed embodiments of the invention do not utilize fractional pixels within the display, but utilize a quantized approximation thereto wherein each word of stored image data is transformed into either no pixels of the display or an integer number of pixels. Thus, each mapping value represents a nonnegative scalar "pixel count" that is equal to the number of consecutive pixels that will be occupied by the associated stored word of image information. Since most surveillance systems utilize a number of scanning paths that substantially exceeds the number of pixels required to form a horizontal portion within the upper region of sectorial display pattern but include substantially fewer scanning paths than the number of pixels required to form a horizontal portion within the lower region of the display pattern, the mapping value associated with many of the uppermost rows of image storage results in a pixel count of zero whereas the mapping value associated with the lowermost rows of the image memory results in a pixel count on the order of, for example, 5 or 6. In addition to a dependency upon row position (y in the Cartesian coordinate system), the mapping values for storage locations that correspond to scanning paths near the $\theta = 0$ axis of the surveillance system result in pixel counts that are less than those associated with columns of the image memory that correspond to scanning paths exhibiting a substantially greater azimuthal angle.

Regardless of the exact method utilized in determining appropriate mapping values, it can be recognized that each mapping value indicates the number of display pixels (pixel count) that should be occupied by the image information that is stored at a corresponding location within the image memory if the system display is to exhibit proper polar perspective. Moreover, since the surveillance system is exactly or substantially symmetrical about the $\theta = 0$ axis, it can be recognized that a rectangular array of mapping values that corresponds to the entire image memory will exhibit symmetry relative to the left-half and right-half planes thereof. Thus, the minimum number of mapping values required to convert the image information stored in the image memory to the desired sectorial display is equal to one-half the number of scanning paths employed in the surveillance system multiplied by the number of image-bearing television lines included within the boundaries of the displayed sectorial region.

The above-discussed mapping or transformation technique is implemented in the disclosed embodiments of the invention by storing signals representative of the mapping values in a read only memory (mapping ROM) and arranging the system so that each word of image information that is stored in the system image memory and an associated mapping value are simultaneously accessed and supplied to an output processor which produces a sequence of digital signals wherein the number of occurrences of each word of image information is identically equal to the pixel count established by the mapping value associated therewith. More specifically, in each disclosed embodiment of the invention, the mapping ROM is arranged as a rectangular array of storage locations having a number of rows equal to the number of rows utilized in the image memory and a number of columns equal to one-half the number of columns in the image memory with mapping values which correspond to a half plane of the sectorial display pattern that is taken about the $\theta = 0$ axis being stored therein on a column-by-column and row-by-row basis that corresponds to the column-by-column and row-by-row storage of image information in the associated half plane of the image memory. As each row of image information is addressed to generate a corresponding horizontal portion of the sectorial image display, the set of associated mapping values is accessed by coupling an identical row address signal to the mapping ROM. As each individual word of image information within the accessed row is addressed and supplied to the system output processor unit, an addressing signal which causes the corresponding mapping value to be coupled to the output processing unit is supplied to the mapping ROM. The output processing unit then functions to establish the number of times that that particular word of image information appears in the digital signal that is supplied to a digital-to-analog converter (DAC) equal to the pixel count that is established by the associated mapping value. In particular, if the surveillance system is arranged so that an accessed row of image information comprises a set of digital words, $d_1, d_2, \ldots, d_n$, (where, for convenience, n is considered to be an even integer), the corresponding row of the mapping ROM will comprise a set of n/2 mapping values, $m_1, m_2, \ldots, m_{(n/2)}$, which is addressed so that a particular mapping value $m_i$; $i=1, 2, \ldots, (n/2)$; is coupled to the output processor with the image representative data word $d_i$ and with the image representative data word $d_{(n+1-i)}$. Thus, the output processor of such a system generates an ordered sequence of digital words wherein each word of image information $d_i$, $i=i, 2, \ldots, (n/2)$ appears a number of times that is determined by the associate mapping value $m_i$ and each word of image information $d_{(i+(n/2))}$ appears a number of times that is determined by the associated mapping value $m_{(1+(n/2)-i)}$.

In one embodiment of the invention, the output processor includes a first-in-first-out (FIFO) memory and logic circuitry for clocking each word of accessed image information into the FIFO for a number of clock pulses that is equal to the pixel count that is determined by the associated mapping value. The data loaded into the FIFO is then clocked to the system DAC at a rate dictated by the desired pixel size (desired number of pixels per television line) and in synchronization with the TV horizontal and vertical sync signals to provide a video signal that accurately represents the imaged surveillance region.

In a second disclosed embodiment, the output processor includes a random access buffer memory having a number of storage locations equal to the number of pixels that are required to generate two lines of the television display. In this arrangement, the digital words of image information that are stored within one row of the image memory and hence are required to form a particular line of the television display are loaded into the buffer memory during one horizontal sweep period of the system television signal and are sequentially clocked to the system DAC during the nextmost horizontal sweep period at a clock rate that is dictated by the selected pixel size. To load the buffer memory with the sequence of digital signals that will result in the correct image display, the output processor unit includes logic circuitry which causes each accessed word of image information to be loaded into a number of successive buffer memory storage locations that is determined by pixel count of the mapping value associated with that particular data.

In order to minimize the memory requirements of the mapping ROM, the embodiments of the invention disclosed herein do not store a digital word that corresponds to the pixel count. In this regard, the mapping ROM stores an array of two-bit digital mapping values that are, in effect, commands indicating whether the associated digital word of image information is to be "skipped" (i.e., not used in forming the system display signal); is to be utilized to form the same number of pixels as was the nextmost antecedent word of processed image information; is to be used to form one more pixel of image display than was the nextmost antecedent digital word of image information; or is to be used to form one less pixel than was the digital word of image information associated with the nextmost antecedent column location of the image memory. Each of these embodiments of the invention include an "initial value ROM" which stores a digital word representing the pixel count for the firstmost digital word of image information within each row of image memory storage locations. Logic circuits, operating in synchronism with the signals that access the stored image information and mapping commands decode each accessed mapping command and perform the commanded operation so that the pixel count utilized with each stored word of image information results in a display that exhibits proper polar perspective.

BRIEF DESCRIPTION OF THE DRAWINGS

These and other aspects and advantages of the present invention will be understood more fully after reading the following description taken together with the accompanying drawing in which:

FIG. 18 schematically depicts the output processing section of one embodiment of the system illustrated in FIG. 1;

FIG. 19 is a signal diagram that illustrates the operation of the circuitry of FIG. 18; and FIG. 20 is a block diagram of a second embodiment of the invention.

DETAILED DESCRIPTION

Figure 1:
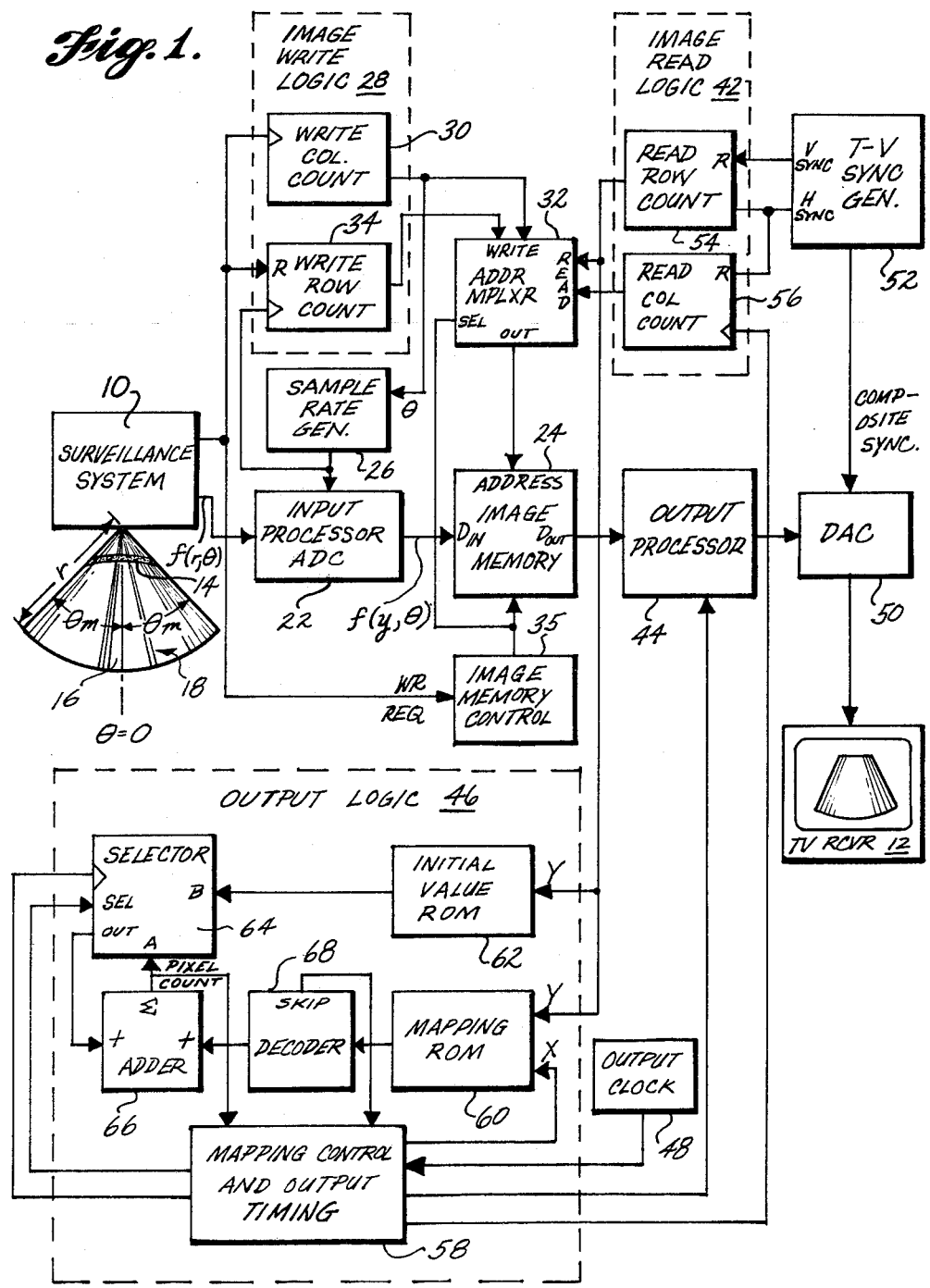
FIG. 1 is a block diagram depicting a sector scan surveillance system and a digital scan converter in accordance with this invention.

The block diagram of FIG. 1 depicts a digital scan converter that is configured in accordance with this invention for converting signals supplied by a conventional pulse-echo surveillance system 10 in polar coordinate format into an analog signal which is compatible with a television receiver 12 and various other conventional display or recording apparatus that are scanned or operated in a Cartesian coordinate system. As is indicated in FIG. 1, pulse-echo systems 10 which can employ the present invention utilize a transducer 14 that periodically emits an energy pulse of relatively short time duration which propagates outwardly along a well-defined, narrow scanning path 16 that is included by an incremental angle $\Delta\theta$. After emitting each such pulse, transducer 14 receives return or echo signals that occur when an emitted energy pulse is scattered by reflective structure that intersects or lies within that particular scanning path 16. To encompass a two-dimensional surveillance region 18 that substantially corresponds to a sector of a circle, such systems include various means for mechanically or electronically altering the propagation direction of the emitted energy so that, in effect, energy pulses are sequentially emitted along a series of adjacent, radially directed scanning paths 16 that are angularly displaced from one another by an incremental angle $\Delta\theta$. Thus, as is indicated in FIG. 1 and shown in greater detail in FIG. 2, the surveillance region 18 can be considered to be a plurality of n scanning paths 16-p; p=1, 2, 3, ... n, which collectively form a sectorial surveillance pattern that is centered about a reference axis, $\theta=0$. In this arrangement, the angle of inclusion of the entire sectorial surveillance region 18 is equal to n $\Delta\theta$ and can be referred to as $2\theta_m$, where $\theta_m$ denotes the maximum angular displacement supplied by transducer 14 relative to the $\theta=0$ axis.

As is known in the art, the sequence of echo or return signals that is received as the pulse-echo system 10 sequentially steps through the angle $2\theta_m$ can be processed to produce a two-dimensional image of the reflective objects lying within the surveillance region 18. In particular, each scanning path 16 is oriented at a particular angle $\theta$ and the time that elapses between the emission of an energy pulse and any particular portion of the associated return signal is directly proportional to the radial distance between transducer 14 and an incremental portion or cell within the scanning path 16 which causes that portion of the return signal. Thus, such a surveillance system is capable of supplying surveillance or imaging information in polar coordinate format wherein $\theta$ denotes the angular or azimuthal coordinate of a small spatial element within the imaged region relative to a reference vector extending through the transducer 14 and r denotes the radial distance between the apex of the surveillance sector 18 and the image element.

Pulse-echo surveillance techniques of the above-described type are utilized in a variety of conventional radar systems which employ pulses of relatively high frequency electromagnetic energy that are transmitted into the atmosphere by an antenna which is either mechanically rotated through a desired scanning angle or is electronically scanned by techniques such as those utilized with phased antenna arrays. Further, the same basic techniques are employed with various other types of energy. For example, the digital scan converter of this invention is presently embodied in an ultrasonic imaging system wherein short bursts of high frequency sound energy are sequentially emitted along a series of radially extending scan lines to provide real time video images of human cardiac, abdominal and peripheral vascular structure.

Regardless of the scanning techniques and frequency of operation being employed, the scan converts constructed in accordance with this invention effect a first portion of the transformation process which converts signal information provided in polar coordinate format by pulse-echo system 10 into signal information based on Cartesian coordinates as the analog echo or return signals are digitized and stored in system memory and effects the second portion of the transformation process as the stored information is read from system memory and converted to a television compatible analog signal. In particular, and with primary reference to FIG. 2, the angular coordinate axis of the polar coordinate system which describes the surveillance region to be displayed bisects the total scan angle of the surveillance system and can be considered as being parallel to the Y axis of a Cartesian coordinate system that is capable of defining the screen of television receiver 12 (or other conventional display apparatus). With this orientation between the polar and Cartesian coordinate systems, any geometric line y=j, where j is a scalar quantity, is horizontal and intersects each scanning path 16 a radial distance $r = j/\cos\theta$ from the origin of the polar coordinate system, where $\theta$ is the azimuthal angle defining the scanning path 16 of interest and the origin of the polar coordinate system coorresponds with the apex 20 of surveillance region 18 (i.e., the origin of the polar coordinate system corresponds to the point $(x_0, y_0)$ in Cartesian space). Because of this geometric relationship it can be recognized that digitizing the analog signal associated with each scanning path 16 at a rate which is proportional to the cosine of the azimuthal angle which defines that particular scanning path 16 will provide a set of successive digital words wherein each digital word represents the signal reflection occurring at points that are equally spaced apart relative to the y direction of the Cartesian coordinate system. More specifically, if the surveillance region 18 to be displayed is to include m horizontal display traces that can be mathematically expressed as $y = y_0 + k\Delta y$, where k=1, 2, 3, ... m and $\Delta y$ represents the incremental y distance that is occupied by each display trace, the analog return signal that is associated with a particular scanning path 16 can be sampled or digitized at a rate proportional to $R_0 \cos\theta$ (where $R_0$ is a predetermined range increment that results in m samples when $\theta=0$) to provide a set of digital signals wherein successive digital signal words substantially represent signal reflection (image information) occurring from spatial elements or cells that correspond to the intersection of that scanning path and successive display lines $y = y_0 + k\Delta y$; $k = 1, 2, 3, \ldots, m$. Thus, if the n sets of digital signal words that are provided as a series of return signals associated with n successive scanning paths are, in effect, stored as sequential columns of data in an m×n rectangular memory array, each of the m rows within the memory array corresponds to or contains the image information for a display line of constant y value, i.e., one horizontal sweep of television receiver 12.

With reference to FIG. 1, the apparatus for accomplishing the above-described signal processing of the analog return signals and the subsequent storage of the digital signals formed therefrom generally includes an input processor-ADC unit 22, an image memory 24, a sample rate generator 26 and an image write logic unit 28. In this arrangement, pulse-echo system 10 couples the analog return signals to input processor 22 and also supplies a signal to image write logic 28 which directly or indirectly represents the scanning path 16 that is associated with the return signal being supplied to input processor 22. For example, in one embodiment of the invention wherein transducer 14 includes a piezoelectric crystal that is rotated by a motor-driven shaft and sequentially excited with pulses of electrical energy each time the crystal passes through the desired incremental angle $\Delta\theta$, a conventionally arranged optoelectric shaft encoder is utilized to provide a digital signal that indicates which scanning path 16 is being interrogated with a pulse of acoustic energy. Alternatively, transducer 14 and/or pulse-echo system 10 can be arranged to supply a single pule each time a burst of energy is transmitted along a scanning path 16 in conjunction with one or more reference signals which permit the currently-excited scanning path 16 to be determined through easily-implemented counting and logic techniques. In any case, as is indicated in FIG. 1, image write logic 28 includes a column count unit 30 that is clocked by, or is otherwise responsive to, the signal which represents the scanning path associated with a currently-supplied analog return signal. Based on the signal or signals supplied by pulse-echo system 10 and representative of the current scanning path 16, column count unit 30 couples a digitally-encoded signal representative of the current deflection angle $\theta$ to a control input of sample rate generator 26. The digitally-encoded signal supplied by column count unit 30 is also coupled to an address multiplexer 32 to form a portion of a digital word (memory address) that is applied to one of the two multiplexer input ports.

To digitize each analog return signal in the previously-mentioned manner, sample rate generator 26 includes circuitry for supplying a signal at a pulse repetition rate that is proportional to the cosine of the current scan angle $\theta$. As is indicated in FIG. 1, the signal supplied by sample rate generator 26 is coupled to input processor 22 to determine the operational rate of the analog to digital converter (ADC) included therein and is coupled to a clocking input of a row count unit 34, which is included in image write logic 28.

Row count unit 34 is initialized or reset by pulse-echo system 10 each time a pulse of energy is emitted along one of the scanning paths 16 and is clocked by the sample rate generator 26 at a rate proportional to the cosine of the azimuthal angle that is associated with that particular scanning path 16 (i.e., $\cos \theta$). In the present embodiments of the invention, row count unit 34 provides a sequence of digitally-encoded signals that correspond to the sequence of nonnegative integers to thereby provide address signals representative of the distance between the transducer 14 and the spatial element or cell giving rise to the digitized return signal currently being provided by input processor 22. In terms of the system display depicted in FIG. 2, this means that row count unit 34 supplies a sequence of digital signals that associates each word of digitized image information of the return signal being processed with a corresponding one of the horizontal display traces $y_k = y_0 + k\Delta y$, where, $k = 1, 2, 3, \ldots m$. As is indicated in FIG. 1 this digital signal is coupled to address multiplexer 32 to complete the digitally-encoded memory addressing signal that is coupled to one input port thereof. Since the other portion of this signal represents the azimuthal angle of the scanning path 16 that is associated with the reflection signal supplied to input processor 22, image write logic 28 supplies address multiplexer 32 with a digital signal that indicates both the current scanning path 16 and the particular spatial region within that scanning path that is associated with the digital word of image information being provided by input processor 22 (in terms the value of k in the previously described expression $y = y_0 + k$ y or in terms of a row address signal that is representative of that y coordinate).

As is indicated in FIG. 1, address multiplexer 32 operates under the control of an image memory control unit 35, which is responsive to the scanning path representative signal that is supplied by pulse-echo system 10. In this regard, each time pulse-echo system 10 supplies a signal indicating that an energy pulse has been emitted along one of the scanning paths 16 and, hence, that a reflection signal is being provided to input processor 22, image memory control 35 activates address multiplexer 32 so that the digital word provided by image write logic 28 is coupled to the address input of image memory 24. Moreover, image memory control 24 provides any additional signals required to activate image memory 24 so that the data words that are supplied by input processor 22 in response to each reflection signal are written into image memory at a column address that is determined by the azimuthal angle associated with that scanning path 16 (in the original polar coordinate system) and at a row address that corresponds to the y-position of the associate horizontal display trace.

As previously mentioned, various prior art scan converter systems operate in the above-described manner to perform a first portion of the required polar to Cartesian coordinate transformation as digitized reflection signals are stored in system memory. Thus, various apparatus and arrangements for implementing this portion of the process are known to those of ordinary skill in the art. In this regard, the present invention was specifically developed as an improvement in the type of system disclosed and claimed in the previously mentioned U.S. Pat. No. 4,214,269 to Parker et al., which is assigned to the assignee of this invention. Accordingly, various details pertaining to suitable circuitry and techniques for implementing the above-discussed portion of the arrangement of FIG. 1 and the hereinafter-discussed image read logic 42 which are disclosed in the Parker et al., patent are hereby incorporated by this reference thereto. Moreover, to ensure a complete understanding of the novel aspects of this invention, including the relationship between the hereinafter-described portions of the invention and the operation of the system to store image data in image memory 24, a description of exemplary circuits for realizing image write logic 28 and image memory control 35 are included in the discussion of one detailed embodiment of the invention.

Figure 2:
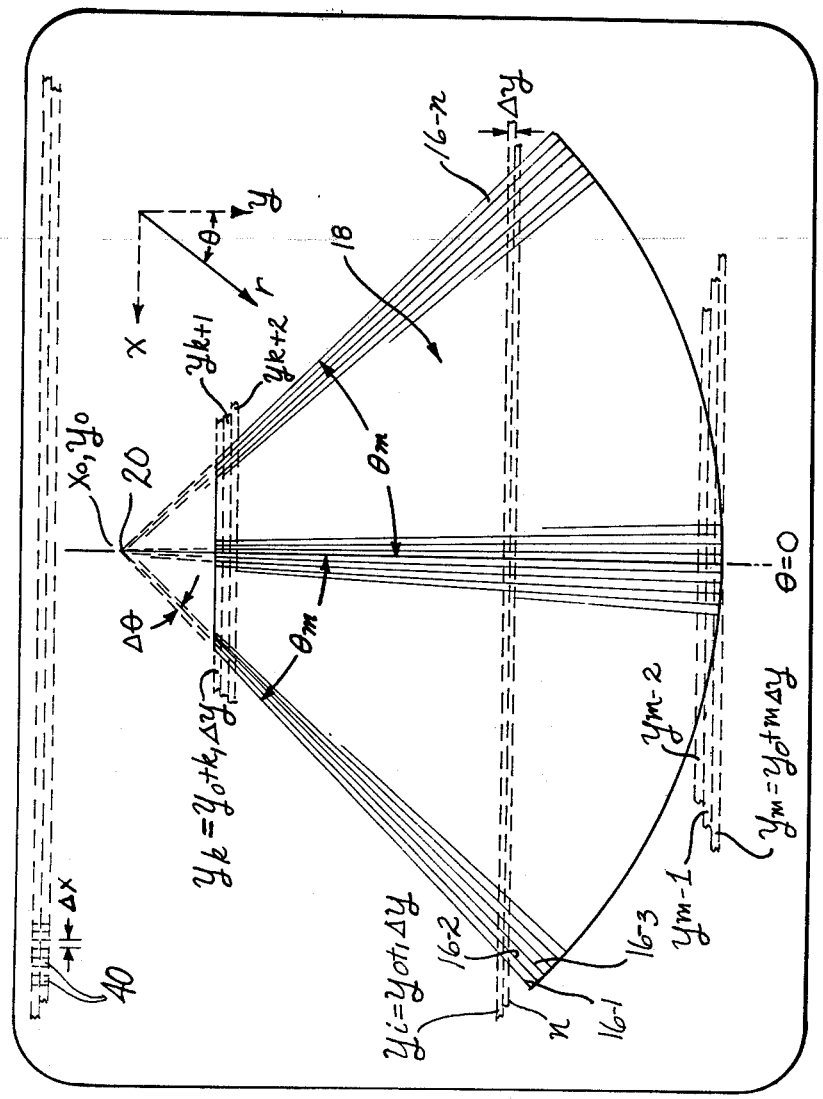
FIG. 2 is a diagrammatic representation of the television display format utilized in the practice of the invention which illustrates the relationship between the scanning paths of the surveillance system and the lines of television display.
Figure 3:
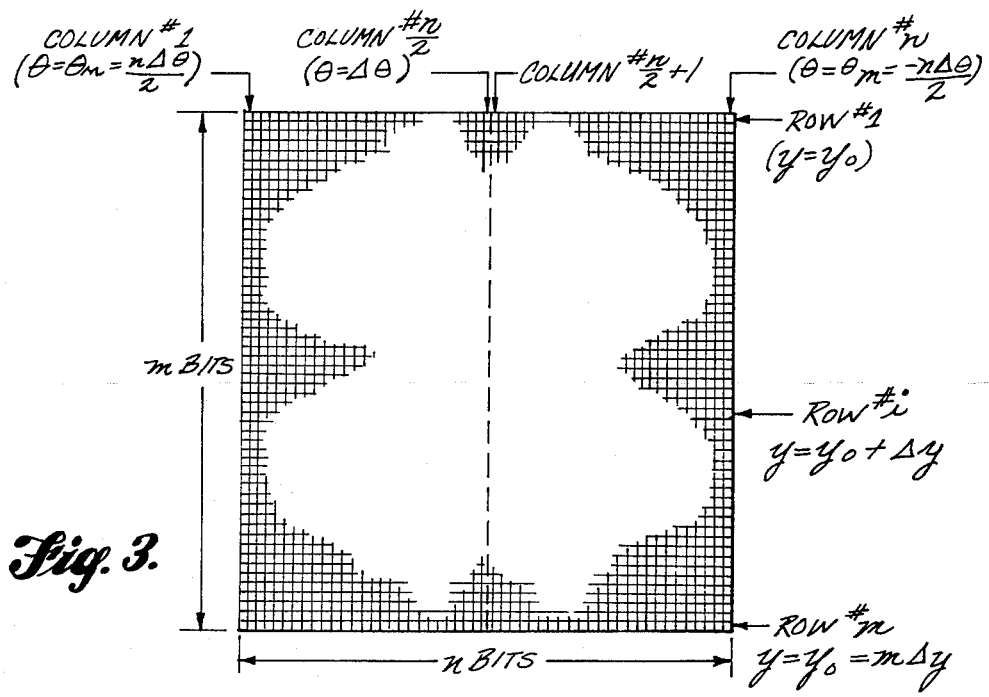
FIG. 3 diagrammatically depicts the organization of the image memory of the system of FIG. 1 as a rectangular array of storage locations.

The relationship between data that is stored in image memory 24 in the above-described manner and the system display format and, hence, the method that is implemented by the invention in order to complete the polar to Cartesian coordinate transformation can be understood with reference to FIGS. 2–4. In this regard, and with initial reference to FIGS. 2 and 3, if the system surveillance region 18 includes n scanning paths 16 (i.e., scanning paths 16-i, i=1, 2, 3, ... n) and the pulse-echo system 10 is operated or arranged to provide m image samples (data words) along scanning paths 16 that are nearest the $\theta=0$ axis (i.e. scanning paths 16-p, where p=(n/2) and (n/2)+1, respectively), a m×n array of memory locations such as is diagrammatically depicted in FIG. 3 provides a sufficient number of storage locations for storing one complete scan of the surveillance system. In fact, if the display format of FIG. 2 is being utilized, wherein the upper boundary of the display is a horizontal line defined by the expression $y=y_0+k_1\Delta y$ (where $k_1$ is a preselected scalar value) and the lower boundary of the display is an arc of constant surveillance range (i.e., a portion of the circle $(y-y_0)^2+(x-x_0)^2=R_0=y_0+m\Delta y$, in terms of the system display, the initial $k_1$ rows of memory and portions of the rows of memory having an address that corresponds to a y display coordinate greater than $R_0 \cos\theta$ will not contain image data that is required for forming the system display. In any case, although sequentially reading the stored information on a row-by-row basis will provide the image data that is to be displayed on corresponding, sequential lines of the system display, a polar-to-Cartesian scan converter employing the above described apparatus and techniques must include means for restoring proper polar perspective as the stored image information is read from image memory 24 and converted to an analog signal that is compatible with television receiver 12 and/or other display and recording apparatus that operates in a Cartesian coordinate format. For example, if the image information is stored in the above-described manner and each row of memory elements is read at a constant rate, the image information that corresponds to the radially extending scanning paths 16 would be displayed along parallel, spaced apart lines wherein each line exhibits a constant x coordinate value (i.e., is vertical relative to the display format depicted in FIG. 2).

In accordance with this invention, the stored image information is displayed with proper polar perspective through the use of a predetermined parametric, element-by-element mapping of the rectangular storage array of FIG. 3 into a sectorial display pattern of the type shown in FIG. 2. Based on this precomputed mapping or transformation strategy, the stored digital words of image information are converted into an analog signal of the successive horizontal display traces wherein the time duration of the signal caused by each stored word of image information (and hence the display area resulting from that digital signal) is determined by a mapping value that is associated with the image memory storage address of that particular word of image information. Stated in yet another manner, if the vertical dimension $\Delta y$, of the display traces $y=y_0+k\Delta y$ in FIG. 2 correspond to the vertical dimension of a single horizontal sweep of the electron beam across the face of television receiver 12 and each display trace is considered to be comprised of a sequence of picture elements (pixels) having a horizontal dimension $\Delta x$, the mapping strategy employed in the present invention consists of:

(a) determining how many pixels (if any) are to be occupied by image information stored at each particular storage location of image memory 24; and, (b) based on such determination, forming an analog signal that exhibits the desired mapping relationship as the image information is retrieved from system memory (e.g., image memory 24 in FIG. 1).

Figure 4A:
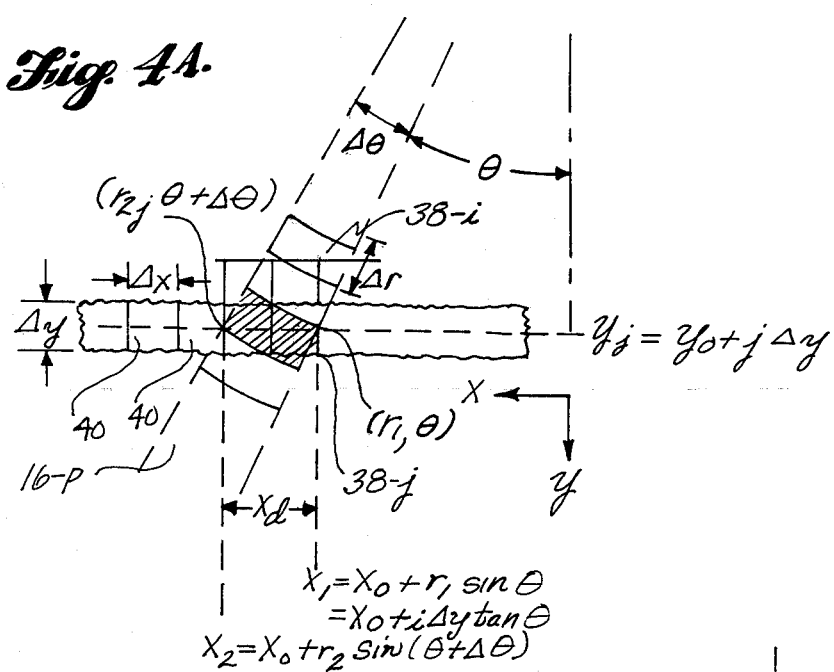
FIGS. 4A and 4B are enlarged portions of the television display of FIG. 2 which illustrate the relationship between two different stored words of image information and the associated picture elements (pixels) of the television display.
Figure 4B:
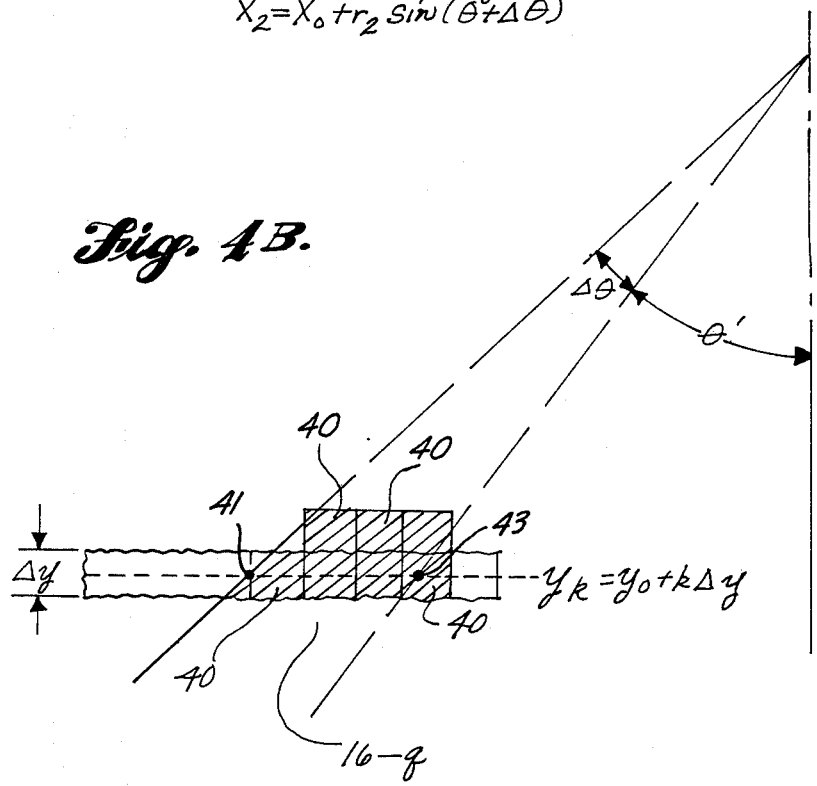

The basis for mapping or transformation of the stored image data into the display format of FIG. 2 can be ascertained with reference to FIGS. 4A and 4B which depict portions of two scanning paths 16-p and 16-q in conjunction with two horizontal display traces $y_j$ and $y_k$ which are to contain the image display associated with the depicted regions of scanning paths 16-p and 16-q. Referring first to FIG. 4A, it can be noted that scanning path 16-p is effectively partitioned into a series of radially extending spatial elements or cells 38-i; i=1, 2, 3, ... because of the previously-described sampling of the reflection signal associated with scanning path 16-p. More specifically, since the reflection signal associated with scanning path 16-p of FIG. 4A is sampled at a rate proportional to the cosine of the azimuthal angle $\theta$ that defines that scanning path, the resulting successive sample values substantially represent reflections occurring within associated spatial cells 38-i which extend from $\theta$ to $\theta+\Delta\theta$ in the azimuthal direction and from $R_0(i-1)\Delta r$ to $R_{0i}\Delta r$ in the radial direction, with $\Delta r$ being determined by the sampling rate and $R_0$ being equal to $y_0/\cos\theta$ to account for the relationship between the polar and Cartesian coordinate systems in the display format of FIG. 2 (i.e., in the arrangement of FIG. 2, the origin of polar coordinate space is considered to be the point $(x_0, y_0)$ of Cartesian space).

Considering, for example, the spatial element 38-j which is illustrated in FIG. 4A in its ideal display orientation (i.e., with correct angular and radial orientation), it can be recognized that substantial display accuracy will result if the region included within spatial element 38-j is transformed into the portion of the corresponding display trace $y_j=y_0+j\Delta y$ that lies between the noted points $x_1$ and $x_2$. With respect to the geometric relationships being utilized to describe the system display format and the polar orientation of spatial element 38-j, it can be shown that $x_1=x_0+r_1 \sin\theta$ and $x_2=x_0=r_2 \sin(\theta+\Delta\theta)$, where $r_1$ and $r_2$ respective denote the radial distance between the system origin $(x_0, y_0$ in FIG. 2) and the intersections of the boundaries defining scanning path 16-1 with the centerline of display trace $y_j$. As can be seen in FIG. 4A if display trace $y_j$ is partitioned into relatively square pixels 40 of dimension $\Delta y$, $\Delta x$, the image information corresponding to signal reflection associated with spatial element 38-j and stored at memory location (j, p) of image memory should occupy approximately two pixels in order to restore proper polar respective when the information is displayed in Cartesian coordinate format.

Since the relationship between the spatial element 38-i and the associated display trace $y_i$ which is necessary to restore proper polar perspective in the displayed image (i.e., the distance between $x_1$ and $x_2$ in FIG. 4A), is not constant throughout the various portions of the display, the number of pixels that should be occupied by image information associated with a particular cell 38-i is not constant. For example, the scanning path 16-q depicted in FIG. 4B is associated with an angular coordinate $\theta'$ which is greater than the angular coordinate $\theta$ of FIG. 4A and the y coordinate, k may be greater than the y coordinate of the display line depicted in FIG. 4A. Because of the increased angular orientation path 16-q the intersection between the scanning path and the display trace $y_j$ corresponds to approximately three pixels.

In more generalized form, the horizontal distance $x_d$ taken between the boundary edges of a particular scanning path 16-i and measured along the centerline of the display trace, e.g., the distance between $x_1$ and $x_2$ in FIG. 4A, can be shown to be $$x_d = i\,\Delta y\,[\tan(\theta + \Delta\theta) - \tan\theta] \qquad (1)$$

$$= i\,\Delta y\,\tan\Delta\theta\left[\frac{1 + \tan^2\theta}{1 - \tan\theta\,\tan\Delta\theta}\right]$$

where: $i\,\Delta y$ denotes the distance from the $(x_0, y_0)$ to the display trace $y_i$. Since, in all practical cases $\Delta\theta$ is relatively small, $\tan\Delta\theta$ can be considered to be substantially equal to $\Delta\theta$ so that Equation 1 can be expressed as $$x_d = \frac{i\,\Delta y}{\cos^2\theta}\left[\frac{1}{1 - \Delta\theta\,\tan\theta}\right] \qquad (2)$$

Moreover, at least with respect to present embodiments of the invention wherein surveillance region 18 of FIG. 1 exhibits a maximum angular value $\theta_m$ on the order of $\pi/4$ or less, and $\Delta\theta$ is on the order of 0.01 radians or less, the number of pixels, np, associated with the image cells 38-i of a scanning path 16 that exhibits an angular coordinate of $\theta$ can be expressed as $$np = ia(\Delta\theta)/\cos^2\theta \qquad (3)$$

where: a denotes the pixel height-to-width ratio, i.e., $\Delta y/\Delta x$ in FIGS. 2-4.

In view of the above expressions for the number of pixels ideally occupied by a particular image cell 38-i, it can be recognized that the number of pixels increases both with the y coordinate value (i.e., i) and with the azimuthal coordinate value, $\theta$. Moreover, in the above-mentioned embodiments in the invention wherein the maximum value of $\theta$ ($\theta_m$ in FIGS. 1 and 2) is on the order of $\lambda/4$ and the angle of inclusion of each scanning path 16 ($\Delta\theta$) is on the order of 0.01 radians or less, the number of scanning paths 16 substantially exceeds the number of pixels required to form the upper portion of the sectorial display pattern. Thus, the region formed by the intersection of a scanning path 16 and a horizontal display trace that is located in the upper portion of the display occupies much less than a single pixel 40. On the other hand, image cells 38-i of scanning paths 16 that are located a substantial vertical distance from the display origins and/or are associated with a relatively substantial value of angular coordinate $\theta$ encompass several pixels of the associated display traces.

The presently realized embodiments of this invention do not employ the fairly expressions of Equations 1-3, but operate instead on an approximation thereto wherein the mapping strategy is, in effect, quantized so that the image information of each storage location within image memory 24 is mapped into either no pixels or an integer number of pixels. Various quantization schemes that are based on the geometry of the displayed region, the number of display lines being employed and the pixel size being utilized can provide satisfactory results. For example, with reference to FIG. 4B, the location of the intercepts of the line $y_k = y_0 + k\,\Delta y$ and the boundary edge of scanning path 16-q (i.e., the position of the depicted points 41 and 43) can be calculated through simple trigometric relationships. Since both the position of the pixel and the $\Delta x$ pixel dimension are generally basic system design values, it is possible to determine the number of pixels required to represent the associated image cell 38 by determining the distance between the above-mentioned intercepts and the vertical boundary edges of the pixels 40. In the situation shown in FIG. 4B, the intercept 41 happens to coincide with a vertical boundary of a pixel 40. Thus, the pixel to the right of intercept 41 belongs to the set of pixels that represents the associated image cell. By calculating the distance between intercept 43 and the nearest vertical boundary of a pixel, it can be determined that intercept 43 lies in the left-hand portion of a pixel. Thus, that particular pixel is not used and the three pixels lying to the right of intercept 41 are employed as the quantized approximation to the portion of the display line $y_k$ that extends between intercepts 41 and 43.

Those skilled in the art will recognize that various other methods and criteria can be employed for establishing a suitable mapping strategy, with a computer-implemented computation generally being used to perform the numerous necessary calculations. Moreover, it will be recognized that various additional "rules" or constraints may be required. For example, in one embodiment of the invention that is described herein, a constraint is imposed so that the number of pixels utilized to represent two horizontally-adjacent image cells does not differ by more than one.

It should be noted that the use of a transformation map wherein each mapping value (pixel count value) is zero or an integer causes little or no degradation of the system display, while simultaneously enhancing the ease with which the desired polar-to-Cartesian coordinate conversion can be effected and, thus, permitting real-time scan conversion in systems that employ a relatively large number of scanning paths and display traces. In particular, the resolution attainable with conventional television systems and other appropriate Cartesian format recording and display units substantially exceeds the resolution of present day radar and ultrasonic imaging systems. This means that substantially no visual information is lost even though the system display does not exhibit a relatively exact cooresponcence between stored image information and display pixels such as that set forth in Equations 1, 2 or 3, but utilizes an approximation thereto such as a quantized approximation of the above-discussed type.

To implement the above-discussed mapping technique and thus perform the second portion of the polar-to-Cartesian coordinate conversion process, the arrangement of FIG. 1 includes an image read logic unit 42 which addresses image memory 24 so as to access the stored information on a row-by-row basis as each line of television display is formed and so that the individual words of image information of each such row are sequentially supplied to output processor unit 44. As shall be described in detail in the following paragraphs, output processor 44 is controlled by an output logic unit 46 which, in turn, is driven by an output clock circuit 48 to establish the rate at which the data words are supplied by output processor 44 to a digital to analog converter (DAC) 50. As is indicated in FIG. 1, DAC 50 is also responsive to a composite television sweep signal that is supplied by a conventional TV sync circuit 52 and supplies a television compatible signal to TV receiver 12 wherein each row of image information results in a portion of the signal information of an associated horizontal sweep interval, i.e., the "k"th row of storage locations within image memory 24 results in analog signal voltage that occupies the proper portion of the horizontal sweep period associated with display trace $y = y_0 = k\, \Delta y$ in the display format of FIG. 2. Since the pulse repetition rate of output clock 48 determines the rate at which digital signals are coupled to DAC 50, output clock 48 establishes the number of pixels per TV line (horizontal sweep) and hence determines the pixel dimension $\Delta x$ of FIGS. 2 and 4.

To control the number of times a particular data word is utilized, i.e., coupled to DAC 50 and hence establish the number of display pixels occupied by that word of image information in accordance with the mapping technique of this invention, output logic 46 includes memory and computational circuits that are operated in synchronism with image read logic 42. In this regard, the memory and computational circuits within output logic 46 control the operation of output processor 44 so as to: (1) establish the boundary edges of th sectorial image display by, in effect, determining the number of pixels of each television line that must be formed before image information is utilized to form one line of the sectorial display portion of FIG. 2; and (2) causes each word of image information to occupy the number of consecutive pixels required in accordance with the mapping strategy of this invention. In implementing the mapping strategy, the appropriate stored word of image information is accessed within image memory 24 and is supplied to output processor 44. Concurrently therewith, a digital word representative or determinative of the pixel count associated with that particular word of image information (i.e., the mapping value) is obtained from the memory circuits of output logic 46 and output processor 44 is operated so that the digital word of image information will be coupled to DAC 50 for exactly that many periods of output clock 48.

Turning now to a more detailed description of the arrangement for accessing stored image information and implementing the mapping strategy of this invention, image read logic 42 includes a row count unit 54 that is arranged to couple a digital word to the READ input port of address multiplexer 32 which results in sequential row-by-row addressing of the stored image information as the corresponding line of the television display is being formed. That is, with respect to the terminology employed in describing the display format of FIG. 2 wherein each television line that includes image information is given by the expression $y_i = y_o + i\, \Delta y$, row count unit 54 supplies the digital signal representative of the value i, as TV sync generator 52 supplies a horizontal sync signal that indicates that the signal which corresponds to that television line is being generated. As is indicated in FIG. 1, and as discussed in more detail relative to the circuit arrangement of FIG. 9, read row count unit 54 is reset by the vertical sync signal supplied by TV sync generator 52 following each frame of television signal and is closed by the horizontal sync signal.

The remaining portion of the digital signal that is supplied to the READ input port of address multiplexer 32 is formed by a column count unit 56 of image read logic 42. As is indicated in FIG. 1, column count unit 56 is reset by the horizontal sync signal from TV sync generator 52 and is clocked by a signal provided by a mapping control and output timing unit 58, which is located in output logic 46. In this regard, mapping control and output timing unit 58 supplies a clock pulse to column count unit 56 each time that the system completes the mapping process for one word of stored image information, i.e., each time output logic 46 operates output processor 44 so that a particular word of image information will be supplied to DAC 50 for a number of output clock pulses that corresponds to the pixel count associated with that digital word of image information. More specifically, and as is described in more detail hereinafter, each digital signal that is supplied to the READ input port of address multiplexer 32 by row count unit 54 and column count unit 56 causes image memory control 35 to access the digital word of image information that is stored at a memory location that exhibits the row address determined by row count unit 54 and the column address determined by column count unit 56. Under the control of output logic 46, this digital word of image information is processed so that it will be coupled to DAC 50 for a number of output clock pulses (supplied by output clock 48) that is equal to the previously discussed mapping value of the address within image memory 24 which contained that word of image information. In one hereinafter-discussed, more detailed embodiment of the invention wherein output process 44 utilizes a data path that includes a first-in-first-out (FIFO) memory that couples digital words of image information to DAC 50, output logic 46 causes each accessed word of image information to be coupled into the FIFO for a number of times equal to the associated pixel count. In another hereinafter discussed embodiment of the invention, a random-access buffer memory is loaded with image information that constitutes one complete display trace (i.e., one horizontal sweep interval) during a first horizontal sweep period of the television signal with the data being clocked to DAC 50 during the nextmost horizontal sweep period. In this embodiment, output logic 46 causes each accessed word of image information to be loaded into a number of consecutive buffer memory storage locations that is identically equal to the pixel count associated with that word of image information. In either case, as soon as output processor 44 completes the necessary operations with one particular word of image information, mapping control and output timing unit 58 supplies a clock pulse to column count unit 56 which causes the process to be repeated with the nextmost digital word of image information within the current row of image memory storage locations. Since column count unit 56 is reset by the horizontal sync signal (e.g., by the retrace pulse provided in each horizontal sweep), a digital address signal representative of the column address within image memory 24 that is to supply the nextmost digital word of image information is continuously supplied to address multiplexer 32. With respect to the terminology employed in describing the geometry of surveillance region 18 and the display format of FIG. 2, this means that column count unit 56 will supply a digital signal representative of the value of p when the nextmost digital word of image information is stored in the "p"th column of image memory 24 and is representative of reflection occurring within the portion of the scanning path 16-p that corresponds to the row address being supplied by row count unit 54.

As is shown in FIG. 1, the digital signal representative of the accessed image memory row address is supplied to output logic 46 by row count unit 54. As is described in more detail in the following paragraphs, this address signal and a mapping column address signal that is provided by mapping control and output timing unit 58 causes output logic 46 to effect the previously mentioned functions of determining the pixel count for the digital word of image information being supplied to output processor 44 and controlling output processor 44 so that word of image information is supplied to DAC 50 during a number of periods of the signal provided by output clock 48 that is identically equal to the pixel count. In addition to implementing the above-mentioned, generally described functions the presently preferred embodiments of the invention utilize an output logic unit 46 that incorporates two separate techniques for minimizing the amount of memory required for storage of the system output transformation map (i.e., the array of mapping values or pixel counts).

The first technique employed in these embodiments is based on the symmetry of sectorial display pattern relative to the $\theta = 0$ axis. In particular, since the display pattern is symmetric and the reflection signals associated with the left-half half plane and right-half plane are digitized at identical rates that are determined by the azimuthal angle $\theta$, the set of mapping values or pixel counts associated with each row of stored image information exhibits similar symmetry. In mathematical notation consistent with that previously employed herein, such symmetry dictates that the pixel count associated with each particular storage location (i, p) is identical to the mapping value associated with the storage location of address (k, (n−p+1)), where n is the total number of scanning paths 16 (and, hence, the number of columns of storage locations in image memory 24); p denotes a particular scanning path in the left-half plane of the surveillance region and, hence, a particular column address of the image memory that is less than or equal to n/2; i denotes an image cell 38-i with that scanning path (and hence, a row address of image memory 24).

Based on this symmetry, output logic 46 includes a mapping ROM (read only memory) 60 that is effectively arranged as an m×(n/2) rectangular storage array and contains the mapping values associated with the left-half plane (or, alternatively, the right-half plane) of the display format depicted in FIG. 2. As is indicated in FIG. 1, mapping ROM 60 receives the row representative signal (Y) that is provided by row count unit 54 to thereby access a row of stored mapping values that corresponds to the row of stored image information being accessed to output processor 44. In addition, as shall be described in more detail, mapping control and output timing unit 58 supplies an address signal to mapping ROM 60 which causes selection of a stored mapping value which corresponds to the image memory column address of the currently-selected word of image information. In this regard, in the hereinafter-described embodiment of the invention that utilizes a FIFO to couple data to DAC 50, as the image meory column count continuously progresses between 1 and n to sequentially couple stored image information corresponding to the first through nth scanning path 16 to the FIFO, mapping control and output timing unit 58 supplies an address signal to mapping ROM 60 which first counts up from 1 to (n/2) and then counts down from (n/2) to 1 in synchronism with the increasing count address supplied by column count unit 56 to thereby access the proper stored mapping value. In the other hereinafter-discussed embodiment of the invention which utilizes an output buffer memory, the image memory is arranged so that a storage location associated with a scanning path 16 of the left-half plane and the symmetrically located scanning path of the right-half plane are simultaneously addressed by image read logic 42. In this embodiment, the address signal supplied to mapping ROM 60 by mapping control and output timing unit 58 and the associated address supplied by column count unit 56 are identical are are incremented between 1 and (n/2).

The second technique that is employed in the presently preferred realizations of output logic 46 to minimize the amount of memory required for storing the system transformation map is based on the fact that the number of pixels necessary to represent image information stored at adjacent columns of image memory 24 increases gradually with increasing values of the azimuthal coordinate $\theta$. In fact, in the present embodiments of the invention where $\theta_m$ does not exceed $\pi/4$, the pixel counts associated with adjacent column addresses of image memory 24 need not differ by more than unity (one pixel) even though several pixels are necessary to impart proper polar perspective relative to those digital words of image information that represent spatial range elements 38 that are located a substantial distance from the system origin relative to the y direction and/or are associated with a scanning path 16 that exhibits a substantial azimuth coordinate $\theta$. Since the difference between the pixel count for adjacent entries within a row of mapping values is 0, +1 or −1, whereas each actual mapping value may be substantially greater than unity (e.g., as high as 5 or 6 in present realizations of the invention), it can be recognized that memory storage requirements can be substantially reduced by storing a two-bit "difference signal" and computing the actual mapping value from the stored difference signals.

Specifically, in accordance with the arrangement of FIG. 1, output logic 46 includes an initial value ROM 62 which stores a digital signal representative of the mapping value (pixel count) that is associated with the first storage location within each row of image memory 24. In this arrangement the two-bit "difference signals" that are stored in mapping ROM 60 are, in effect, commands representative of whether the corresponding digital word of image information in image memory 24 is: (a) to be "skipped", i.e., not used in forming the Cartesian coordinate display; (b) is to be utilized to form the same number of pixels as was the nextmost antecedent word of processed image information (i.e., the image information associated with an image memory column address one less than the column address being processed); (c) is to be used to form one more pixel of image display than was the nextmost antecedent digital word of image information, or (d) is to be used to form one less pixel of the Cartesian coordinate display than was the digital word of image information associated with the nextmost antecedent column address of image memory 24. For simplication of terminology, the above-described two-bit mapping commands are hereinafter respectively referred to as a "skip code", a "no-change code", an "increment code", and a "decrement code".

Continuing with the description of the output processor logic 46 of FIG. 1, the row address signal provided by row count unit 54 of image read logic 42 is coupled to the addressing input of initial value ROM 62 so that a digital word representative of the pixel count for the first element of the next row of image information to be read from image memory 24 is coupled to one input port of a data selector unit (two-to-one multiplexer) 64. The second input terminal of data selector 64 is coupled to the output port of an adder unit 66 having the input ports thereof connected for receiving the digital signal supplied by data selector 64 and a digital signal supplied by a decoder unit 68.

In operation, mapping control and output timing unit 58 supplies signals that control and clock data selector 64 so that the initial mapping value supplied by initial value ROM is latched into selector 64 immediately prior to the time at which image memory control 35 causes the first word of image information within the associated row of storage elements to be coupled to output processor 44. Mapping ROM 60 does not supply a mapping command signal at this point of the operational sequence and the signal supplied by adder 66 to selector 64 (and to mapping control and output timing unit 58) is identically equal to the pixel count for the initial word of image information. This pixel count is then utilized by mapping control and output timing unit 58 in the previously discussed manner to determine the number of times that the associated word of stored image information will be coupled from output processor 44 to DAC 50 to thereby cause the image information to be converted into the required number of pixels. When this has occurred, mapping control and output timing unit 58 supplies the previously mentioned signal pulse to column count unit 56 to increment the column address supplied to address multiplexer 32 by column count unit 56. Slightly subsequent thereto or concurrently therewith, mapping control and output timing unit 58 supplies a signal to mapping ROM 60 which accesses the mapping command or code that is associated with the newly selected address of image memory 24 and couples the mapping code to decoder unit 68.

Decoder unit 68 detects whether the two-bit mapping command signal supplied by mapping ROM 60 is a skip code, a no-change code, an increment code, or a decrement code. If a skip code is present, decoder unit 68 supplies a signal to mapping control and output timing unit 58 which results in the associated digital word of image information being eliminated from the Cartesian coordinate display format. For example, in the hereinafter described embodiment of the invention that utilizes a FIFO to couple data between image memory 24 and DAC 50, mapping control and output timing unit 58 inhibits the FIFO shift-in signal so that the accessed word of image information cannot be coupled to DAC 50. In the embodiment which utilizes a random access buffer memory to store data for forming a complete display trace, mapping control and output timing 58 inhibits the memory write operation for the associated word of image information by, for example, disabling a gate that supplies the memory circuit write-enable signal.

If mapping ROM 60 supplies a no-change code rather than a skip code, decoder 68 couples a digital signal to adder 66 which is representative of zero and the signal latched into selector 64 when mapping control and output timing unit 58 supplies a clock pulse to selector 64 does not change. In contrast, if mapping ROM 60 supplies an increment code or a decrement code to decoder unit 68, a digital signal representative of +1 to −1 (i.e., a radix-complemented digital signal) is respectively supplied to adder 66. In either case, the signal supplied by decoder 68 is combined with the signal presently held in selector 64 and latched into selector 64 by a clock pulse provided by mapping control and output timing unit 58 so that the digital word stored by selector 64 continuously represents the pixel count of the associated storage location within image memory 24, i.e, represents the number of pixels to be occupied by image information stored at that particular address. With selector 64 holding the correct pixel count, mapping control and output timing unit 58 again operates in the previously discussed manner so that the associated digital word of image information will be coupled from output processor 44 to DAC 50 during a number of sequential output clock pulses that is equal to the accumulated or total pixel count.

As the processing of each row of stored image information is completed, the horizontal sync signal supplied by TV sync generator 52 resets column count unit 56 in the previously-mentioned manner and causes row count unit 54 to be incremented. Thus, operation in the above-described manner continues with output logic 46 functioning to select the initial mapping value associated with the new row address and subsequently utilizing the accessed mapping codes to accumulate the appropriate pixel count in selector 64 in the above-mentioned manner.

Those skilled in the art will recognize that various circuit arrangements can be utilized to realize an output processor 44 and an output logic unit 46 that functions in the above-described manner. In addition, it will be recognized that, if the system is to provide a flicker-free real-time display, output processor 44 and output logic 46 must be capable of processing a complete row of image information during a single horizontal sweep interval of the television format being employed while simultaneously permitting image information to be written into image memory as it is made available by the system input processor 22 of FIG. 1. Since the rate at which image information is generated by input processor 22 is determined by the desired surveillance range and varies with the cosine of the azimuthal angle $\theta$ to effect the first portion of the scan conversion process, the rate at which image data must be written into image memory 24 cannot be synchronized to the horizontal sync signal provided by TV sync generator 52 or the clock signal provided by output clock 48 to establish the pixel size of the resulting TV display. Thus, a dynamic memory unit is generally utilized for image memory 24 with image memory control unit 35 establishing predetermined memory cycles wherein the memory write operation has priority. Moreover, the output processor 44 and output logic 46 that are employed in presently preferred embodiments of the invention generally utilize series-to-parallel conversion and pipelining in order to effect the necessary operations within the required time period and without imposing overly restrictive memory cycle requirements relative to the system image memory 24.

Figure 5:
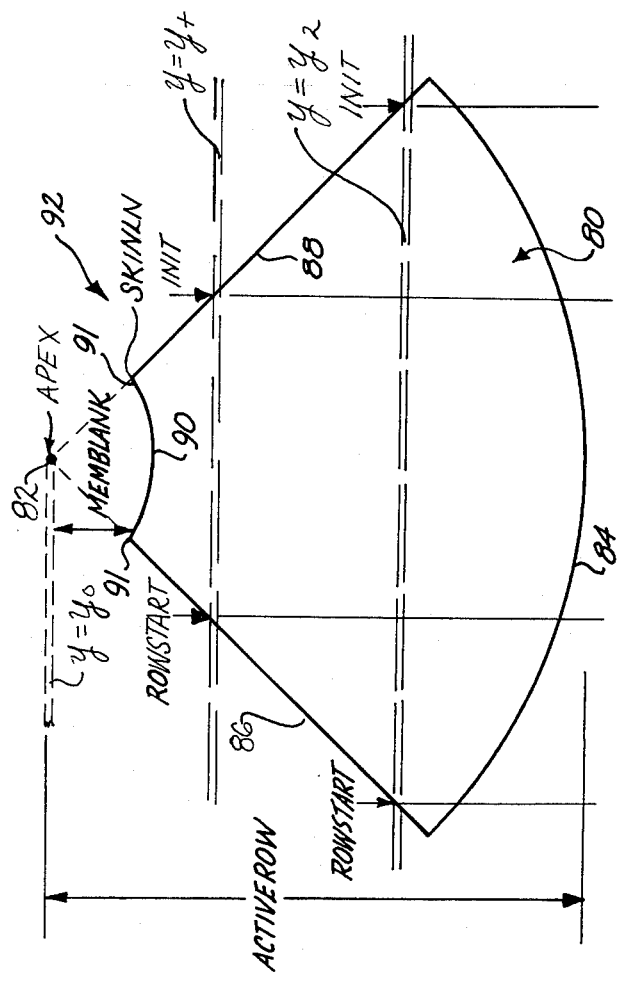
FIG. 5 is a diagrammatic representation of the display format of one embodiment of the invention which indicates various logic signals that are utilized in generating the depicted display sector.
Figure 6:
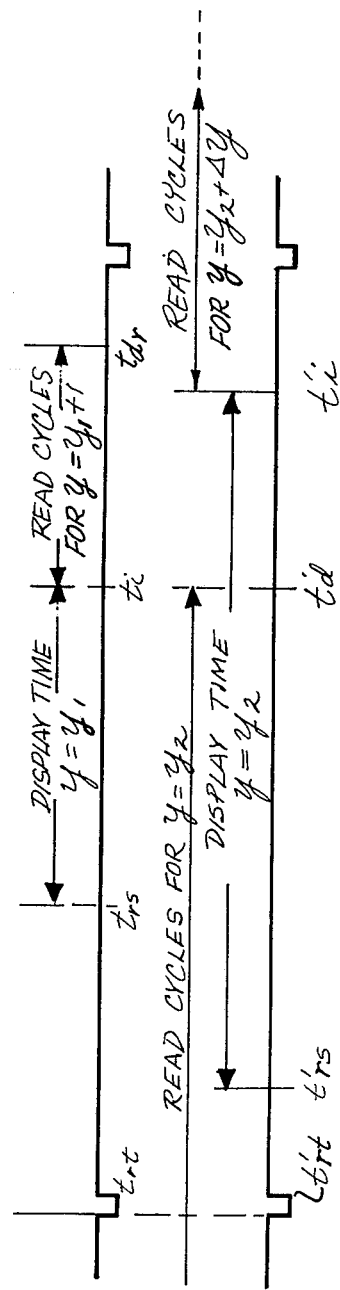
FIG. 6 graphically depicts two particular horizontal sweep intervals of the display sector of FIG. 5 and illustrates the time periods in which the information displayed by those lines is read from the system image memory.

The basic considerations relevant to one such embodiment of the invention which operates with a pulse-echo surveillance system having 128 scanning paths 16 and utilizes an output processor 44 that includes a first-in-first-out (FIFO) memory for sequentially coupling image information from image memory 24 to DAC 50 in a manner that utilizes each digital word of image information a number of times equal to the associated pixel count can be ascertained from FIGS. 5 and 6. Referring first to FIG. 5, which depicts a typical display sector 80 for the type of embodiment being discussed, each horizontal TV sweep between the apex 82 of the display sector 80 and the lowermost point of the curved display sector boundary edge 84 corresponds to one row of storage locations within the system image memory 24 of FIG. 1, with the particular embodiment being discussed utilizing (but not being limited to) 384 TV lines and hence 384 rows of image storage. As is noted at the left-hand boundary of display sector 80, each TV line which includes a portion of display sector 80 is identified as an "active row". As shall be described relative to FIG. 9, an ACTIVEROW signal that is a logic low while the video signal that represents imaging information is being formed by the system DAC is used to enable logic circuitry which, in turn, generate signals that control the system FIFO and mapping circuits. For example, as is indicated in FIG. 5 for the television lines identified as $y=y_1$ and $y=y_2$, a ROWSTART signal is generated at a time which indicates that the first pixel of display sector 80 is to be generated. Thus, the ROWSTART signal coincides with the intersection of each television line and the display sector left-hand boundary edge 86. To reinitialize the logic circuitry that controls the output processing and begin the processing of stored image information for the nextmost line of the television display, an initialization pulse (INIT) is generated as soon as the last pixel of a current line has been processed. Relative to the display sector 80 of FIG. 5, the INIT pulse substantially coincides with the intersection of each TV line with the display sector right-hand boundary edge 88.

In the display format of FIG. 5, the upper boundary 90 of display sector 80 is an arc of constant radius and hence constant range relative to the ultrasonic imaging process. In the particular embodiment under discussion, the position of the upper boundary 90 is established to represent the position of the face of a transducer that generates the pulses of ultrasonic energy which provide the image information and a signal denoted as the MEMBLANK signal is utilized to cause signals that represent the display background 92 (e.g., black) to be stored in the corresponding row locations of the system image memory. Since the rows of storage within the system image memory that are associated with television lines situated between apex 82 and the intersections 91 between upper display boundary edge 90 and left- and right-hand boundary edges 86 and 88 are not utilized to produce image information, such storage may be eliminated in some embodiments of the invention. In the present embodiments, these rows of storage are maintained because the system is configured for accommodating display sectors 80 that result with various imaging ranges (depths), each of which require positioning of upper boundary edge 90 so that the surface of the transducer is depicted at the proper location, i.e., at the surface of the region being examined. As is indicated in FIG. 5 and as shall be described in more detail relative to FIG. 7, the pulse-echo system provides the subject embodiment of the invention with a signal pulse that corresponds to apex 82 (APEX signal) and a signal corresponding to the upper boundary edge 90 of display sector 80 (SKINLN signal) for each of the 128 surveillance system scanning paths.

Referring now to FIG. 6, which indicates the television horizontal drive signals associated with television lines $y=y_1$ and $y=y_2$ of FIG. 5, the basic operation and memory cycle requirements of an embodiment using a FIFO to couple image information from the system image memory to the system DAC can be ascertained. First, since TV line $y=y_1$ is located in the upper portion of the display sector 80, a relatively short period of time is occupied by image representative signal. In particular, the ROWSTART signal will occur at a time $t_{rs}$ that follows the horizontal drive signal retrace pulse (at time $t_{rt}$) in FIG. 6 by an amount of time that corresponds to the distance between the left-hand edge of the television screen and the display sector left-hand boundary 86 for television line $y=y_1$. At this point image information that has been previously stored in the FIFO is clocked to the system DAC at a rate which determines the horizontal distance occupied by each word of image information (i.e., the $\Delta x$ pixel dimension). The image display portion of line $y=y_1$ ends when the last word of image information is shifted from the FIFO and the system INIT pulse is generated (at $t_i$ in FIG. 6). Since the nextmost TV line ($y=y_1+1$) contains relatively few pixels, the number of image memory read cycles that are required to load the FIFO with the associated image information can be accomplished in a relatively short period of time such as that indicated between $t_i$ and $t_{dr}$ in FIG. 6. In this regard, as long as the image information for the nextmost line $y=y_1+1$ can be shifted to the output register of the FIFO prior to the time at which the ROWSTART signal of the next TV line is generated, no display problems are encountered.

As can be noted in the portion of FIG. 6 that represents the horizontal drive signal for the display of television line $y=y_2$, the period of time which elapses between the horizontal retrace pulse and the beginning of the display time ($t'_{rs}=t'_{rt}$) and the amount of time that elapses between the INIT pulse for TV line $y=y_2$ and the nextmost horizontal retrace pulse is relatively short. However, all image information associated with television $y=y_2$ will be displayed as long as the first word of the image information has been shifted to the output register of the FIFO prior to time $t'_{rs}$ of FIG. 6 and any remaining read cycles that are necessary to access all image information for that television line are complete by time $t'_{dr}$, where $(t_i' - t'_{dr})$ is less than or equal to the FIFO fall-through time. In the subject embodiment of the invention wherein a clock rate of approximately 10 megahertz is utilized to couple data from the FIFO to the system DAC so that each TV line contains approximately 544 pixels and each memory read cycle latches two words of image information from the system image memory, a FIFO that includes 128 storage registers provides satisfactory buffering capabilities.

As previously mentioned, since digitized image information is made available to the scan converter of this invention at a rate that is nonsynchronous with the television signal rates, the above-indicated process for reading data from the image memory must be implemented in a manner which can be interrupted by the required number of image memory write cycles while still effecting the above-discussed required number of image read cycles. In this regard, the hereinafter-discussed addressing circuitry of the subject embodiment is arranged for the parallel loading of four successive digitized words of image information into the image memory during each image memory write cycle. Thus, 96 write cycles are required to load the information associated with one scanning path. Since 64 read cycles are required to transfer one row of stored image information from the image memory and since short-range or shallow-depth scanning may require all 96 read cycles to be performed during time period equal to or less than the horizontal sweep interval of the television system, as many as 160 memory cycles could be required during any one television horizontal sweep interval. As shall be described hereinafter, the write and read cycles utilized in the subject embodiment of the invention are approximately 300 nanoseconds in duration and under certain circumstances may overlap one another by approximately 100 nanoseconds. This arrangement ensures that worst-case image memory read and write conditions can be met without imposing severe write cycle restrictions on the system image memory and, accordingly, a variety of conventionally available random access memories can be utilized.

Figure 7:
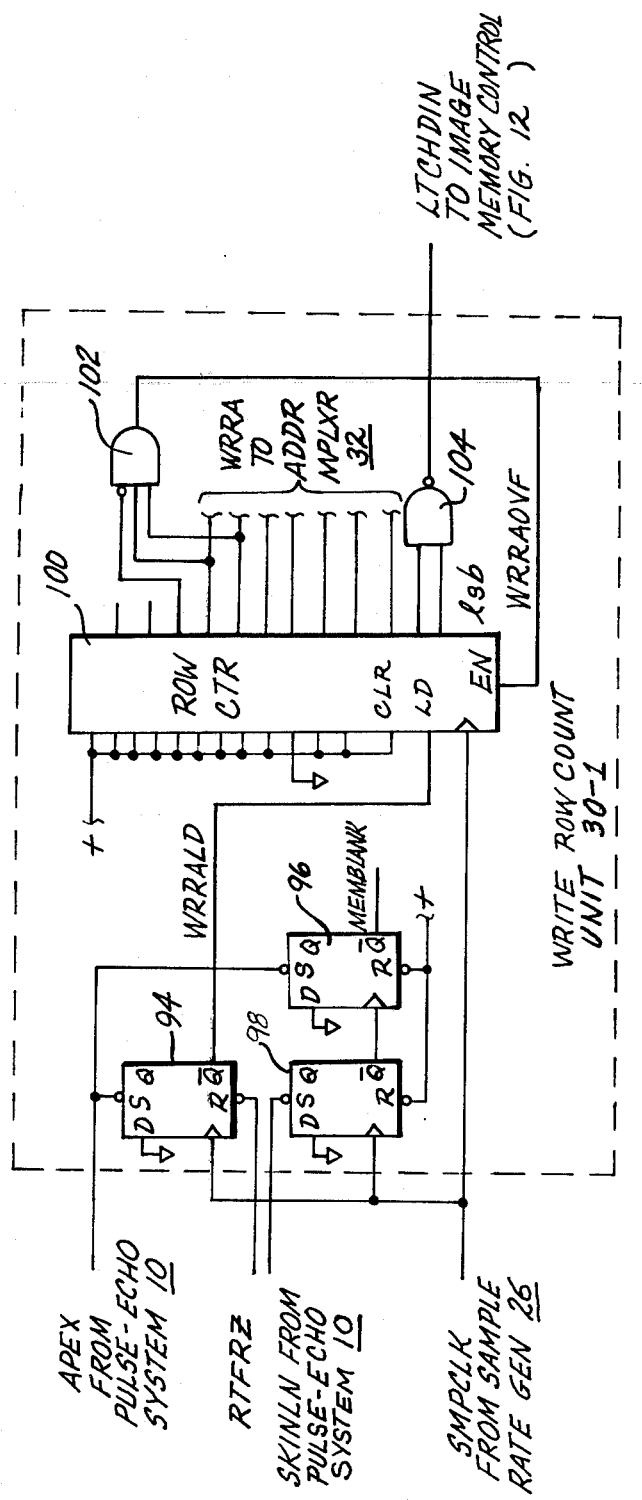
FIG. 7 is a block diagram that illustrates one realization of an addressing circuit for writing the surveillance system image information into the system image memory.

FIG. 7 illustrates a circuit of the type that is used in the abovementioned embodiment of the invention for implementing write row counter unit 30 of the polar-to-coordinate conversion system described relative to FIG. 1. In the arrangement of FIG. 7, the previously-mentioned APEX pulse (indicating that a sequence of signal samples for a particular scanning path is about to begin) is coupled to the set terminals (S) of a type-D flip-flop 94 and a type-D flip-flop 96, each having the D input thereof connected to a logical low potential. As is shown in FIG. 7, flip-flop 96 is clocked by the $\overline{Q}$ output of a third type-D flip-flop 98, having the D input terminal thereof connected to a logical low potential and the set terminal (S) connected for receiving the SKINLN signal supplied by the pulse-echo system coincident with the first sample of image information of a current scanning path that will contribute to the display (i.e., a word of image information that will form a portion of the television line defining the display upper boundary edge 90 in FIG. 5). The $\overline{Q}$ output of flip-flop 96 supplies the previously-mentioned MEMBLANK signal which causes the display of a background shade (e.g., black) between apex 82 and display upper boundary edge 90. The $\overline{Q}$ output of flip-flop 94 is coupled to the load (LD) terminal of a twelve-bit counter 100 that produces the image memory row addresses that will hold the digital words of image information that are supplied by the pulse-echo surveillance system. Like flip-flops 94 and 98, counter 100 is clocked by a signal that is identified as the signal SMPCLK signal and is supplied by the system sample rate generator (26 in FIG. 1) each time a digital word of image information is made available by the pulse-echo surveillance system.

Since the pulse-echo system requires five SMPCLK periods to clock the first four digital words of image information into a shift register and transfer the set of four words to a conventional latch circuit for parallel loading into the image memory, counter 100 is connected to begin, in effect, at a count of −5. More specifically, since 384 digital words of image information that correspond to the 384 active rows of the TV display depicted in FIG. 5 are obtained for each scanning path 16 in the embodiment being discussed, the input terminals of counter 100 are connected to logical high potentials and logical low potentials so as to cause the counter to be initialized at a count of 12-bit value of 4091 each time flip-flop 94 causes the counter to be loaded. Since the addresses employed for the 384 active rows of television display range from 0 to 383, five SMPCLK pulses will occur before valid address signals are supplied to the image memory. To disable counter 100 after the 383 digital words of image information have been addressed to the image memory, the arrangement of FIG. 7 includes a gate 102 which performs the logic operation $\overline{WRRA10}\cdot WRRA9\cdot WRRA8$, where WRRA signifies "write row address" and the numeral corresponds to the bit location within the address. Since the output of gate 102 is connected to the enable (EN) terminal of counter 100, it can be recognized that the first ten bits of counter 100 cannot exceed a count of 384 and will remain at such count until a subsequent memory write sequence is initiated by the nextmost APEX signal. Since four words of image information are transferred with each memory write operation, the first two significant bits of the write row address supplied by counter 100 are not separately routed to the address multiplexer for the system image memory (32 in FIG. 1), but are connected to the input terminal of an AND gate 104, which supplies a signal (LTCHDIN) used for initiating an image memory write cycle request and for latching the four words of data into the image memory address that is represented by the third through ninth output bits of counter 100.

Figure 8:
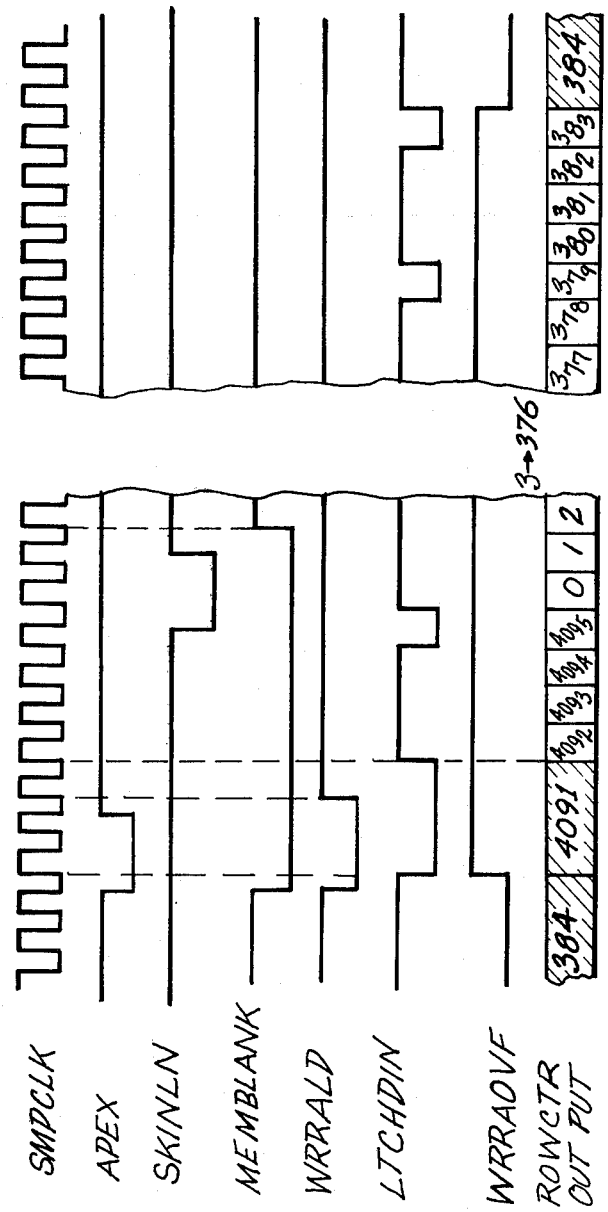
FIG. 8 is a timing diagram that illustrates the operation of the circuit depicted in FIG. 7.

The operation of the write row count unit depicted in FIG. 7 is illustrated in FIG. 8. In this regard, the negative-going transition of the APEX signal sets flip-flops 94 and 96 to thereby couple a logical low level to the load terminal (LD) of counter 100 and cause the MEMBLANK signal to enter a logical low state that causes signals representative of the display background to be written into image memory. As described above, the input terminals of row counter 100 are interconnected so as to cause the counter to be initialized to a count of 4091 when the load signal is applied. The occurrence of the first positive transition of the SMPCLK signal following the time at which APEX returns to a logical high state causes the counter load signal (WRRALD in FIGS. 7 and 8) to return to a logical high state and the next positive-going transition of the SMPCLK signal causes the counter to clock to a count of 4092. As the SKINLN signal supplied by the pulse-echo system goes low to indicate the face of the transducer (location of the display upper boundary 90 of FIG. 5), flip-flop 98 is set. When the SKINLN signal returns high, the nextmost positive transition of the SMPCLK signal clocks a logical low into flip-flop 98. When this occurs, the $\overline{Q}$ output of flip-flop 98 clocks flip-flop 96 to thereby cause the MEMBLANK signal to return high. Thus, MEMBLANK remains low between APEX and the first SMPCLK signal following the SKINLN signal to provide a signal that can be used to cause the rows of image memory that correspond to the region between apex 82 and upper boundary 90 in the display format of FIG. 5 to hold information representative of the desired display background. For example, in one embodiment of the invention, the MEMBLANK signal controls a data selector (2-to-1 multiplexer) which selectively directs the digitized words of image information or a digital word representative of the desired display background into the previously-mentioned shift register that is used to accumulate a set of four words of image information for parallel loading into the system memory.

Regardless of the number of row address locations which occur while the MEMBLANK signal is low, the row address count provided by counter 100 continues to be incremented upwardly with each SMPCLK signal that is supplied by the pulse-echo surveillance system. Additionally, the LTCHDIN signal goes low for one complete SMPCLK period out of each group of four SMPCLK periods to thereby supply a signal indicating that four words of image information are ready for loading into the system image memory. When counter 100 reaches a count of 384 so that the address supplied to the system address multiplexer (32 in FIG. 1) is the binary equivalent of 96, gate 102 produces a logical low signal that disables counter 100. Thus, subsequent SMPCLK signals have no affect on the arrangement of FIG. 7 until the circuit is reinitialized by the next APEX signal and begins processing image information associated with the nextmost scanning path.

A detailed circuit arrangement for an image memory column address for each memory write operation (e.g., a more detailed embodiment of write column count unit 30 of FIG. 1) is not depicted in the drawing. As previously mentioned, since the image information of each successive scanning path (128 in the embodiment being described) is stored in a corresponding column of storage locations of the system image memory, various circuit designs can be employed to provide an appropriate address such as relatively simple counting arrangements when the pulse-echo system employing the invention provides a reference pulse to indicate a particular scanning path (e.g., the first or last) and provides a pulse substantially coincident with each scanning path. In the pulse-echo system that employs the polar-to-Cartesian scan converter embodiment being discussed, a transducer that emits the 128 pulses for each scanning sequence includes a piezoelectric element that is rotated into a position for transmitting the pulse associated with a particular scanning path and an optical electronic shaft encoder provides a seven-bit digitally-encoded signal that identifies the angular position of the transducer and hence the scanning path and associated column of image memory.

Figure 9:
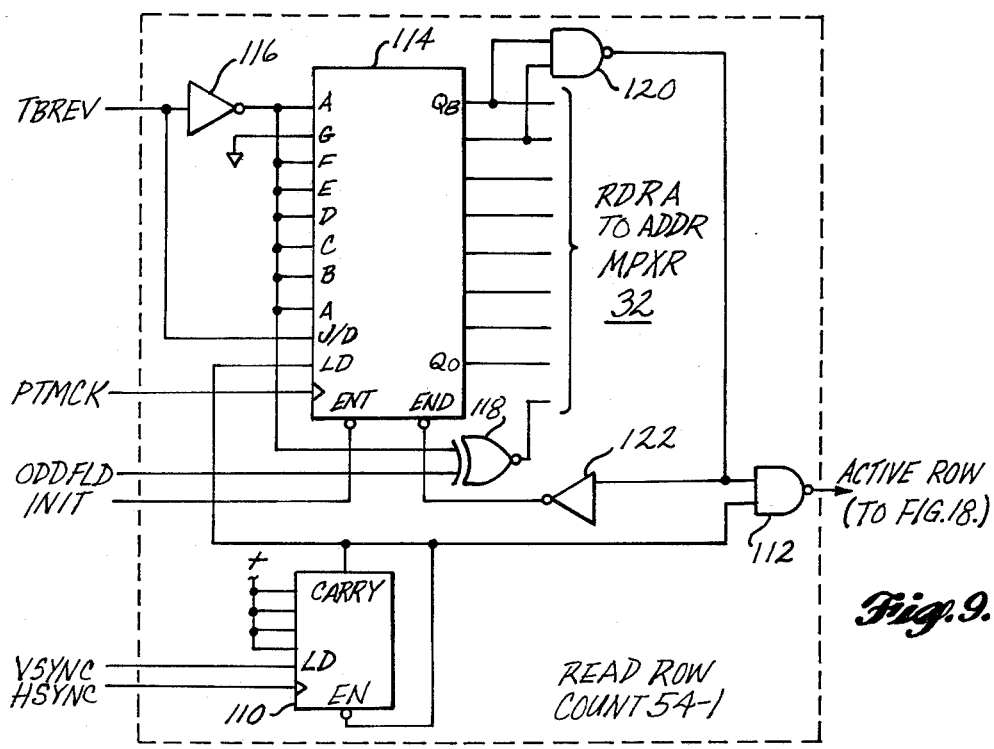
FIG. 9 schematically depicts one circuit that can be utilized to generate row addresses for reading image information from the system image memory in accordance with the invention.
Figure 10:
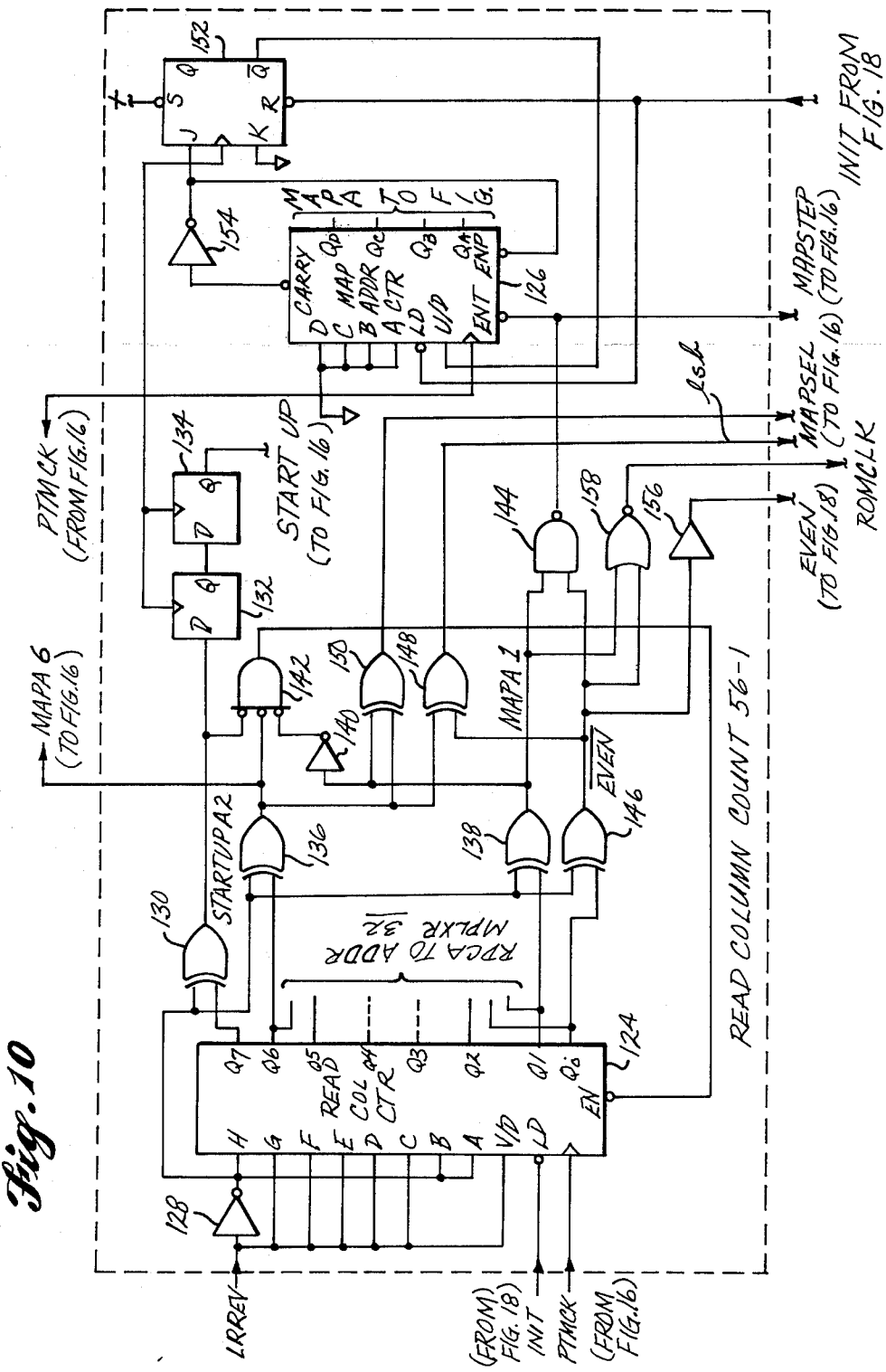
FIG. 10 is a schematic diagram illustrating a circuit arrangement that can be used in the system of FIG. 1 for supplying image memory and mapping memory column addresses when image information is read from the system image memory and processed in accordance with this invention.

FIGS. 9 and 10 schematically depict the circuitry that is utilized in the subject embodiment of the invention to realize a read row count unit 54 and read column count unit 56 of the type described relative to the basic embodiment of FIG. 1. As is described in the following paragraphs, the circuitry of FIGS. 9 and 10 establish an address signal for selecting a row of image memory that corresponds to the line of television image being formed by the system DAC and selects the elements within that row on a successive column-by-column basis. With initial reference to FIG. 9, the depicted arrangement for generating the row address (denoted RDRA in FIG. 9) for each image memory read sequence includes a counter 110 having the load (LD) terminal connected for receiving the television vertical sync signal and the clock terminal connected for receiving the television horizontal sync signal. During each vertical retrace pulse, counter 110 is loaded with a predetermined count representative of the number of TV lines that will be generated before the display sector is formed (i.e., the number of TV lines generated between the top of the screen and apex 82 in the display format of (FIG. 5). Since the counter 110 is clocked by horizontal sync pulses, the carry signal provided by counter 110 will go high when a number of television lines that is equal to the number loaded into counter 110 has been generated. The carry signal, which thus indicates the first line of the television display to include image information, is coupled to one input terminal of a two-input NAND gate 112; to the load terminal of a read row counter 114 that generates the image memory read row address (RDRA); and to the enable input terminal of the counter 110. In the depicted arrangement, the carry signal will remain at a logical high level to enable NAND gate 112 and disable the counter 110 until the occurrence of the nextmost vertical sync signal, which indicates the beginning of a new television raster scan.

Once the counter 110 has provided the carry signal to indicate that television lines that are within the display sector 80 of FIG. 5 are to be generated, the arrangement of FIG. 9 supplies a row address that increments upwardly from zero to 383 or, alternatively decrements downwardly from 383 to zero so as to reverse the top to bottom orientation of the display sector (i.e., to generate a display in which the apex 82 is located on the lowermost television line of the active row range). In this regard, a signal (denoted TBREV in FIG. 9 and supplied by a conventional selector switch or other means) is coupled directly to the up/down terminal (U/D) of read row counter 114 and is coupled to counter input terminals that will load the value 383 into counter 114 by means of an inverter 116. The signal provided by the inverter 116 is also coupled to one input terminal of an exclusive-OR gate 118, having the second input terminal thereof connected for receiving a conventional odd field signal (ODDFLD in FIG. 9) that is generated by the system TV sync generator (52 in FIG. 1).

Regardless of whether read row counter 114 counts upwardly to form the display format depicted in FIG. 5 or counts downwardly to invert the vertical orientation of the display, counter 114 is initialized when counter 110 provides the previously-discussed carry signal and is incremented (or decremented) once during the time required to generate one line of television signal that contains image information. In particular, the previously-mentioned INIT signal is coupled to one enable terminal of read row counter 114 (the ENT terminal in FIG. 9) and counter 114 is clocked by a logic signal (denoted as PTMCK) that is generated during the hereinafter-described mapping sequence that causes one word of image information to be shifted into the system FIFO a number of times identically equal to the associated pixel count. As shall be described in detail relative the mapping logic arrangement of FIG. 16, the PTMCK signal is at logic level high for only a single period of the system output clock (48 in FIG. 1). Since, as will be described in detail relative to FIG. 18, the system output control logic supplies an INIT signal that is a logical low for a period of time equal to an entire period of a single PTMCK signal, read row counter 114 will be clocked once and only once during each television horizontal sweep period.

In the arrangement of FIG. 9, the output signal supplied by exclusive-OR gate 118 is utilized as the least significant bit of the nine-bit read row address and the output of read row counter 114 supplies the remaining eight-bits. Since, exclusive-OR gate 118 is, in effect, enabled and disabled by the television system ODDFLD signal, it can be recognized that the supplied address signal will include only even row addresses during one television video field and only odd row addresses during the other video field in a manner compatible with the 2:1 interlace of conventional television systems. As is depicted in FIG. 9, the seventh and eighth bits of the signal provided by read row counter 114 (eighth and ninth bits of the read row address) are connected to the input terminals of a NAND gate 120, having the output terminal thereof connected to the second input terminal of NAND gate 112 and connected to a second enable terminal of counter 114 (ENP terminal via an inverter circuit 122). Regardless of whether successively increasing or successively decreasing read row addresses are provided, the seventh and eighth bits of read row counter 114 will be high only when a complete row of image information has been processed, i.e., when an address having a decimal equivalent of 384 is reached. This means that NAND gate 112 will cause the ACTIVEROW signal to switch to a logical low level as soon as counter 110 provides the carry signal and that the ACTIVEROW signal will remain low until the read row address generated by exclusive-OR gate 118 and counter 114 reaches 384. When this occurs, inverter circuit 122 disables read now counter 114 until the nextmost television frame begins and counter 110 generates another carry signal.

Referring now to FIG. 10, the depicted circuit for generating a sequence of image memory column addresses as each row of image information is read from the system image memory and processed utilizes an eight-bit read column counter 124, which operates so that the first seven bits of the output signal provides the image memory row addresses (RDCA). In addition, a four-bit mapping address counter 126 operates to provide a column address signal for accessing the mapping command that is associated with each read column address supplied by read column counter 124. As shall be described in more detail relative to FIG. 16, the particular ROM that is employed in the subject embodiment of the invention to store the mapping commands for associated addresses of the system image memory is configured for an eight-bit word length. Since the mapping commands are two-bit words, the mapping address counter 126 of FIG. 10 is arranged to select successive groups of four mapping command signals and, as described in the following paragraphs, the various gate circuits of FIG. 10 supply logic signals which result in the selection of the proper mapping command within each selected group of mapping commands. As is indicated in FIG. 10, both read column counter 124 and mapping address counter 126 are clocked by the previously-mentioned PTMCK signal, which enters the logical high state for a short time (one period of the system output clock), during each time interval wherein a word of image information is clocked into the system output FIFO a number of times equal to the appropriate mapping value. Thus, in effect, read column counter 124 selects the image information within the particular row of the image memory being processed by selecting the appropriate column address and, after the period of time required to map that word of image information into the display sector (television-compatible signal), addresses the nextmost word of image information.

To initialize the circuit of FIG. 10 for the processing of each row of stored image information, the load (LD) terminals of both read column counter 124 and mapping address counter 126 are connected for receiving the INIT signal. As was described relative to the display format of FIG. 5 and as shall be described in detail relative to the circuit of FIG. 18, the INIT signal momentarily changes states when the image information used in forming a particular TV line has been coupled to the system FIFO. Thus, read column counter 124 and mapping address counter 126 are initialized at an appropriate count as soon as each row of image information has been processed.

With respect to the count that is initially loaded into read column counter 124, the circuit of FIG. 10 is configured to permit selective left-to-right reversal of system display so that the display sector 80 of FIG. 5 can be selectively "reversed" to place the right-hand boundary edge 88 of the depicted format at the left side of the TV screen. Since the embodiment under consideration employs 128 scanning paths, column address counter 124 must operate to supply column addresses that are incremented upwardly from zero to 127 or are decremented downwardly from 127 to zero. Further, since the embodiment of the invention being described requires four PTMCK periods to load signals into the pipeline structure that is utilized to map each word of image information into the required number of pixels, the circuit of FIG. 10 is arranged to initialize read column counter 124 at a count four less than that required to produce the first valid read column address.

In the arrangement of FIG. 10 the above-noted left-to-right reversal of the display sector is controlled by a logic signal denoted LRREV that is coupled directly to the up/down terminal (U/D) and to the third through seventh input bit of read column counter 124. Thus, when the LRREV signal is at a logical high level, read column counter 124 is initialized at a count of 124 each time the INIT signal goes low then increments upwardly with each PTMCK pulse. On the other hand, since the LRREV signal is coupled to the first, second and eighth input bits of read column counter 124 via an inverter 128, the counter will be initialized at a count of 131 when the LRREV signal is at a logic low level and will be decremented downwardly with each subsequent PTMCK pulse. Since, however, only the first seven bits of the eight-bit signal provided by read column counter is coupled to the system address multiplexer (32 in FIG. 1) for selection of a word of stored image information, the initial column address corresponds to the decimal equivalent 3, which provides the required four clock periods of invalid addresses to initialize the pipeline signal path prior to counting downwardly from column address 127 to column address 0.

In addition to the above-mentioned four counts of read column counter 124 that are required to initialize the pipeline processing employed in the embodiment of the invention being discussed, two counts (two PTMCK periods) are required after generation of the last valid column address (127 or 0, depending on the left-to-right display orientation) in order to complete the mapping sequence that couples the last word of each row of stored memory information into the system FIFO. To provide this additional delay, the arrangement of FIG. 10 includes an exclusive-OR gate 130 having one input terminal thereof connected for receiving the eighth bit of the parallel format output signal provided by read column counter 124 and the second input terminal connected to the output terminal of inverter 128. The output terminal of exclusive-OR gate 130 is connected to the input terminal of a type-D flip-flop 132 that has its output terminal (Q) connected to the input terminal of a second type-D flip-flop 134.

Examining the above-described interconnection of read column counter 124, exclusive-OR gate 130 and flip-flops 132 and 134, it can be noted that, regardless of the selected left-to-right display orientation, the signal supplied by exclusive-OR gate 130 (denoted as the STARTUPA2 signal in FIG. 10), will be at a logical high level only when the first seven bits of the read column counter 134 correspond to a valid image memory column address (i.e., an address between 0 and 127). Since flip-flops 132 and 134 are clocked by the PTMCK signal, it can also be recognized that the signal supplied by flip-flop 134 (denoted as the STARTUP signal in FIG. 10) reverts to a logical low level two PTMCK periods after STARTUPA2 reverts to a logical low level. As noted in FIG. 10, the STARTUP signal is coupled to the mapping circuit of FIG. 16, which will be described in detail hereinafter.

To cause read column counter 124 to stop counting after the number of column addresses required to process one complete line of the television display have been generated (i.e., required to access one complete row of stored image information), the arrangement of FIG. 10 includes two exclusive-OR gates 136 and 138, an inverter circuit 140 and a three-input negative NAND gate 142. In the depicted arrangement, one input terminal of exclusive-OR gate 136 is connected to the seventh bit location of the parallel format address output of read column counter 124; one input terminal of exclusive-OR gate 138 is connected to the second bit location of the address sognal provided by read column counter 124; and the remaining input terminal of exclusive-OR gate 136 and exclusive-OR gate 138 is connected to the output of inverter 128 to receive the inverted left-to-right orientation selection signal ($\overline{LRREV}$). The output terminal of three-input negative NAND gate 142 is connected to the enable terminal (EN) of read column counter 124 with the input terminals of negative NAND gate 142 being connected to the output terminal of exclusive-OR gate 130 (STARTUPA2 signal); the output terminal of exclusive-OR gate 136; and to the output terminal of the inverter 140, which has the input terminal thereof connected to the output terminal of exclusive-OR gate 138. Utilizing conventional logic truth tables or other means it can be recognized that negative NAND gate 142 will only supply a logical high signal when an invalid read column address is being supplied (i.e. STARTUPA2 is at a logical low level) and read column counter 124 simultaneously supplies a count that corresponds to 2 or 125. Since, read column counter 124 will be disabled when the signal provided by negative NAND gate 142 goes high, no read column addresses will be provided after the required group of 128 addresses have been supplied until read column counter 124 is initialized by the nextmost INIT pulse and the sequence for processing the next row of stored image information begins.

As previously mentioned, the preferred embodiments of the invention minimizing mapping memory requirements by storing two-bit mapping commands for the image memory addresses associated with one-half of the symmetric display sector 80 of FIG. 5 (i.e., for the image memory storage addresses associated with either the left half or right half plane) and utilizes the symmetry of the system surveillance region and display sector to produce the mapping commands for the other half plane. Thus, in an embodiment such as that being described wherein 128 scanning paths (and, hence, 128 image memory column addresses) are employed and wherein the signal reflection associated with each scanning path is processed to provide 384 digital signal samples (hence, yielding 384 rows of image information), a mapping memory having 384 rows and 64 columns can be employed. When a 384×64 array representing the left-hand plane of the display sector is employed, it can be recognized that image memory row addresses generated by the arrangement of FIG. 9 will be identical to the row addresses necessary to access the associated mapping commands that are stored within the system mapping memory (mapping ROM 60 in FIG. 1). On the other hand, the proper sequence of column addresses for the stored mapping commands corresponds to the decimal sequence (0, 1, 2, ..., 63, 63, 62, ..., 0) as the image memory read column addresses supplied by counter 124 sequence from 0 to 127. Further, in an embodiment of the type being described, wherein two-bit mapping command signals are employed and the mapping ROM is organized on the basis of an eight-bit word, a group of four mapping commands is accessed with each mapping address that is supplied by mapping address counter 126. Thus, in the subject embodiment of the invention, mapping address counter must count (0, 1, 2, ... 15, 15, 14, ..., 0) in synchronism with every fourth count of read column counter 124 (i.e., in synchronism with image memory row addresses having decimal equivalants (3, 7, 11, ..., 127)) to sequentially access eight-bit digital words that include four mapping commands and, between each count of mapping address counter 126, must simultaneously generate signals for sequentially accessing the two-bit mapping commands within an accessed group in synchronism with the image memory read column addresses supplied by read column counter 124.

In the arrangement of FIG. 10, the requirement that memory address counter 126 be incremented once each time read column counter 124 supplies four image memory column addresses is effected by a NAND gate 144 having the output terminal thereof connected to an enable terminal (ENT) of mapping address counter 126; one input terminal thereof connected to the output terminal of exclusive-OR gate 138; and the second input terminal thereof connected to the output terminal of an exclusive-OR gate 146. Since the two input terminals of exclusive-OR gate 146 are respectively connected for receiving the least significant bit of the image memory column address and the $\overline{LRREV}$ signal, it can be recognized that the signal supplied by exclusive-OR gate 146 will be at a logical high level only when the image memory column address does not have an even-valued decimal equivalent. Since the two input terminals of exclusive-OR gate 138 are respectively connected for receiving the $\overline{LRREV}$ signal and the secondmost significant bit of the image memory column address signal, it can be recognized that NAND gate 144 will supply a signal (denoted as the MAPSTEP signal in FIGS. 10 and 11) that is at a logical low level for one image memory column address (one PTMCK period ) during each sequence of four memory addresses (four PTMCK periods). Since the signal supplied by NAND gate 144 enables mapping address counter 126 and since mapping address counter 126 is clocked by positive transitions of the PTMCK signal, it can be noted that the mapping address (MAPA) will be incremented (or decremented) once each time read column counter 124 generates four successive image memory column addresses.

To provide the required logic signals for sequentially addressing the four mapping commands that are accessed with each mapping address (MAPA) supplied by mapping address counter 126, the arrangement of FIG. 10 includes two exclusive-OR gates 148 and 150 that are connected so as to collectively supply a two-bit digital word that cycles through the equivalent decimal sequence (0, 1, 2, 3) for each mapping address signal, MAPA, when the left-half plane of the display sector is being formed and provides a two-bit digital signal that corresponds to the equivalent decimal sequence (3, 2, 1, 0) when a group of four mapping commands is selected by the mapping address counter and the right-half plane of the display sector is being formed. In this arrangement, one terminal of exclusive-OR gates 148 and 150 is connected to the output terminal of exclusive-OR gate 136 which provides a logical low signal whenever read column counter 124 supplies a valid image memory address that is associated with the left-half plane of the display sector (i.e., an address having a decimal equivalent in the range 0 to 63 when counter 124 counts upwardly and a decimal equivalent within the range 127 to 64 when counter 124 counts downwardly). Since the second input terminal of exclusive-OR gate 148 is connected to the output of exclusive-OR gate 146 and the second input terminal of exclusive-OR gate 150 is connected to the output terminal of exclusive-OR gate 138, it can be shown that that the two-bit MAPSEL signal collectively provided by exclusive-OR gates 148 and 150 exhibits the above-discussed synchronous count that is required to select an appropriate mapping command from each group of four mapping commands that are selected by each mapping address signal that is supplied by mapping address counter 126.

To cause mapping address counter 126 to supply the previously-discussed sequence of mapping address signals which corresponds to the decimal equivalent sequence (0, 1, . . . , 15, 15, . . . , 1, 0), the arrangement of FIG. 10 includes a J-K flip-flop 152 that is reset by the INT signal each time a row of stored image information has been processed to provide the portion of the display sector associated with one line of the television display. The K input of flip-flop 152 is connected for receiving a signal at the logical low level and an inverter circuit 154 couples the carry terminal of mapping address counter 126 to the J input terminal of flip-flop 152. Since flip-flop 152 is in the reset state when the four-bit mapping address counter 126 is loaded with a count of zero, the $\overline{Q}_{signal}$ of flip-flop 152, which is connected to the up/down terminal (U/D) of mapping address counter 126, causes the mapping counter to count upwardly. Since the signal at the carry terminal of mapping address counter 152 is high as the counting sequence begins, the signal coupled to the J input of flip-flop 152 is at a logical low level and flip-flop 152 remains in the reset state as successive PTMCK pulses cause mapping address counter 126 to count upwardly. When the mapping address supplied by counter 126 reaches a count having a decimal equivalent value of 15, the signal provided at the carry terminal of mapping address counter 126 goes low so that inverter 154 couples a logical high signal to the J input terminal of flip-flop 152. Since the output terminal of inverter 154 is also connected to an enable terminal (ENT) of mapping address counter 126, the logic level high signal disables the counter and the count remains 15 throughout the nextmost PTMCK signal period. Since the J input of flip-flop 152 is high at the positive transition of this nextmost PTMCK signal, flip-flop 152 changes states to couple a logic level low to the U/D terminal of mapping address counter 126. This causes the mapping address counter 126 to enter a count-down state and the CARRY signal goes high to remove the logical high signal from the J imput terminal of flip-flop 152. Thus, mapping address counter 126 counts downwardly from 15 with each successive PTMCK signal in the desired manner.

In addition to the above-discussed features for synchronously selecting image memory column addresses and the corresponding mapping addresses, the arrangement of FIG. 10 includes an inverter 156 and a two-input NOR gate 158. The input terminal of inverter 156 is coupled to the output terminal of exclusive-OR gate 146 to thereby receive a signal that is logically high each time read column counter 124 supplies an odd-valued image memory column address. As shall be described in more detail relative to FIGS. 12 and 18, the image memory of the embodiment being discussed is formed by two separate memory units with one memory unit being utilized for odd-valued column addresses and the second memory unit being utilized for even-valued image memory column addresses. This permits the system to simultaneously access two words of image information (one from an even-valued address column and one from an odd-values column address) during each memory read cycle so that the necessary number of read and write cycles can be effected within each horizontal sweep period of the television display system. As is shown in FIG. 10, the two input terminals of NOR gate 158 are respectively coupled to the output terminals of exclusive-OR gate 138 and exclusive-OR gate 146. NOR gate 158 supplies a signal that is in the logic level high state for one PTMCK period out of every four PTMCK periods (denoted the ROMCLK signal in FIG. 10), which is utilized to enable the system mapping ROM (60 in FIG. 1) during the accessing of each group of four mapping command signals that are stored at the address supplied by mapping address counter 126.

Figure 11:
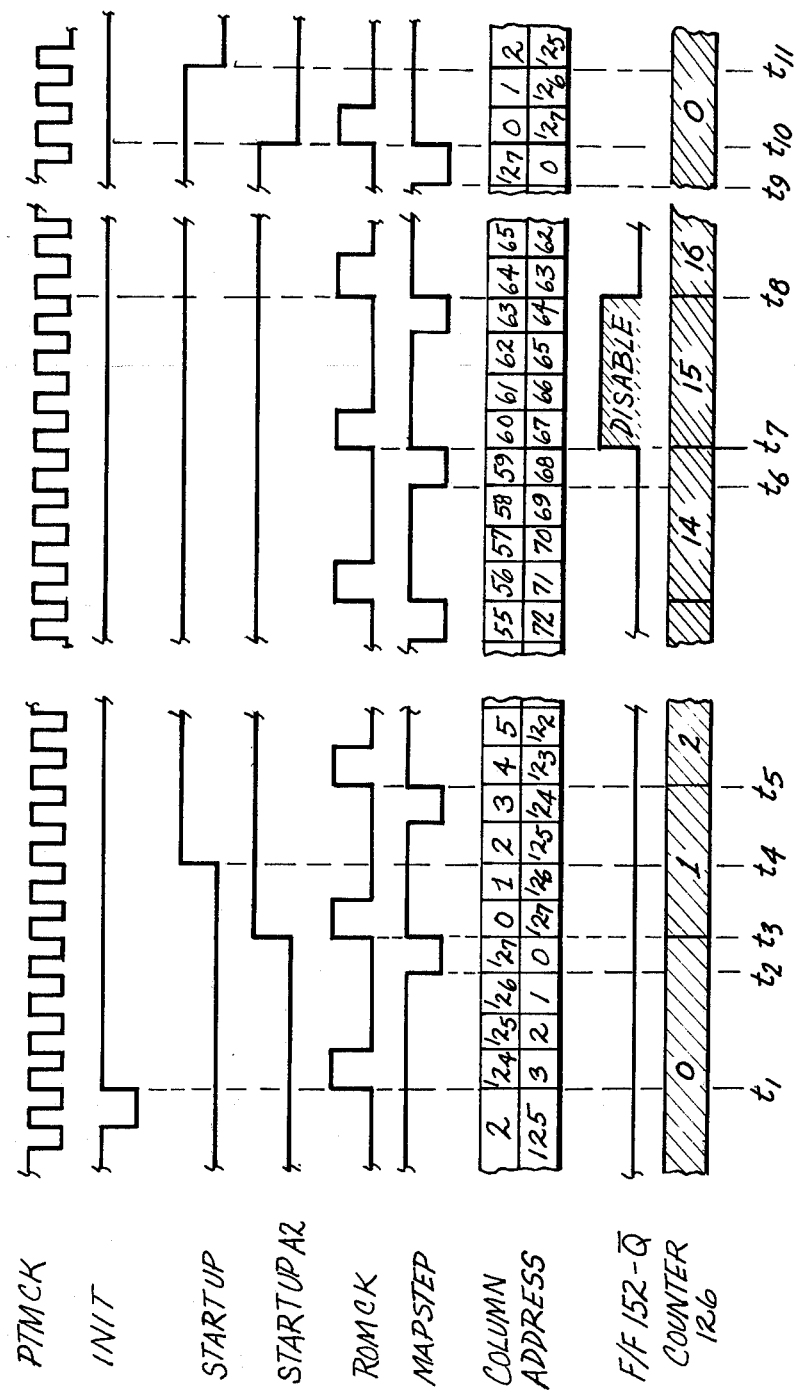
FIG. 11 is a timing diagram that depicts the signals associated with the operation of the circuit depicted in FIG. 10.

The timing diagram of FIG. 11 illustrates operation of the circuit of FIG. 10 during the accessing and processing of one row of stored image information. First, as previously mentioned, depending on the logic state of the LRREV signal, the column address supplied by column address counter 124 will be maintained at 2 or 125 until the counter is loaded with a count of 124 or 3 when the INIT signal provides a logic level low for one period of the PTMCK signal (at time $t_1$ in FIG. 11). Considering, for convenience, the operation that occurs when the LRREV signal is at a logical high level to cause the read column counter 124 to count upwardly, the INIT pulse initializes counter 124 to a column address of 124 and initializes mapping address counter 126 to a mapping address of zero. Since the input signals supplied to exclusive-OR gates 138 and 146 are at a logic level low, NOR gate 158 causes the ROMCLK signal to be logically high during this particular address period. Since both inputs to exclusive-OR gate 130 are at a logic level low, the STARTUPA2 and STARTUP signal are both low to indicate that read column counter 124 is supplying an invalid image memory column address. Read column counter 124 is then incremented by the positive transition of each PTMCK pulse. Since the output signals provided by exclusive-OR gates 138 and 146 are both high when read column counter 124 reaches a count of 127 (time $t_2$ in FIG. 11), the MAPSTEP signal provided by NAND gate 144 goes low until the next PTMCK pulse causes read column counter 124 to supply a column address having a decimal equivalent of zero. Since the eighth bit of read column counter 124 is coupled to one input terminal of exclusive-OR gate 130, the STARTUPA2 signal goes high at a count of zero (time $t_3$ in FIG. 11) to indicate that the image memory column addresses being supplied by read column counter 124 are valid. In addition, the ROMCLK signal is at the logical high level while read column counter 124 is at a count of zero since exclusive-OR gates 138 and 146 both supply a signal that is logically high to the input terminals of NOR gate 158.

As subsequent words of image information are processed and additional PTMCK pulses are supplied to the circuit of FIG. 10, read column counter 124 continues to increment the image column address (RDCA) to successively higher values. Since two PTMCK pulses are required to clock the logic level low supplied by STARTUPA2 through flip-flops 132 and 134, the STARTUP signal goes low when read column counter supplies an address having the decimal equivalent 2 (time $t_4$ in FIG. 11). Moreover, since the MAPSTEP signal supplied by NOR gate 158 will be low whenever both signals supplied by exclusive-OR gates 138 and 146 are high, it can be recognized that the MAPSTEP signal will be low for the periods of the PTMCK signal that cause read column counter 124 to supply image memory column addresses corresponding to 3, 7, 11, . . . , 127. Since mapping address counter 126 is enabled while the MAPSTEP signal is low and is clocked by the positive transition of the PTMCK signal the mapping address supplied by mapping address counter 126 is incremented with each group of four column addresses in the desired manner (e.g., at times $t_3$ and $t_5$ of FIG. 11).

When the column address supplied by read column counter 124 corresponds to the decimal equivalent 59 (time $t_6$), the MAPSTEP low condition and positive transition of the PTMCK signal cause mapping address counter 126 to reach a count of 15 and the signal supplied at the center carry terminal is inverted by inverter 154 to disable mapping address counter 126. Since the logical high signal provided by inverter 154 is also coupled to the J input terminal of flip-flop 152, the next positive transition of the PTMCK signal causes the $\overline{Q}$ signal provided by flip-flop 152 to go low thereby supplying a "count-down" signal to the U/D input terminal of mapping address counter 126. Since the signal at the carry terminal of mapping counts 126 remains at a logical low level, mapping address counter 126 remains disabled for the four PTMCK periods that correspond to image memory column addresses 60–63 (the time interval $t_1$–$t_8$ in FIG. 11) and the MAPSTEP signal that occurs coincident with image memory column address 63 does not cause mapping address counter 126 to decrement. This PTMCK pulse does, however, cause mapping address counter 126 to enter the count-down mode and the signal at the counter carry terminal returns high to, in turn, couple a logical low signal to the ENP enable terminal of mapping address counter 126 to thereby enable the counter for counting down from 15 to 0 with the next sixteen MAPSTEP signals.

As is further illustrated in FIG. 11, when read column counter 124 supplies an image memory column address of 127 (time $t_9$), the MAPSTEP signal is at a logical low level and the nextmost positive transition of the PTMCK signal causes read column counter 124 to reach a count of 127 and mapping address counter 126 to reach a count of zero. Since the next PTMCK signal causes read column counter to reach a count of zero (time $t_{10}$) so that the signals that are coupled to exclusive-OR gate 130 are at a logical low level, the STARTUPA2 signal reverts to the logical low state to indicate the completion of the valid image memory column addresses. Since two PTMCK pulses are required to clock the transition of the STARTUPA2 signal through flip-flops 132 and 134, the STARTUP signal reverts to logic level low as the read column counter reaches a count of 2 (time $t_{11}$ in FIG. 11). At this point, all three inputs to negative NAND gate 142 are low and read column counter 124 is disabled until the next INIT signal reinitializes read column counter 124 at a count of 124 to begin accessing and processing the next row of stored image information.

Figure 12:
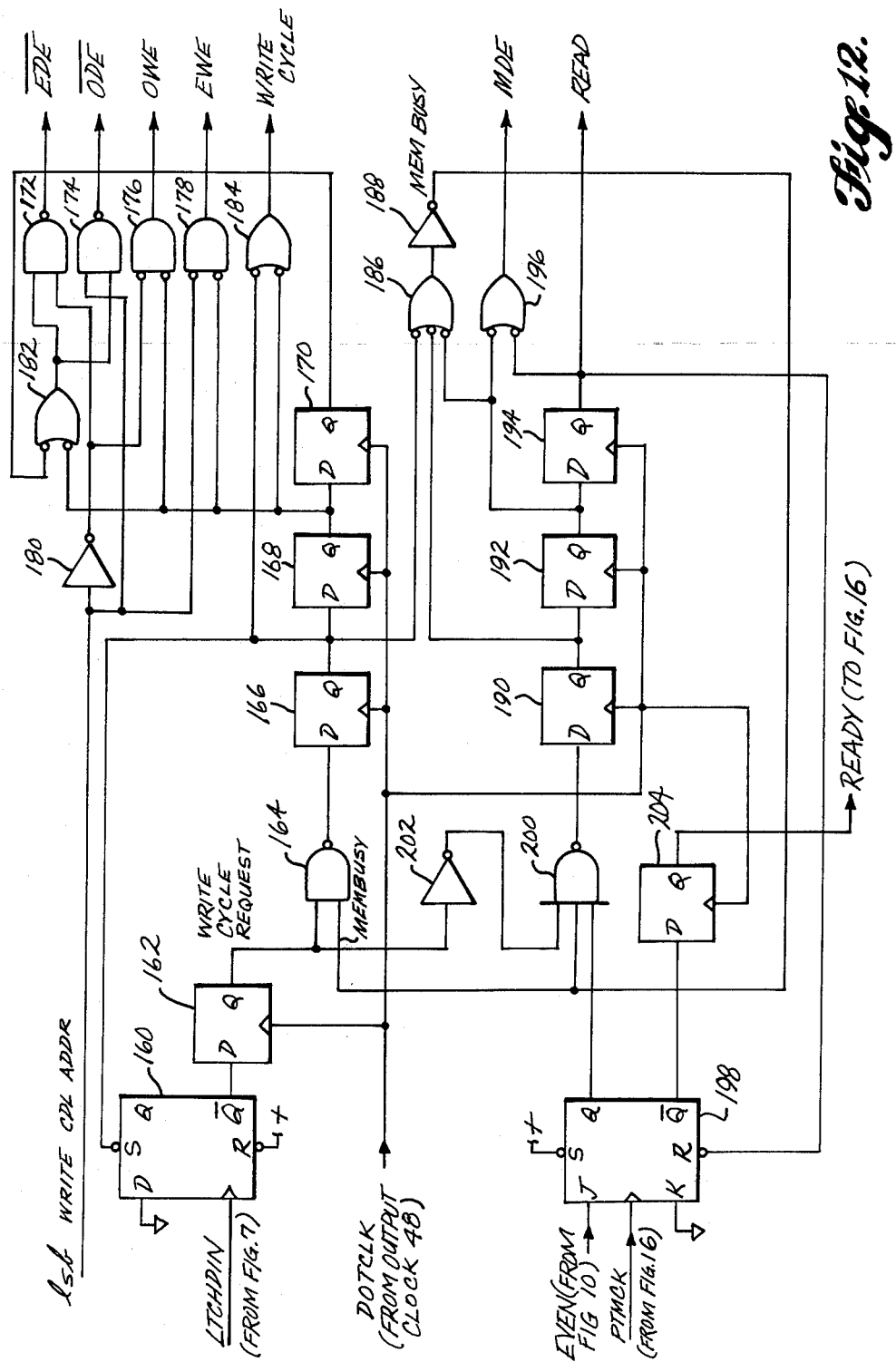
FIG. 12 schematically depicts a memory control circuit that is used in conjunction with the circuits of FIGS. 7, 9 and 10 for initiating the image memory read and write cycles.

FIG. 12 schematically depicts an image memory control circuit (35 in the block diagram of FIG. 1) which operates in conjunction with the addressing circuits of FIGS. 7, 9 and 10 to initiate image memory write cycles and image memory read cycles in a manner which meets the worst-case requirements of the embodiment of the invention being described. In this arrangement, the LTCHDIN signal, which is supplied by the write row address counter of FIG. 7 and serves as a "write cycle request", is coupled to the clock input of a type-D flip-flop 160 having the D input terminal thereof connected to a logical low potential. As previously described, the LTCHDIN signal is at a logical low for one SMPCLK period each time the write row count unit of FIG. 7 has provided four consecutive image memory row addresses to thereby indicate that a new group of four digital words of image information is available for parallel loading into the image memory. Since the D input terminal of flip-flop 160 is connected to a logical low signal level, the positive transition of the LTCHDIN signal causes the signal provided at the $\overline{Q}$ output of flip-flop 160 to go high. The nextmost positive transition of the system output clock (denoted as the DOTCLK signal in FIG. 12) latches the logical high signal provided by flip-flop 160 into a type-D flip-flop 162. A NAND gate 164, having one input terminal connected for receiving a MEMBUSY signal that is low whenever the system is currently executing an image memory read or write cycle and the second input terminal thereof connected to the output terminal (Q) of flip-flop 162, provides a logical low signal to the D input terminal of a type-D flip-flop 166 as soon as the image memory write cycle can be initiated. The output terminal (Q) of flip-flop 166 is connected to the D input terminal of a type-D flip-flop 168, which, in turn, has the output terminal thereof connected to the D input terminal of a third type D flip-flop 170. Flip-flops 166, 168 and 170 are clocked by the system DOTCLK signal and form a three-bit shift register which causes the length of each image memory write cycle to be equal to three DOTCLK periods (slightly less than 300 nanoseconds in the subject embodiment).

As the logical low provided by NAND gate 164 of FIG. 10 is clocked through the flip-flops 166, 168 and 170, the arrangement of FIG. 12 provides the control signals necessary to write the digital words of image information provided by the surveillance system into the system image memory at the addresses provided by the write row count unit depicted in FIG. 7. In this regard and as previously mentioned, the image memory of the embodiment being described is formed by two separate memories with one of the memories including odd-valued image memory column addresses and the second memory unit being used to store image information associated with even-valued image memory column addresses. To enable and control the proper memory unit of such an image memory, the arrangement of FIG. 10 utilizes the least significant bit (lsb) of the write column address to enable and disable a pair of NAND gates 172 and 174 and two negative NAND gates 176 and 178. In particular, the lsb of the write column address is connected directly to one input terminal of NAND gate 174 and negative NAND gate 178 and is connected to one input terminal of NAND gate 172 and negative NAND gate 176 via an inverter circuit 180. As is also illustrated in FIG. 12, the second input terminal of negative NAND gates 176 and 178 are commonly connected to the output terminal (Q) of flip-flop 168 and the second input terminal of NAND gates 172 and 174 are commonly connected to the output terminal of a negative NOR gate 182 having its input terminals connected to the Q output terminal of flip-flop 168 and the Q output terminal of flip-flop 170.

Figure 13:
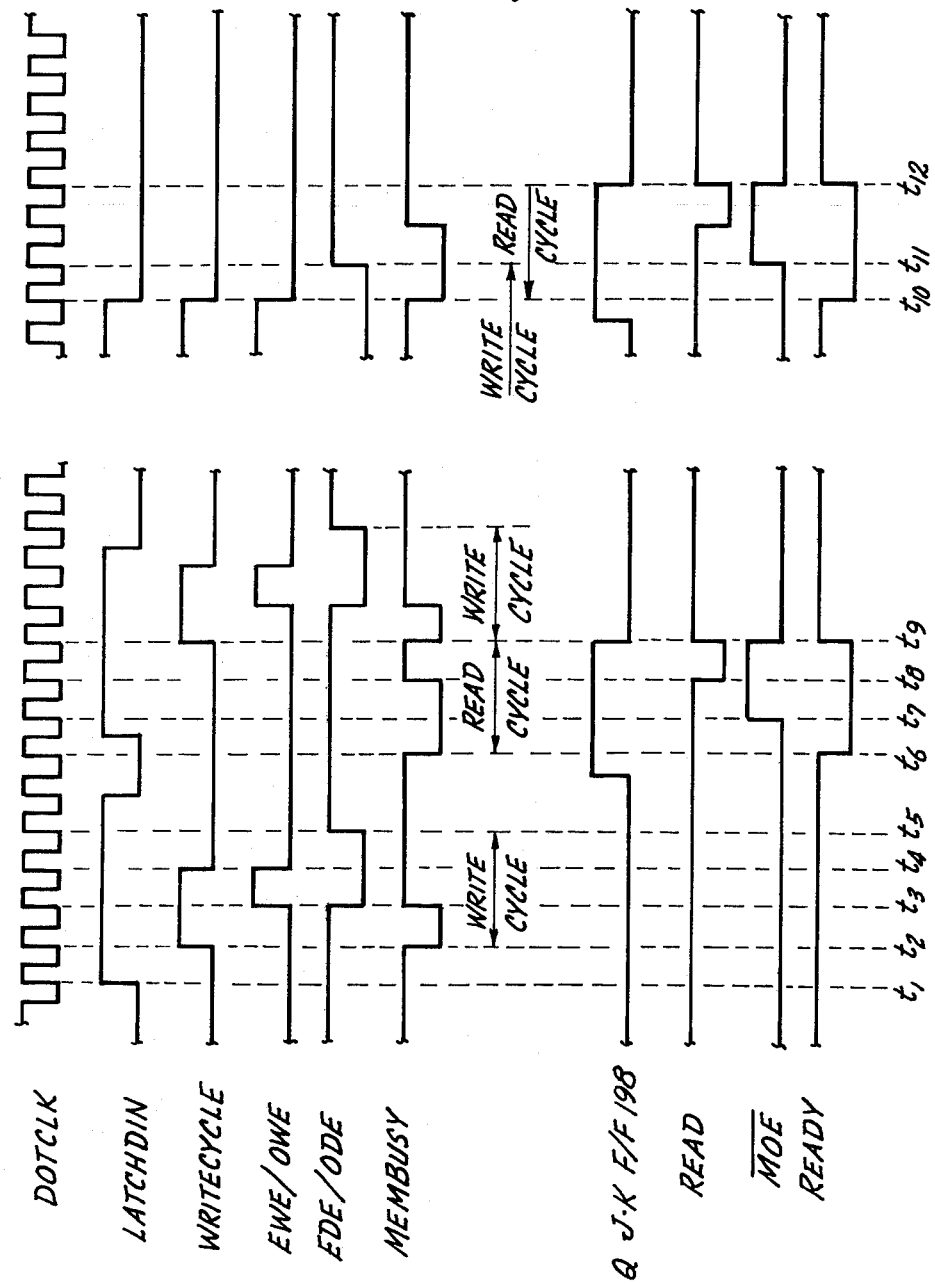
FIG. 13 depicts signals associated with the operation of the control circuit depicted in FIG. 12.

With reference to FIG. 12 and the associated timing diagram of FIG. 13, when the logical low signal provided by NAND gate 164 is clocked into flip-flop 160 by the first DOTCLK of the image memory write cycle (time $t_1$ in FIG. 13), a logical low signal is clocked into flip-flop 162. The positive-going transition of the next DOTCLK pulse (time $t_2$) clocks a logical low signal into flip-flop 166, as long as the MEMBUSY signal is not low immediately prior to time $t_2$. The logical low signal provided at the output of flip-flop 166 is coupled to the set terminal (S) of flip-flop 160 and sets the flip-flop in preparation for the initiation of subsequent memory write cycles as additional LTCHDIN signals are provided by the write row address circuit of FIG. 7. In addition, the output terminal of flip-flop 166 is coupled to one input terminal of a negative NOR gate 184 and to one input terminal of a three input negative NOR gate 186. Thus, as the logic level low is clocked into flip-flop 166 at time $t_2$ of FIG. 13, the signal provided by negative NOR gates 184 and 186 go high. As indicated in FIGS. 12 and 13, the signal provided by negative NOR gate 184 is identified as the WRITE CYCLE signal and is connected to the SEL terminal of memory address multiplexer 32 of FIG. 1 so as to selectively provide column addresses to image memory 24 during write cycles (WRITE CYCLE signal high) and a row address during each image memory read cycle (WRITE CYCLE signal low). As is further indicated in FIGS. 12 and 13, the signal provided by negative NOR gate 186 is inverted by an inverter circuit 188 to form the previously-mentioned MEMBUSY signal which goes low to disable NAND gate 164 until a new image memory write or read cycle can be initiated. When the next positive transition of the DOTCLK signal occurs (at time $t_3$ in FIG. 13), the logical low previously held by flip-flop 166 is clocked into flip-flop 168 and the logical high at the output of NAND gate 164 is clocked into flip-flop 166. As is shown in FIG. 13, the write cycle signal remains high during this period of the DOTCLK signal since the output terminal of flip-flop 168 is now low. The MEMBUSY signal reverts to a logical high level, however, since the logical high at the output of flip-flop 166 causes negative NOR gate 186 to supply a logical low signal. When the output of flip-flop 168 goes low NAND gates 176 and 178 are enabled and, depending on the logical state of the lsb of the write column address, either NAND gate 176 or NAND gate 178 will supply a logic level high signal. More specifically, if the lsb of the write column address is low to indicate that the image information being supplied should be written into an associated column of image memory having an even-valued address, NAND gate 178 will supply a logic level high signal (denoted EWE) for enabling the write circuitry within the memory unit being used for storage of even-numbered scanning paths. On the other hand, if the lsb of the write column address is high, inverter 180 will cause the signal at the second input terminal of NAND gate 176 to go low and NAND gate 176 will supply a logical high signal (OWE) for enabling the memory unit utilized for storing image information associated with odd-valued scanning paths. In either case, and as is shown in FIG. 13, one of the NAND gates 176 and 178 will supply a logical high signal to enable the appropriate memory unit when the logical low signal is clocked into flip-flop 168 at time $t_3$.

The clocking of a logical low signal into flip-flop 168 also causes either NAND gate 172 or NAND gate 174 to supply a logical low signal that is utilized to enable the tri-state buffers which drive the image information into the appropriate addresses of the image memory. In particular, when the output of flip-flop 168 goes low, negative NOR gate 182 supplies a logic level high signal to one input terminal of NAND gates 172 and 174. If the lsb of the write column address signal is high, this will cause NAND gate 174 to supply a logical low signal (ODE in FIG. 12) for enabling the tri-state buffers associated with the memory unit that stores image information associated with odd-valued image memory column addresses. On the other hand, if the lsb of the write column address is low, inverter 180 causes NAND gate 172 to supply a logically low signal (EDE) for enabling the tri-state buffers for driving data into the memory associated with even-valued column addresses.

As is illustrated in the timing diagram of FIG. 13, when the next positive transition of the DOTCLK signal clocks a logic level high into flip-flops 166 and 168 and a logic level low into flip-flop 170 (at time $t_4$ of FIG. 13), both the WRITE CYCLE and the output of the activated write enable signal (OWE or EWE) revert to a logical low level. In particular, the logical high at the output of flip-flop 168 disables both NAND gates 176 and 178 and causes both input terminals to negative NOR gate 184 to be logically high.

The next positive transition of the DOTCLK signal (time $t_5$) clocks a logic level high signal into flip-flop 166 and causes the logic level high signals previously held by flip-flops 166 and 168 to be shifted into flip-flops 168 and 170. Thus, all three flip-flops 166, 168 and 170 return to the logical high state and both input terminals to negative NOR gate 182 are high. This causes negative NOR gate 182 to disable NAND gates 172 and 174, which, as is shown in FIG. 13, terminates the enable signals to the tri-state buffers of the memory units (the ODE and EDE signals). As also can be noted in FIG. 13, the image memory write cycle thus extends over three periods of the DOTCLK signal which occur in the time interval $t_5 - t_2$.

To generate an image memory read cycle that is substantially three DOTCLK periods in duration, the arrangement of FIG. 12 includes a three-stage shift register that is formed by three interconnected type-D flip-flops 190, 192 and 194. As is shown in the drawing, the output terminals of flip-flops 190 and 192 are coupled to two input terminals of three input negative NOR gate 186 to generate the previously-mentioned MEMBUSY signal during each read cycle and the output terminals of flip-flops 192 and 194 are connected to the input terminals of a two-input negative NOR gate 196 which enables tri-state buffers for reading data from the system image memory. In this arrangement, the $\overline{\text{EVEN}}$ signal supplied by the read column count unit of FIG. 10 with every other image memory read address (each odd-valued address) is connected to the J input terminal of a J-K flip-flop 198 that is clocked by positive transitions of the system PTMCK signal and has the K input terminal thereof coupled to a logical low signal. The reset terminal (R) of flip-flop 198 is connected to the output terminal 194 so that flip-flop 198 will be reset upon the completion of each memory read cycle.

With flip-flop 198 reset and the $\overline{\text{EVEN}}$ signal high to indicate that two words of image information should be read from the system image memory, the nextmost positive transition of the PTMCK signal sets flip-flop 198 to initiate an image read cycle if the system memory is available. In particular, the logical high signal provided by the Q output terminal of flip-flop 198 is coupled to the D input terminal of flip-flop 190 by a three-input NAND gate 200 having the MEMBUSY signal coupled to one input terminal thereof and having the third input terminal thereof connected to the output of an inverter circuit 202 that receives the write cycle request signal generated by flip-flop 162. Thus, if a previously-initiated read or write cycle is not completed to the point that a new memory read cycle can be initiated or if a new memory write cycle has been requested, NAND gate 200 will, in effect, be disabled and will not couple the logical high signal produced at the Q output terminal of J-K flip-flop 198 to the D input terminal of flip-flop 190. If this is the case, the nextmost positive transition of the DOTCLK signal will clock a logical high into flip-flop 190 and will latch the logical low at the $\overline{Q}$ output terminal of flip-flop 198 into a type-D flip-flop 204. As is indicated in FIG. 12, the Q output of flip-flop 204 provides a READY signal to the mapping control circuitry of FIG. 16. As shall be recognized upon understanding the mapping control circuitry described relative to FIG. 16, the READY signal, in effect, interrupts the system mapping sequence if image information is not available for processing.

When (or as soon as) the MEMBUSY signal and the signal supplied by inverter 202 are at a logical high level, NAND gate 200 couples a logical low signal to the D input terminal of flip-flop 190. Thus, the nextmost positive transition of the DOTCLK signal (identified as time $t_6$ in FIG. 13) latches this logical low signal into flip-flop 190. Since the Q output terminal of flip-flop 190 is coupled to one input terminal of three-input negative NOR gate 186, the MEMBUSY signal goes low to prevent the circuit from responding to an additional memory read or write request. If the logical low produced at the $\overline{Q}$ output of J-K flip-flop 198 was not previously latched into flip-flop 204 while NAND gate 200 was in a disabled state, flip-flop 204 will cause the READY signal to go low at the same time that the MEMBUSY signal goes low.

With the MEMBUSY signal and READY signal in the logical low state as is indicated in FIG. 13, the next-most positive transition of the DOTCLK signal (time $t_7$) clocks the logical low signal held by flip-flop 190 into flip-flop 192. Since the MEMBUSY signal is low, a logical high is clocked into flip-flop 190. Since one input terminal of negative NOR gate 186 is connected to the Q output terminal of flip-flop 192, the MEMBUSY signal remains low. Further, since one input terminal of negative NOR gate 196 is connected to the Q output terminal of flip-flop 192, negative NOR gate 196 supplies a logical high signal (denoted as the MOE signal in FIG. 12) to enable the tri-state buffers utilized for reading image information from the system image memory.

The next positive transition of the DOTCLK signal (time $t_8$ in FIG. 13) shifts the logical low signal into flip-flop 194 and logical high signals into flip-flops 190 and 192. As is indicated in FIG. 13, the logical low at the Q output terminal of flip-flop 192 causes the MEMBUSY signal to return to the logical high level. The logical low that is latched into flip-flop 194 causes the MOE signal to remain at a logical high and is also supplied as the READ signal, which is coupled to the clock terminal of a type D latch circuit (not shown in FIG. 12). This latch circuit is connected to the data terminals of the system image memory (24 in FIG. 1) and loads the data that has just been read from memory as the READ signal returns to the high state (in synchronism with next positive transition of the DOTCLK signal (time $t_9$ in FIG. 13). This frees the system image memory for another read or write cycle as discussed above. Additionally, the logical low that is clocked into flip-flop 194 at time $t_8$ resets J-K flip-flop 198, in preparation for terminating the read cycle.

The next positive transition of the DOTCLK signal (at $t_9$ in FIG. 13) clocks a logical high into all three flip-flops 190, 192 and 194 to terminate the read cycle. flip-flop 196 returns high. Since both input terminals to negative NOR gate 196 are now at a logical high level the MOE signal returns low and the READ signal goes high. Further, since J-K flip-flop 198 is in the reset state immediately prior to time $t_9$, a logical high is clocked into flip-flop 204 so that the READY and READ signals go high in substantial synchronism with one another. The depicted arrangement then remains in the state described relative to time $t_9$ until a subsequent image memory read cycle is required (i.e., when the $\overline{\text{EVEN}}$ signal is at a logical high and a positive transition of the PTMCK signal occurs).

The timing diagram of FIG. 13 also illustrates operation of the image memory control circuit of FIG. 12 when an image memory write cycle is requested while a read cycle is in progress and operation of the circuit when an image memory read cycle is requested during an image memory write cycle. Referring first to the portion of FIG. 13 which depicts the above-discussed operation during an image read cycle, if the LATCH-DIN signal goes low to request an image write cycle but does not return high until a read cycle has been initiated (time $t_6$ in FIG. 13), the MEMBUSY signal will be low and the logical high signal supplied by flip-flop 160 and clocked into flip-flop 162 cannot be coupled through NAND gate 164 to initiate the requested write cycle. Since, as previously described, flip-flop 160 will not be returned to the set state until the requested write cycle is under way (when the logical low signal is latched into flip-flop 166), the Q output of flip-flop 162 will remain high until the requested image memory write cycle has begun. Since the MEMBUSY signal does not return high until the flip-flops 190 and 192 of the shift register configuration that implements an image read cycle both return to a logical high state, the initiation of the requested image memory write cycle is inhibited throughout a current image read cycle. In particular, as is shown in FIG. 13, the MEMBUSY signal will return to the logical high level after the first two DOTCLK periods of the image read cycle have elapsed (time $t_8$). When the next positive transition of the DOTCLK signal occurs (time $t_9$), the read cycle terminates in the previously-described manner and the logical low signal provided by NAND gate 164 is clocked into flip-flop 166 to initiate the requested write cycle. Thus, it can be recognized that a write cycle may occur immediately after an image read cycle so that, with respect to the subject embodiment, no more than approximately 300 nanoseconds elapses between the time four words of image information are made available by the surveillance system and the time at which the image memory write cycle for loading that information into the image memory begins.

As is indicated by the terminal portion of the timing diagram of FIG. 13, if an image read cycle is requested while an image write cycle is in progress, the read cycle will begin before the write cycle has ended. In particular, if an $\overline{\text{EVEN}}$ signal and a positive transition of the PTMCK signal set flip-flop 198 while a write cycle is in progress (time $t_{10}$ in FIG. 13), the requested image read cycle cannot begin until the MEMBUSY signal goes high. However, since, as previously described, the MEMBUSY signal returns to a logical high level following the first DOTCLK period of an image write cycle (not shown in the final sequence of FIG. 13), NAND gate 200 will supply a logical low level to flip-flop 190 prior to the positive transition of the DOTCLK signal that defines the final DOTCLK period of the current image write cycle. This means that the nextmost positive transition of the DOTCLK signal (at time $t_{10}$ in FIG. 13) will cause a logical low to be latched into flip-flop 190 to start the read cycle while the output of flip-flop 170 remains low to define the last DOTCLK period of the write cycle.

Having described the manner in which image information is written into the image memory of the subject embodiment of the invention on a column-by-column basis and the manner in which the stored words of image information that form a row of image memory storage and define one TV line of the display sector are accessed, a more detailed description of the mapping process and the manner in which it is implemented in the subject embodiment will be presented. In this respect it should be recalled that the processing of the stored image information that makes up the portion of the display sector within the nextmost horizontal sweep period of the system TV signal begins as soon as the INIT signal indicates that all image information that contributes to the display sector of a current line of the television display has been completed. As has also been described in relatively general terms, the processing of one row of stored image information in the embodiment being discussed includes the steps of: (a) determining the mapping value (pixel count) for the initial word of image information within the particular row of stored image information being processed; (b) causing the initial word of stored image information to be shifted into the system output FIFO a number of times identically equal to the associated pixel count; (c) accessing the two-bit mapping command signal associated with the nextmost stored location of the image memory (nextmost word of image information) and determining the associated pixel count from the mapping command and the present pixel count; (d) shifting the nextmost addressed word of image information into the system output FIFO a number of times equal to the associated pixel count; and (e) repeating steps (c) and (d) until all words of image information within the accessed row of the image memory have been processed or until the FIFO is filled with output data and it is necessary to interrupt the signal processing sequence until data is shifted from the FIFO to begin forming the video signal that represents the associated portion of the display sector.

As was described briefly relative to the display format depicted in FIG. 5 and the image memory addressing circuits of FIGS. 9 and 10, the mapping control circuit of the embodiment being described generates an ACTIVEROW signal that is low whenever the video signal being formed corresponds to a television line that intersects the system display sector (i.e., a television line that includes image information) and generates a ROWSTART signal when the image information of that particular line is to begin thus, in effect, defining the left-hand boundary of the display sector. As was previously mentioned, the PTMCK signal goes high for one DOTCLK period during each mapping sequence to initiate an image memory read cycle, cause the address circuits of FIGS. 9 and 10 to select the proper word of stored image information, and control the mapping sequence that shifts the accessed image information into the system output FIFO the required number of times.

Figure 14:
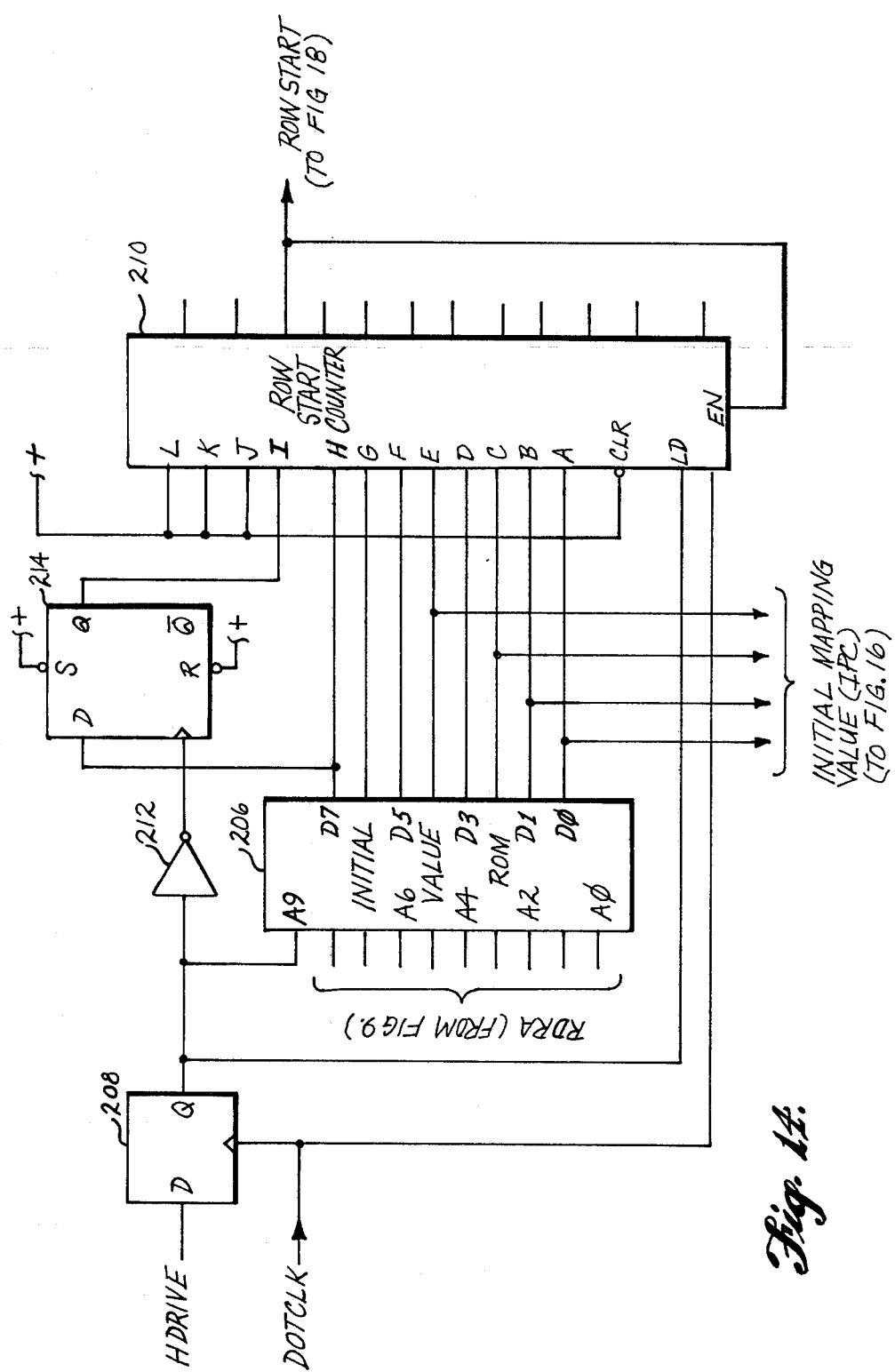
FIG. 14 schematically depicts a circuit arrangement for providing the initial mapping values that are utilized in one embodiment of the system depicted in FIG. 1.

FIG. 14 depicts a circuit of the type used in the subject embodiment for providing the mapping values of the initial words of image information for each row of stored image information. In addition, the arrangement of FIG. 14 provides the ROWSTART logic signal for starting the image-bearing portion of the system output signal at a point in time that corresponds to the left-hand boundary edge of the display sector. The arrangement of FIG. 14 utilizes a 1K × 8-bit read only memory (initial value ROM 206) with the mapping value for the first storage location of each of the 383 row addresses of the image memory and the most significant bit of a nine-bit image delay signal that indicates the time which the image should begin in that particular line of the system display being stored at addresses 512–895 (the image memory row address plus 512) and with the remaining eight bits of the image delay signal being stored at addresses that correspond to the associated image memory row address (i.e., 0–383). To access both the initial mapping value and the image delay signal prior to the beginning of the horizontal sweep interval in which the delay signal and the initial mapping value are to be utilized, the horizontal drive signal (HDRIVE) provided by the system TV sync generator (52 in FIG. 1) is coupled to the D input terminal of a type-D flip-flop 208 having the Q output terminal thereof connected to the load terminal (LD) of a row-start counter 210; to the ninth address bit of initial value ROM 206; and to the input terminal of an inverter circuit 212. Since flip-flop 208 is clocked by the DOTCLK signal, the Q output of flip-flop 208 remains high until the first positive transition of the DOTCLK signal after initiation of the HDRIVE retrace pulse latches a logical low into flip-flop 208 (time $t_1$ in the signal diagram of FIG. 15).

Figure 15:
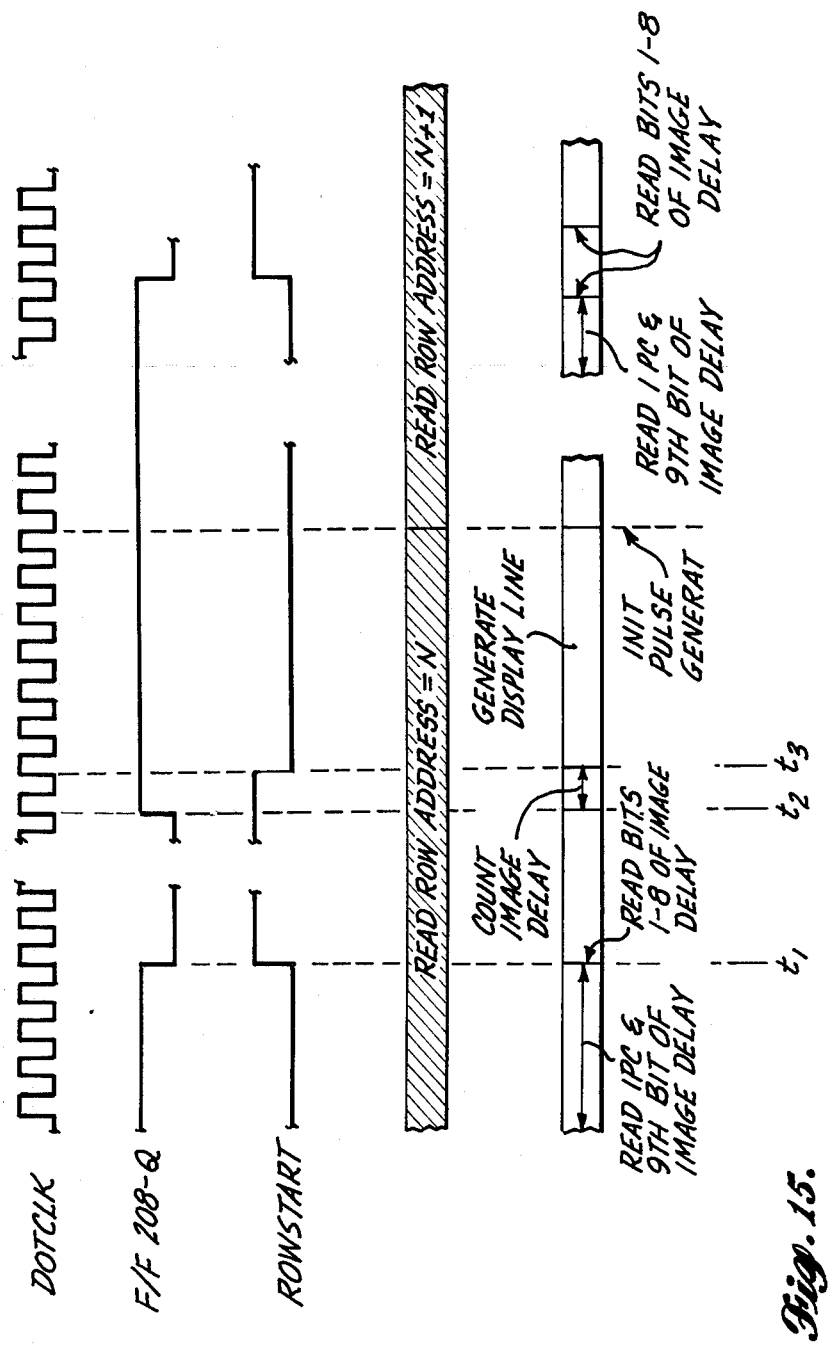
FIG. 15 is a timing diagram depicting the operation of the circuit arrangement of FIG. 14.

While the Q output terminal flip-flop 208 is high (prior to time $t_1$), an augmented address signal (having the decimal equivalent of 512 plus the image memory row address that is supplied by the read row address network of FIG. 9) is coupled to initial value ROM 206. The initial mapping value (IPC), which is stored at the first four bits locations of the augmented address, is thus made available and, as is indicated in FIG. 14, is coupled to the mapping control circuit of FIG. 16. At this same time, the ninth bit of the image delay signal, which is stored as the eighth bit of the data word associated with the augmented address, is made available at the D input terminal of a type-D flip-flop 214. Since flip-flop 214 is clocked by the signal provided by inverter 212, the ninth bit of the image delay signal is latched into flip-flop 214 as the logical low level caused by the HDRIVE retrace pulse is clocked into flip-flop 208 (time $t_1$ in FIG. 15). At this time the address signal supplied to initial value ROM 206 becomes equal to the image memory row address of the image information to be processed and the nine-bit image delay signal associated with that particular row of image information (and the corresponding line of the television display) is made available at the input terminals of rowstart counter 210. As indicated at time $t_2$ of the signal diagram of FIG. 15, the Q output of flip-flop 208 returns high (at the first positive transition of the DOTCLK signal following the termination of the HDRIVE retrace pulse) and rowstart counter 210 is thus loaded with the nine-bit image delay signal for that particular line of the display. Further, as is indicated in FIG. 14, rowstart counter 210 of the subject embodiment is formed by a twelve-bit counter wherein the terminals for programming the three most significant bits are connected to a logical high potential and the tenth bit location of the counter output signal is used as the ROWSTART signal. With this arrangement, a positive transition of the ROWSTART signal will occur as rowstart counter 210 is loaded at the negative-going transition of the signal provided by flip-flop 208 (time $t_1$ in FIG. 15). Since the ROWSTART signal additionally is coupled to an enable terminal (EN) of rowstart counter 210, the counter is enabled as the ROWSTART signal goes high and counts downwardly with each positive transition of the DOTCLK signal. When a number of DOTCLK periods equal to the decimal equivalent of the nine-bit image delay signal that was loaded into counter 210 have occurred, the ROWSTART signal goes low to indicate that the image-bearing portion of the associated television line is beginning (time $t_3$ in FIG. 15). As shall be described relative to the mapping control circuit of FIG. 16, this signal initiates the system mapping sequence and causes each word of stored image information to be clocked into the output FIFO a number of times that is equal to the pixel count for the associated image memory address. Thus, as is indicated in FIG. 15, the signal that defines the display line (television line) that is associated with the accessed row of image information (image memory row address N in FIG. 15) is formed during a period of time following the negative-going transition of the ROWSTART signal.

When the ROWSTART signal goes low at time $t_3$ to start the series of mapping sequences necessary to form one line of the display sector, rowstart counter 210 is disabled. As is indicated in the timing diagram of FIG. 15 and as shall be described in detail with respect to FIGS. 18 and 19, the INIT pulse is generated as the image-bearing portion of the horizontal sweep period ends and the row address for the next row of stored image information (N+1 in FIG. 15) is supplied by the circuit of FIG. 9. Since both the HDRIVE signal and the signal supplied by flip-flop 208 are high the ninth bit of the image delay signal for the next horizontal sweep interval (television line) and the associated initial mapping value (IPC) are made available as soon as the new row address is available. Thus, it can be recognized that the arrangement of FIG. 14 continues to operate in the above-described manner to establish the initial mapping value and the left-hand edge of the display sector (i.e., the ROWSTART signal) for each television sweep interval that contains a portion of the display sector.

Figure 16:
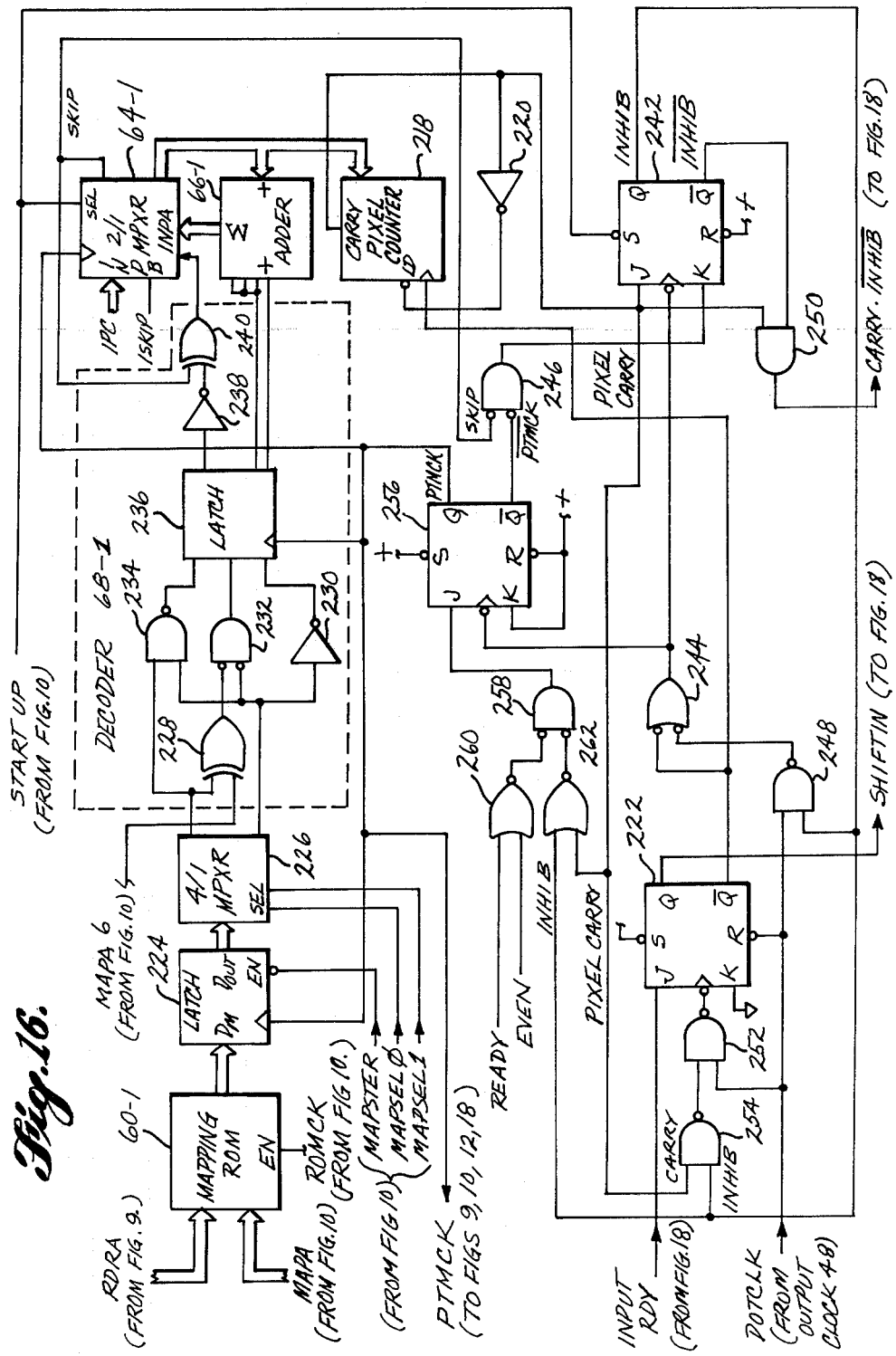
FIG. 16 schematically depicts a control circuit for implementing the mapping sequences utilized in the practice of this invention.

FIG. 16 depicts the circuit arrangement that is used in the subject embodiment to implement the mapping strategy of the present invention. Relative to the basic embodiment of FIG. 1, the circuit illustrated in FIG. 16 includes the mapping control portion of mapping control and output timing unit 58, mapping ROM 60, selector 64, adder 66 and decoder 68.

Briefly reviewing the basic aspects of the present invention prior to undertaking a detailed discussion of the circuitry of FIG. 16, a first portion of the polar-to-Cartesian transformation of a scan converter configured in accordance with this invention is effected by digitizing the surveillance system echo or reflection signal at a rate that is proportional to the cosine of the azimuthal angle that defines the scanning path associated with the reflection signal and by storing the set of digitized signal samples associated with each reflection signal (scanning path) as a column of information within a memory unit that is organized as a rectangular array of storage locations. The stored image information is then accessed one row at a time with each word of stored image information being mapping into the system display sector so as to occupy a number of pixels (pixel count) that is equal to a predetermined mapping value that is associated with the image memory storage location (row and column address) of that particular word of image information. As was described relative to the basic embodiment of FIG. 1, the set of mapping values utilized in the presently-preferred embodiments of the invention form an array having the same number of rows as the system image memory and a number of columns equal to one-half the number of columns in the system image memory with the mapping values being selected on the basis of a best-fit approximation that transforms the stored image information into a display sector that exhibits proper polar perspective. Moreover, to further minimize the mapping value storage requirements, the presently-preferred embodiments store the initial mapping value for each row of image information in a separate ROM in the manner described relative to FIG. 14 and store an array of two-bit mapping command codes that indicate whether each word of image information subsequent to the initial word is to be used to form the same number of pixels as the previously-accessed digital word of image information; is to be used to form one less pixel than the previously-accessed image information; is to be used to form one more pixel than the previous word of image information; or, is to be "skipped" (i.e., not used in the system display).

With respect to the subject embodiment of the invention, the mapping sequence basically includes determining the pixel count for each accessed word of image information and, if the image information is to be used in the display, shifting that word of image information into the system FIFO a number of times that is identically equal to the pixel count. As shall be described, the circuit arrangement of FIG. 16 performs these operations and is additionally configured to minimize the amount of time required to process image information without utilizing complex circuit structure. In this regard, the circuit is arranged to shift image information into the FIFO as rapidly as possible while being configured to interrupt the shifting of digital information into the system FIFO if the FIFO is fully loaded or if additional image information is not available for processing (e.g., an image memory read cycle has not been completed or the complete row of image information has been processed). Further, as previously mentioned, the circuit for controlling the mapping process produces one positive-going pulse of the PTMCK signal as each digital word of image information is being processed to cause the nextmost word of image information to be read from system memory in the manner described relative to FIGS. 9 through 13.

With more specific reference to FIG. 16, the mapping circuit of the embodiment being discussed includes a 2-to-1 multiplexer (data selector) 64-1 having one input port (INPA, in FIG. 16) connected for receiving the output signal supplied by a conventional digital adder circuit 66-1 and the second input port (INPB) connected for receiving the initial mapping value (IPC signal) provided by the initial value ROM of FIG. 14. As is indicated diagrammatically in FIG. 16, the initial mapping value includes a binary-encoded signal (three-bit digital word) representative of the pixel count for the first word of image information within the addressed row of image information and includes a single-bit that is high when the initial word of image information is to be skipped (the ISKIP signal). In a similar manner, the signal supplied to the second input port of multiplexer 64-1 includes the three-bit digital word that is supplied by adder 66-1 to indicate the mapping values for each subsequent word of image information and also includes a logic signal that is supplied by an exclusive-OR gate 216 and is high when the digital word of image information being processed is to be skipped.

In the arrangement of FIG. 16, the STARTUP signal provided by the read column counter circuit of FIG. 10 is connected to the selector terminal (SEL) of multiplexer 64-1. Since the STARTUP signal is low prior to the time at which the first word of image information is processed, the initial mapping value (IPC) and the initial skip command (ISKIP) are latched into multiplexer 64-1 and are thus coupled to the input port of adder 66-1 and the programming terminals of a pixel counter 218 before the addressing circuits of FIGS. 9 and 10 access the first word of image information within the particular row of image information being processed. As is depicted in FIG. 16, the carry output of pixel counter 218 couples a PIXEL CARRY signal to the counter load terminal (LD) by means of an inverter circuit 220 and the counter is clocked by a signal provided at the $\overline{Q}$ output of a J-K flip-flop 222. As shall be described in the following paragraphs, the $\overline{Q}$ output of flip-flop 222 provides a clock pulse to pixel counter 218 each time the Q output of flip-flop 222 supplies a "shift-in" pulse that causes the word of image information being processed to be loaded into the system FIFO. During the initialization of pixel counter 218, the PIXEL CARRY signal remains high from processing image information within the previously-accessed row of the image memory and the first shift-in pulse generated by flip-flop 222 causes the initial pixel count to be parallel loaded into pixel counter 218. Each subsequent shift-in pulse increments counter 218 upwardly until the terminal count is reached and the PIXEL CARRY signal is generated to reload pixel counter 218 with the next mapping value. Since the PIXEL CARRY signal generated by pixel counter 218 marks the end of the mapping sequence for a particular word of image information, it can be recognized that the mapping values that must be supplied to pixel counter 218 by multiplexer 64-1 to implement the mapping strategy of this invention are given by the expression TC−PC+1, where TC equals the terminal count of pixel counter 218 and PC equals the desired pixel count (i.e., the number of times the word of image information being processed is to be shifted into the system FIFO). By way of example, in the embodiment of the invention being discussed, pixel counter 218 is a four-bit counter wherein the most significant bit of the programming terminals is connected to a logical high potential and the mapping values supplied by multiplexer 64-1 are supplied as the three remaining bits of the programming signal. Thus, if the pixel count for the initial word of image information is six, so that the first word of image information is shifted into the FIFO six times to form six pixels of the display sector, the initial mapping value (IPC) that is supplied to multiplexer 64-1 is equal to 2. Since one shift-in pulse is required to load this mapping value into the pixel counter 218 and five additional shift-in pulses occur before pixel counter 218 generates a PIXEL CARRY signal, the initial word of image information for the row of the system image memory that is being processed will form the desired six pixels within the system display.

To cause multiplexer 64-1 and adder 66-1 to provide the proper mapping value to pixel counter 218 as each subsequent word of image information is accessed for processing, the circuit of FIG. 16 includes a mapping ROM 60-1, a latch circuit 224, a four-to-one multiplexer 226 and a decoder unit 68-1. As previously described herein, since mapping ROM 60-1 is configured for operation with an eight-bit word, four consecutive two-bit mapping command signals are accessed each time a mapping address (MAPA) is supplied to ROM 60-1 by the circuit of FIG. 10, with sixteen consecutive addresses being generated to supply the 64 mapping commands associated with the left-half plane portion of the row of image information being processed and the sixteen addresses being generated in reverse order to process the 64 words of image information associated with the right-half plane of the image memory and system display. With respect to the arrangement of FIG. 16, each group of four mapping commands is made available at the data output terminals of mapping ROM 60-1 each time the read column addressing circuits of FIG. 10 supply an ROMCK phase. As was described relative to FIGS. 10 and 11, the MAPSTEP signal goes low three PTMCK periods following each positive pulse of the ROMCK signal, with the duration of the MAPSTEP and ROMCK pulses both being equal to the period of the PTMCK signal. Since, it is shown in FIG. 16, latch 224 is clocked by the PTMCK signal and is enabled during each logic level low period of the MAPSTEP signal, the group of four mapping command signals required for processing of the next four words of image information to be accessed within the system image memory is loaded into latch 224 and made available to multiplexer 226 during each logical low portion of the MAPSTEP signal.

Four-to-one multiplexer 226 of FIG. 16 is a conventional data selector that selectively couples each of the four two-bit mapping command signals to decoder 68-1 in accordance with a two-bit data selection signal that is applied to the multiplexer selector (SEL) terminals of multiplexer 226. In the arrangement of FIG. 16, the two-bit data selector signal is supplied by the MAPSEL0 and MAPSEL1 signals which are produced by the image memory read column addressing circuits of FIG. 10. Since the sequence of digital signals that is collectively supplied by MAPSEL0 and MAPSEL1 is (0, 1, 2, 3, 0, 1, 2, 3, ...) while processing the 64 words of image information that define the portion of one TV line that lies in the left-half plane of the system display sector, the proper mapping command signal will be provided to decoder unit 68-1 with each PTMCK signal. In particular, and as previously described, in the subject embodiment of the invention a 383×64 array of mapping commands is stored in mapping ROM 60-1 and, because of the "mirror-image" symmetry of the system surveillance sector, each mapping command is utilized in processing image information stored at an associated column address in the left-half plane of the image memory storage array and is utilized in processing image information stored at a second column address of the image memory storage array that is a "mirror-image" of the first column address. Stated in terms of the subject embodiment, which utilizes 128 scanning paths and, hence, an image memory array having 128 column addresses (0, 1, 2, ..., 127), the mapping command signal that is used in processing a word of image information that is stored in the system image memory at a row address of j and a column address of k is used again with the word of image information stored at an image memory row address of j and an image memory column address of (127−k). Moreover, since the mapping commands are stored in mapping ROM 60-1 as groups of four consecutive mapping commands, the mapping address (MAPA) supplied to mapping ROM 60-1 to access the mapping command associated with image memory column address k and (127−k) is the integer portion of the quotient defined by the ratio k/4. Both of these design requirements are satisfied by the column addressing circuits of FIG. 10, which provides mapping address (MAPA) signals that advance through the sequence (0, 1, 2, ..., 15, 15, 14, ..., 0) with every fourth PTMCK pulse and MAPSEL0 and MAPSEL1 signals that collectively sequence (0, 1, 2, 3) in synchronism with the PTMCK pulses while the system is processing image information associated with the left-half plane of the image memory and the system display sector (i.e., during the first sixteen MAPA signals) and collectively sequence (3, 2, 1, 0) for the final sixteen mapping addresses (i.e., while the system is processing image information associated with the right-half plane of the system display).

It can be recognized from the above discussion that the manner in which pixel counter 218 operates and the manner in which mapping command signals are stored within mapping address ROM 60-1 collectively impose two additional constraints on the selection of mapping command codes and the configuration of decoder 68-1. Firstly, since pixel counter 218 counts upwardly from the mapping value that is supplied by multiplexer 64-1 and adder 66-1, the mapping value must be decremented (incremented) whenever it is necessary to increment (decrement) the number of pixels formed by a word of image information relative to the number of pixels that were formed by the previous word of image information. Secondly, because of the manner in which the mapping command signals are stored in mapping ROM 60-1, a mapping command which is associated with an address in the left-half plane of the image memory and decrements (increments) the mapping value that is loaded into pixel counter 218 must increment (decrement) the mapping value when the image information associated with the previously-mentioned corresponding right-half image memory address is being processed. For example, if the mapping command associated with an image memory row address of j and a column address of k is to increase the mapping value loaded into pixel counter 218, the same mapping command must decrease the mapping value loaded into pixel counter 218 when it is accessed relative to the word of image information stored at a row address of j and a column address of (127−k) in the image memory.

In addition to satisfying the above-discussed constraints, the mapping command codes and decoder 68-1 of the subject embodiment advantageously supply digital signals representative of 0 or 1 to adder 66-1 when the mapping value supplied to pixel counter 218 is to remain unchanged or is to be increased by unity while supplying a digital signal to adder 66-1 that is the 2's Complement of 1 when the mapping value supplied to pixel counter 218 is to be decreased. More specifically, in the arrangement of FIG. 16, decoder 68-1 includes an exclusive-OR gate 228 having one input terminal connected for receiving the first bit of the two-bit mapping command signal supplied by four-to-one multiplexer 226 and the second input terminal thereof connected for receiving the MAPA6 signal that is supplied by the image memory column addressing circuits of FIG. 10. The second bit of the two-bit mapping command signal that is supplied by multiplexer 226 is commonly coupled to the input terminal of an inverter 230, one input terminal of a negative NAND gate 232 and one input terminal of a NAND gate 234. As is shown in FIG. 16, the output terminals of inverter 230, negative NAND gate 232 and NAND gate 234 are connected to the input terminals of a latch circuit 236, which is clocked by the PTMCK signal. To complete this portion of decoder 68-1, the second input terminal of NAND gate 234 is connected for receiving the first bit of the mapping command signal and the second input terminal of negative NAND gate 232 is connected to the output terminal of exclusive-OR gate 228.

In the depicted arrangement, the signal supplied by NAND gate 234 is used to implement the previously-mentioned "skip operation" wherein the associated word of image information will be eliminated from the system display and the signals provided by inverter 230 and negative NAND gate 232 result in the previously-discussed incrementing or decrementing of the mapping value that is loaded into pixel counter 218. In particular, the subject embodiment of the invention utilizes a conventional four-bit binary adder circuit as adder 66-1 and, as is indicated in FIG. 16, with each occurrence of the PTMCK pulse the signal provided by inverter 230 is clocked to adder 66-1 as the least significant bit of one adder input and the signal provided by negative NAND gate 232 is clocked to adder 66-1 the three most significant bits of that same input. With each such operation, latch 236 also clocks the signal supplied by NAND gate 234 to the input terminal of an inverter circuit 238. To implement the hereinafter-discussed operation of the system when a word of image information is eliminated from the system display (i.e., "skipped"), the signal supplied by inverter 238 is coupled to one input terminal of an exclusive-OR gate 240 having the second input terminal thereof connected for receiving a SKIP signal that is supplied by two-to-one multiplexer 64-1. Since two-to-one multiplexer 64-1 is clocked by the PTMCK signal, the inputs supplied to exclusive-OR gate 40 are, in effect, the skip command signal associated with the word of image information that is currently being processed (the SKIP signal) and a command signal that will determine whether the SKIP signal is to be changed for the processing of the nextmost word of image information (the signal supplied by inverter 238).

Turning now to the operation of decoder 68-1, the two-bit mapping command codes utilized with this embodiment of the invention consist of: (a) a binary code 00 if the image information stored at a left-half plane address of the image memory is to be used to form one more pixel of the display sector than is formed by the image information stored at the nextmost antecedent image memory column address (i.e., the mapping value supplied to pixel counter 18 is to be decreased by unity); (b) a binary code 10 if the image information associated with the left-half plane image memory address is used to form one less pixel than the image information associated with the nextmost antecedent column address of the image memory (i.e., the mapping value loaded into pixel counter 218 is to be increased by unity); (c) a binary code 01 if the number of display sector pixels to be occupied by the associated left-half plane image memory address is equal to the number of pixels occupied by the image information associated with the nextmost antecedent image memory column address (i.e., there is to be no change in the mapping value supplied to pixel counter 218); and (d) a binary code 11 if system operation is to be altered to effect a "ski" state which eliminates the image information that is stored at the associated left-half plane address of the image memory from the system display or if the system is to be switched out of the skip state to respond to the above-discussed binary codes of 00, 01 and 10. More specifically, decoder 68-1 of FIG. 16 is arranged to supply a skip "flag" that is complemented (i.e., changes states) in response to a mapping command code of 11. Since, as is described in more detail in the following paragraphs, the word of image information stored at the associated image memory address is eliminated from the system display when the skip flag is logically high (i.e., equal to 1), it can be recognized that the mapping arrangement of FIG. 16 in effect switches between the "skip" and "no-skip" states each time a mapping command code of 11 is supplied to decoder 68-1.

As was described relative to the addressing circuits of FIG. 10, the MAPA6 signal is at a logical low potential whenever read column counter 124 supplies an image memory column address (RDCA) that is associated with the left-half plane of the system display sector. Since this signal is coupled to one input terminal of exclusive-OR gate 228 it can be shown that the signal supplied to adder 66-1 by latch 236 (relative to left-half plane image memory address) will be: (a) 1111 when the mapping command signal supplied by multiplexer 226 is 00 (an increment code for reducing (decrementing) the mapping value supplied to pixel counter 218); (b) 0000 when the mapping command signal supplied by multiplexer 226 is 01 to indicate that there is to be no change in the mapping value loaded into pixel counter 218; (c) 0001 when the mapping command signal supplied by multiplexer 226 is 10 (a "decrement" command that increases the mapping value loaded into pixel counter 218 to thereby decrease the number of display sector pixels occupied by the associated word of image information); and (d) is 0000 when the above-mentioned skip flag associated word of image is to be complemented to eliminate the information from the system display or return the system to a "no-skip" state (i.e., a skip flag complement command). The ambiguity between the signal supplied to adder 66-1 in response to a skip flag complement command and a no-change command is resolved by the signal supplied by NAND gate 234. In particular, NAND gate 234 will supply a logical zero only when the mapping command signal supplied by multiplexer 236 is the skip flag complement command (11). Since, as shall be described relative to the operation of the mapping control circuitry of FIG. 16, the SKIP signal supplied by multiplexer 64-1 inhibits the generation of a shift-in pulse by flip-flop 220, a digital word of image information that is to be eliminated from the display is skipped by, in effect, disabling the FIFO while that word of image information is being processed. Thus, the coupling of a "no-change" digital signal to adder 66-1 during the signal processing interval in which a skip flag complement command is being implemented does not affect the current system mapping value and, hence, does not deleteriously affect the processing of subsequent words of image information.

When the addressing circuits of FIG. 10 supply image memory column addresses (RDCA) that are associated with the right-half plane of the system display sector, the MAPA6 signal is at the logical high potential. This causes exclusive-OR gate 228 to operate in a manner which, in effect, translates a left-half plane increment code into a decrement code and translates a left-half plane decrement code into an increment code. In particular, when read column counter 124 of FIG. 10 supplies an image memory column address between 64 and 127, a mapping command signal of 00 will cause the digital word 0001 to be coupled to adder 66-1 and a mapping command code of 10 will cause a digital word 1111 to be coupled to adder 66-1. Since the operation of decoder 68-1 relative to a skip code (11) and a no-change code (01) is unchanged, the above-discussed requirement is satisfied in that a mapping command signal associated with a left-half plane image memory column address of k which increments or decrements the number of display sector pixels occupied by the associated image information must have the opposite affect when that mapping command code is again accessed to process the word of image information stored within the same row of the image memory and at a column address of (127−k).

Turning now to the structure and operation of the mapping control circuit that is utilized in the subject embodiment, the PIXEL CARRY signal generated by pixel counter 218 loads the pixel counter with the mapping value for the next word of image information to be processed and, in effect, serves as a request for the generation of a PTMCK pulse. If image information is available for processing, a PTMCK pulse will be generated to supply the nextmost mapping memory and image address signals and advance the mapping command signals and the image information signals by one clock pulse relative to the pipeline configuration of the above-described mapping circuit and the output data path that will be described relative to FIG. 18. Further, as shall be described in the following paragraphs, the mapping control circuitry of FIG. 16 includes a flip-flop 242 which generates an INHIB (inhibit) signal that ensures that no image information will be loaded into the system FIFO until pixel counter 218 is loaded with the proper mapping value and the next word of image information is available for processing. Once the necessary conditions are met, the INHIB signal changes states to allow the generation of the number of FIFO SHIFT-IN pulses that is identically equal to the mapping value associated with the word of image information being processed and the PIXEL CARRY signal generated when the final shift-in pulse of that sequence is complete initiates the mapping sequence for the next word of image information.

In the arrangement of FIG. 16, the INHIB signal is supplied by a J-K flip-flop 242 that is reset by the STARTUP signal prior to processing each row of stored image information and is clocked by a signal provided by a negative NOR gate 244. As shall be recognized upon understanding the overall structure of the depicted circuit arrangement, negative NOR gate 244 supplies clock pulses to flip-flop 242 in synchronism with the generation of each FIFO shift-in pulse whenever the INHIB signal is not high (i.e., flip-flop 242 is in the reset state) and also supplies a clock pulse to flip-flop 242 in synchronism with the system DOTCLK signal when the INHIB signal is high. As shall be described, the provision of a clock pulse under the last-noted condition allows the processing of mapping skip commands while the system FIFO is fully loaded with image information and the mapping process is otherwise interrupted until the time at which some of the image data is shifted from the FIFO to generate the system display.

With continued reference to FIG. 16, the J input terminal of flip-flop 242 is connected for receiving the PIXEL CARRY signal and the K input terminal thereof is connected to the output terminal of a negative NAND gate 246, having one input terminal connected for receiving the SKIP signal supplied by multiplexer 64-1 and the second input terminal connected for receiving the logical negation of the PTMCK signal (i.e., $\overline{PTMCK}$). With this arrangement, the logical high PIXEL CARRY signal that is produced by pixel counter 218 when a word of image information has been clocked into the system FIFO the required number of times causes flip-flop 242 to enter the set state (Q output high) as flip-flop 222 completes the last FIFO shift-in pulse of a mapping sequence. Since the next mapping value is loaded into pixel counter 218 at this same time, the J input terminal of flip-flop 242 goes low. Moreover, since the INHIB signal provided at the Q output terminal of flip-flop 242, is coupled to one input terminal of a NAND gate 248, which has the second input terminal thereof connected for receiving the DOTCLK signal and the output terminal thereof connected to an input terminal of NOR gate 244, it can be recognized that NOR gate 244 will supply signal pulses to the clock terminal of flip-flop 242 that substantially correspond to the system DOTCLK signal. If the K input terminal of flip-flop 242 remains low, the clock pulses supplied via NOR gate 244 will not cause flip-flop 242 to change states and the INHIB signal will remain high. On the other hand, if the K input is low, flip-flop 242 will be reset to cause the INHIB signal to return to a logical low potential. With the above-described arrangement, negative NAND gate 246 supplies a logical high signal to the K input terminal of flip-flop 242 only if the SKIP signal is low and the $\overline{PTMCK}$ signal goes low (i.e., a PTMCK signal is generated to initialize the system for the processing of another word of stored image information). Thus, the INHIB signal will stay high to prevent the generation of FIFO SHIFT-IN pulses until the mapping sequence can continue with the next word of stored image information (until a PTMCK signal is generated). Moreover, INHIB will remain high if a SKIP signal is supplied by multiplexer 64-1, to prevent the generation of a FIFO shift-in pulse and thus implement the skip command by preventing the associated word of image information from being loaded into the FIFO.

As is also shown in FIG. 16, the PIXEL CARRY signal and the Q output terminal of flip-flop 242 ($\overline{INHIB}$ signal) are connected to the two input terminals of an AND gate 250. As shall be described in more detail relative to FIG. 18, the signal provided by AND gate 250 clocks the word of image information to be processed during the next mapping sequence into a latch circuit that couples the signal to the input terminals of the system FIFO. As can be recognized from the above description, the PIXEL CARRY and $\overline{INHIB}$ will both be high with the final shift-in pulse of each sequence for processing a word of image information. Thus, the next word of image information is continually made available for processing at the appropriate time relative to FIFO shift-in pulses.

Referring now to the generation of the FIFO SHIFT-IN signal, an INPUT RDY signal that is at a logical low whenever the system FIFO is loaded is coupled to the J input terminal of flip-flop 222. Since the K input terminal of flip-flop 222 is connected to a logical low potential, it can be recognized that the Q output of flip-flop 222 will supply FIFO SHIFT-IN pulses only when it is possible to load additional words of image information into the FIFO. As previously mentioned, this enables the mapping sequence to be temporarily interrupted when the number of pixels required to form the portion of the display sector that is associated with the row of image information being processed substantially exceeds the number of registers within the system FIFO.

Even if the input ready signal is high, flip-flop 222 will not produce SHIFT-IN pulses if both the PIXEL CARRY and INHIB signals are high. In particular, in the depicted arrangement, the clock terminal of flip-flop 222 is connected to the output terminal of a NAND gate 252 having one of the input terminals thereof connected for receiving the DOTCLK signal. The second input terminal of NAND gate 252 is connected to the output terminal of a NAND gate 254, having the two input terminals thereof connected for receiving the PIXEL CARRY and INHIB signal. Since the reset terminal of flip-flop 222 is connected for receiving the DOTCLK signal and since NAND gate 252 will supply an inverted DOTCLK signal to the clock terminal of flip-flop 222 as long as the output of NAND gate 254 is high, it can be recognized that flip-flop 222 will be set in synchronism with the positive-going transition of the DOTCLK signal (negative-going transition of the $\overline{DOTCLK}$ signal provided by NAND gate 252) and will be reset by the nextmost negative transition of the DOTCLK signal unless both PIXEL CARRY and INHIB are high. Since, as previously described, PIXEL CARRY and INHIB are both high when the SKIP signal is high, no SHIFT-IN pulse is generated when the SKIP signal is present and the word of image information being processed is eliminated from the system display.

As described above, the PIXEL CARRY signal is, in effect, a request for a PTMCK pulse that will cause the system to address a new mapping command signal and a new word of image information and then proceed to the processing of the next word of image information. In the arrangement of FIG. 16, the PTMCK signal is supplied at the Q output terminal of a J-K flip-flop 256 having the K input terminal thereof connected to a logical high potential and the clock terminal connected to the clock terminal of flip-flop 242 for receiving the previously-discussed signals that are supplied by negative NOR gate 244. The J input terminal of flip-flop 256 is connected to the output terminal of a negative NAND gate 258 having the input terminals thereof connected to the output terminals of a NOR gate 260 and a NOR gate 262. As is shown in FIG. 16, the input terminals to NOR gate 260 are connected for receiving the EVEN signal and READY signal supplied by the column addressing circuits of FIG. 10 and the image memory control circuit of FIG. 12, respectively. The input terminals to NOR gate 262 are connected for receiving the INHIB signal and the PIXEL CARRY signal.

In view of the above-described interconnection of flip-flop 256 and the gate circuits connected to the J input terminal thereof, it can be recognized that both the J and K input terminals of flip-flop 256 will be high unless the READY signal and the EVEN signal are both low and/or the INHIB signal and the PIXEL CARRY signal are both low. Since, as described above, the INHIB signal goes high each time a PTMCK signal is to be generated, the J input terminal to flip-flop 256 will be high unless both the READY and EVEN signals are at a logical low potential. As was previously described, the subject embodiment accesses two consecutive words of image information during each image memory read cycle with the READY signal being low during the entire read cycle. With this arrangement, if the READY signal is low and the EVEN signal is low, both words of image information that were provided during the previous read cycle have been processed and no image information will be available until the current read cycle is complete (i.e., until the READY signal goes high). Thus, it can be recognized that NOR gate 260, in effect, causes the system to "wait" or standby until additional image information is ready to be processed.

Assuming that NOR gate 260 is supplying a logical low signal and the INHIB signal has gone high to cause the generation of a PTMCK pulse, the next negative transition of the signal supplied by negative NOR gate 244 will cause flip-flop 256 to toggle to the set state and generate a positive-going transition in the PTMCK signal. Since the $\overline{Q}$ output of flip-flop 256 is connected to one input terminal of negative NAND gate 246, a logical high signal will be coupled to the K input terminal of flip-flop 242 (in the absence of a SKIP signal). Thus, when negative NOR gate 244 supplies the nextmost negative-going signal transition, flip-flop 256 toggles to the reset state to terminate the PTMCK pulse and flip-flop 242 is reset to cause the INHIB signal to go low. Since both the INHIB signal and the PIXEL CARRY signal are now low and will remain low until the digital word of image information being processed is clocked into the system FIFO a number of times equal to the associated mapping value, NOR gate 262 supplies a logical high signal. This causes negative NAND gate 258 to supply a logical low signal to the J input terminal of flip-flop 256 and prevent the generation of the next PTMCK pulse until the current signal processing sequence is complete.

Figure 17:
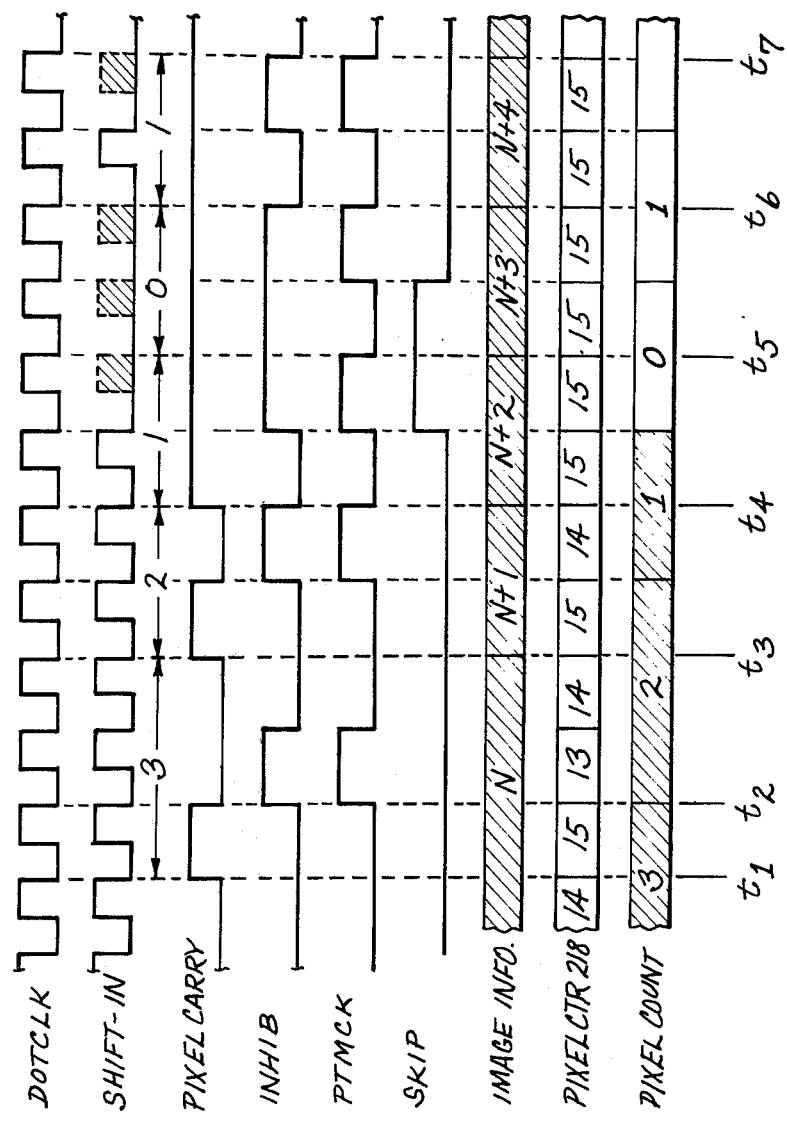
FIG. 17 is a signal diagram that illustrates operation of the circuit of FIG. 16 during four consecutive mapping sequences that can occur in the practice of this invention.

The timing diagram of FIG. 17 illustrates the operation of the mapping control circuits of FIG. 16 when five successive words of image information (N, N+1, N+2, N+3, N+4) that are stored within a particular row of the image memory at column addresses of (N, N+1, N+2, N+3, N+4) are to be processed so that the Nth word forms three consecutive display pixels of the television display line which corresponds to the image memory row address; the (N+1)th word forms the next two consecutive display pixels; the (N+2)th word forms the next pixel of the display; the (N+3)th word is eliminated from the display (skipped); and the (N+4)th word of image information is used to form one pixel of the display. In the depicted series of processing sequences the Nth word of image information is clocked into the above-mentioned latch circuit of FIG. 18 for loading into the system FIFO at a time denoted t₁ in FIG. 17 when the PIXEL CARRY signal goes high to indicate the end of the mapping sequence for the (N−1)th word of image information. With the PIXEL CARRY signal high and the INHIB signal low, the nextmost positive-going transition of the DOTCLK signal sets flip-flop 222 via NAND gate 252 to cause the FIFO SHIFT-IN signal to go high. Flip-flop 222 is reset by the nextmost negative transition of the DOTCLK signal (time t₂ in FIG. 17) to terminate the SHIFT-IN pulse and clock pixel counter 218 and flip-flops 242 and 256. This causes the PTMCK signal and the INHIB signal to go high and causes pixel counter 218 to be initialized at a count of 13 (1101), which was established by multiplexer 64-1 and adder 66-1 when a PTMCK signal was generated during the processing of the (N−1)th word of image information.

As the PTMCK signal goes high, the value currently supplied by adder 66-1 is clocked into a latch circuit within multiplexer 64-1 to provide the initial count for pixel counter 218 when the (N+1)th word of image information is processed and the decoded mapping command associated with the (N+2)th word of image information is clocked into latch 236. Since the (N+1)th word of image information is to result in two display pixels (one less than the (N+1)th word), the signal latched into multiplexer 64-1 is equivalent to 14 (1110). Further, since the (N+2)th digital word of image information is to be used one less time than the (N+1)th word (to result in one display pixel), a decoded mapping command signal equivalent to 1 (01) is clocked into latch 236, with the output of NAND gate 234 being high to indicate that the state of the SKIP signal will not be changed, and thus the (N+1)th word will not be eliminated from the display (i.e., skipped).

The nextmost positive and negative-going transitions of the DOTCLK signal (following time t₂ in FIG. 17) cause the generation of a second FIFO SHIFT-IN pulse by setting and resetting flip-flop 222 in the above-described manner which, in turn, provides an additional clock pulse to pixel counter 218, and flip-flops 242 and 256. Thus, the count held by pixel counter 218 increments to 14 (1110) and J-K flip-flop 256 toggles to the reset state to take the PTMCK signal low. Since the terminal of the PIXEL CARRY signal at time t₂ couples a logical low signal to the J input terminal of flip-flop 242 and the K input terminal thereof receives a logical high signal (since the SKIP signal and the PTMCK signal are both low) immediately prior to the generation of this clock pulse, flip-flop 242 is reset to take the INHIB signal low. With the INHIB and PTMCK signals low, the nextmost DOTCLK pulse sets and resets flip-flop 222 to supply a third FIFO shift-in pulse, which clocks pixel counter 218 and flip-flops 242 and 256. Thus, at time t₃ in FIG. 17, pixel counter 218 increments to a count of 15 to take the PIXEL CARRY signal high. Simultaneously therewith, AND gate 250 provides a positive-going signal transition that clocks the (N+1)th word of image information in the previously-mentioned latch circuit of FIG. 18. The sequence necessary to process the Nth word of image information is thus complete at time t₃ of FIG. 17 and, as long as image information is available for clocking along the data path that couples image information to the system FIFO, signal processing continues with the nextmost DOTCLK pulse resulting in the generation of the first FIFO SHIFT-IN pulse associated with the (N+1)th word of image information.

More specifically, the first DOTCLK pulse following time t₃ in FIG. 17 causes flip-flop 222 to be set and reset to thereby generate the first FIFO SHIFT-IN pulse that is associated with the (N+1)th word of image information. As was the case during the sequence for the Nth word, flip-flops 242 and 256 are clocked on the falling edge of the FIFO SHIFT-IN pulse to cause the PTMCK signal and the INHIB signal to go high. Since pixel counter 218 is loaded with the associated count of 14(1110) at this time, the PIXEL CARRY signal goes low. As was the case during the previous signal processing sequence, the positive transition of the PTMCK signal clocks the mapping value for the (N+2)th word of image information into the latch circuits of the two-to-one multiplexer 64-1 and clocks the decoded mapping command signal for the (N+3)th word of image information into latch circuit 236. Since the (N+2)th word of image information is to result in one display pixel, the signal supplied by adder 66-1 and latched into multiplexer 64-1 is 15(1111). Moreover, since the (N+3)th word of image information is to be deleted from the display, the signal supplied by NAND gate 234 is low, with the two-bit digital word supplied by inverter 230 and negative NAND gate 232 being 00.

With the PIXEL CARRY signal low and the PTMCK and INHIB signals high, the next pulse supplied by the DOTCLK signal causes the generation of the second FIFO SHIFT-IN pulse associated with the (N+1)th word of image information. As flip-flop 222 is reset to terminate the SHIFT-IN pulse (at time $t_4$ in FIG. 17), pixel counter 218 is clocked to count of 15 to cause the PIXEL CARRY signal to go high and both flip-flops 242 and 256 are clocked. Since both the J and K input terminals of flip-flop 256 are high at this time, flip-flop 256 will toggle to take the PTMCK signal low. Since the J input terminal of flip-flop 256 is low and the K input terminal thereof is high immediately prior to the clock pulse, flip-flop 256 resets to take the INHIB signal low.

With processing of the (N+1)th word of image information complete at time $t_4$, and the PIXEL CARRY signal high, the next pulse of the DOTCLK signal causes the generation of a FIFO SHIFT-IN pulse in the manner described relative to the processing sequences for the Nth and the (N+1)th words of image information. Since the value supplied by multiplexer 64-1 for the (N+2)th is 15(1111) the PIXEL CARRY signal does not return low following the generation of the first shift-in pulse. Since the PIXEL CARRY and INHIB signals are both high, NAND gate 254 is disabled and the nextmost pulse of the DOTCLK signal cannot set and reset flip-flop 222 to produce an additional FIFO shift-in pulse. However, since the $\overline{Q}$ output of flip-flop 222 is high, the DOTCLK signal is coupled to the clock terminals of flip-flops 242 and 256 via NAND gate 248 and NOR gate 244 to thereby toggle J-K flip-flop 256 to the reset state and cause the PTMCK signal to go low. Thus, in effect, flip-flop 222 is inhibited by the INHIB signal and the PIXEL CARRY signal so that the desired single FIFO shift-in pulse is generated during the depicted time interval of $t_4$ to $t_5$ in FIG. 17.

As was the case with each previously-described sequence, the counter initialization signal for the nextmost word of image information to be processed (N+3 in this case) is supplied to pixel counter 218 and the value for the following word of image information (N+4 in this case) is clocked into the latch circuits of multiplexer 64-1 on the positive transition of the associated PTMCK signal. Since the (N+3)th word of image information is to be skipped in the situation being described, the four-bit digital word supplied to pixel counter 218 by multiplexer 64-1 remains 1111(15) and the SKIP signal goes high. Since the (N+4)th word of image information is to result in one display pixel, the signal supplied to adder 66-1 by latch 236 will remain equal to 0000 and the bit that represents the skip flag complement command will be high to indicate that the associated digital word of image information is not to be eliminated from the display sector.

Since the SKIP signal is high when the DOTCLK signal activates flip-flop 256 to return the PTMCK signal to a logical low potential (time $t_5$ in FIG. 17), flip-flop 242 does not cause the INHIB signal to revert to the logical low potential. In particular, the SKIP signal disables negative AND gate 246 so that the K input terminal of flip-flop 242 is low. Since the PIXEL CARRY signal maintains the J input terminal of flip-flop 242 at a logical high potential, the clock pulse supplied to both flip-flop 242 and flip-flop 256 via negative NOR gate 244 does not affect the state of flip-flop 242 and the INHIB signal remains high. With the INHIB signal and the PIXEL CARRY signal both high, the next negative-going transition of the DOTCLK signal sets flip-flop 256 to take the PTMCK signal high and advance the mapping command signals through latch 236 and multiplexer 64-1 in the previously-described manner. Since the (N+4)th word of image information is to result in one display pixel, the SKIP signal supplied by multiplexer 64-1 goes low. Moreover, since NAND gate 254 supplies a logical high potential, the DOTCLK signal does not reach the clock terminal of flip-flop 222 and no FIFO SHIFT-IN pulse is generated.

With the INHIB signal and the PIXEL CARRY signal still high and the SKIP signal low, the nextmost DOTCLK pulse does not produce a FIFO SHIFT-IN pulse, but toggles both flip-flops 242 and 256 to the reset state, thus causing both the PTMCK signal and the INHIB signal to go low. The corresponding positive transition of the $\overline{\text{INHIB}}$ signal is coupled through AND gate 250 to latch the (N+4)th word of image information into the output processor 44-1 of FIG. 18. The sequence for eliminating the (N+3)th word of image information from the display sector is thus complete at time $t_6$ of FIG. 17 and since the circuit is in a stable condition identical to that which occurred immediately subsequent to time $t_4$ (the beginning of the processing sequence for the (N+2)th word of image information), operation continues in the above-described manner to supply a single FIFO SHIFT-IN pulse for the (N+4)th word of image information during the time interval $t_6$ to $t_7$ in FIG. 17.

Turning now to FIG. 18, the portion of the subject embodiment which corresponds to output processor 44 of the embodiment depicted in FIG. 1 is a data path that includes a latch circuit 264 having the data input terminals thereof connected to the image memory units associated with both the even column addresses and the odd column addresses. Since the enable terminal (EN) of latch 264 is connected for receiving the EVEN signal supplied by the image memory read column addressing circuits of FIG. 10 and the latch is clocked by the PTMCK signal, a pair of consecutive words of image information are clocked into latch 264 with every other PTMCK signal (i.e, with every other processing sequence that supplies digital words of image information to the system FIFO). A two-to-one multiplexer circuit 266 having the data output terminals thereof connected to the input terminals of a latch circuit 268 receives the pair of data words that are stored by latch 264. Since the selector terminal (SEL) of multiplexer 266 is connected to receive the least significant bit of the image memory read column address, the two stored words of image information are made available to latch 268 in the proper order. (Image information associated with an odd column address of the image memory being supplied first, except during the previously-described operation in the left-to-right reversal mode when the LRREV signal supplied to the read column count circuit of FIG. 10 is at a logic low level.) Moreover, as described relative to the arrangement of FIG. 16, the clock signal supplied to latch 268 by AND gate 250 of FIG. 16 causes the word of image information that is to be utilized during the next processing sequence to be clocked into latch 268 prior to the time at which the mapping sequence actually beings. As was described relative to FIG. 16, latch 268 provides the word of image information being processed to the input of the system FIFO (270 in FIG. 18) with the SHIFT-IN signals causing the digital word of image information to be loaded into FIFO 270 the required number of times.

In the arrangement of FIG. 18, the output terminals of FIFO 270 are coupled to the data input terminals of a two-to-one multiplexer 272 having the second set of input terminals thereof connected for receiving a digital signal representative of the desired background of the television display (e.g., a digital signal that will result in a black background). As shall be described in the following paragraphs, the output control circuit of FIG. 18 activates multiplexer 272 to supply the digital signals stored in FIFO 270 during portions of a horizontal sweep period which define the system display sector and to supply a digital signal representing the display background during all other portions of each horizontal sweep period. To properly synchronize the signals, the output of multiplexer 272 is coupled to a latch circuit 274 with both multiplexer 272 and latch 274 being clocked by the system DOTCLK signal. As is indicated in FIG. 18, latch 274 supplies the signal provided by multiplexer 272 to the system digital-to-analog converter (DAC 50 of FIG. 1), which forms the TV compatible analog signal in the manner described relative to the basic embodiment of FIG. 1.

The output control circuitry of FIG. 18 controls the formation of each line of the television display by: (1) operating two-to-one multiplexer 272 so that a signal representative of the display background will be coupled to the system digital-to-analog converter (DAC 50 in FIG. 1) during portions of the associated horizontal sweep interval that correspond to the left side and right side portions of the display line that are outside of the actual display sector; (2) shifting image information out of FIFO 270 at the system DOTCLK rate during the portion of the horizontal sweep interval that cprresponds to the portion of the associated television line of the display sector (i.e., the system surveillance region); and (3) generating the previously-discussed INIT signal when all of the image information for that particular line of the television display has been clocked from FIFO 270 to thereby reinitialize the system and initiate processing of the next row of storage locations within the system image memory (i.e., the nextmost line of the television display). With respect to FIG. 18 and the associated timing diagram of FIG. 19, the output control circuit of the subject embodiment includes a type-D flip-flop 276 that is clocked by the DOTCLK signal and has the D input terminal thereof connected for receiving the ROWSTART signal. The output terminal of flip-flop 276 is connected to one input terminal of a three-input negative NAND gate 278 having the second and third input terminals thereof connected for receiving the ACTIVEROW signal and a signal identified in FIGS. 18 and 19 as the DATAEND signal, which is provided at the Q output terminal of a type-D flip-flop 280. The output terminal of negative NAND gate 278 is connected to the selector terminal (SEL) of two-to-one multiplexer 272, with the signal produced by negative NAND gate 278 being identified as the INSCT signal in FIGS. 18 and 19.

With continued reference to FIG. 18, the ROWSTART signal is also coupled to one input terminal of a three-input NOR gate 282 and to the input terminal of an inverter circuit 284 that has the output terminal thereof connected to the set terminal (S) of a type-D flip-flop 286. The second and third input terminals of NOR gate 282 are connected for receiving the DOTCLK and DATAEND signals, with the output terminal thereof being connected to the shiftout terminal (SO) of FIFO 270 and to the clock terminal of flip-flop 286. The Q output terminal of flip-flop 286 is connected to the D input terminal of flip-flop 280.

As was described relative to FIG. 9, the ACTIVEROW signal is low for each horizontal sweep period that is associated with a line of the television display that includes a portion of the system display sector. As was described relative to FIGS. 10 and 11, the ROWSTART signal goes low during each such sweep interval, with the negative-going transition corresponding to the time at which image information begins to appear in the video signal for forming the television display, thereby corresponding to the edge of the display sector when considered in terms of the resulting television display format (see FIG. 5 and the associated discussion). Thus, as is depicted in FIG. 19, the INSCT signal is low during the initial portion of each horizontal sweep interval to cause two-to-one multiplexer 272 to supply a signal representative of the display background. Further, since the SHIFTOUT signal coupled to FIFO 270 remains low, none of the image information shifted into FIFO 270 in the manner described relative to FIGS. 16 and 17 is coupled to multiplexer 272.

When the ROWSTART signal goes low at time $t_1$ in FIG. 19, flip-flop 286 is in the set state and each positive transition of the DOTCLK signal clocks a logical low signal into flip-flop 280 so that the DATAEND signal remains low. With the DATAEND signal and the ROWSTART signal low, NOR gate 282 produces positive and negative-going transitions in the SHIFTOUT signal in substantial synchronism with the negative and positive-going transitions of the DOTCLK signal to thereby supply a series of SHIFTOUT pulses to FIFO 270 and to the clock terminal of flip-flop 286. As FIFO 270 begins each shiftout operation, the FIFO output ready (OPT RDY in FIGS. 18 and 19) signal goes low. If one or more additional words of image information is contained in FIFO 270, the OPT RDY signal returns high at the conclusion of the shiftout operation. Thus, as long as data remains in FIFO 270, flip-flop 286 will couple a logical low signal to the D input terminal of flip-flop 280, which, in turn, will maintain the DATAEND signal at a logical low level.

The nextmost positive transition of the DOTCLK signal following the time at which the ROWSTART signal goes low clocks a logical low signal into flip-flop 276 (at time t₃ in FIG. 19). Since all input terminals to negative NAND gate 278 are then low, the INSCT signal goes high to cause multiplexer 272 to couple a word of image information supplied by FIFO 270 to latch circuit 274 for clocking to the system DAC in synchronism with the next DOTCLK pulse. As long as FIFO 270 continues to supply additional words of image information (i.e., until the end of the portion of the horizontal sweep period that includes display information is complete), operation continues with each DOTCLK signal causing latch 274 to couple one word of image information to the system digital-to-analog converter while simultaneously causing a SHIFTOUT pulse to be supplied to FIFO 270 so that the next word of image information is made available to multiplexer 272.

When FIFO 270 has applied each word of image information that is to be used in the signal for forming pixels of the associated line of television display, the OPT RDY signal goes low (time t₄ in FIG. 19). Since the OPT RDY signal is coupled to the D input terminal of flip-flop 286, the nextmost positive transition of the SHIFTOUT signal clocks flip-flop 286 into the reset state. Since the $\overline{Q}$ output terminal of flip-flop 688 is coupled to the D input terminal of flip-flop 280, flip-flop 280 is clocked into the set state, with the nextmost positive transition of the DOTCLK signal (time t₅ in FIG. 19), causing the DATAEND signal to go high. This disables negative NAND gate 278 to cause the INSCT signal to go low so that multiplexer 272 begins to supply a digital signal representing the display background that lies to the right of the system display sector.

As is shown in FIG. 19, the Q output terminal of flip-flop 280 (DATAEND signal) also is coupled to the D input terminal of a type-D flip-flop 288 having the Q output terminal thereof connected to the D input terminal of a type-D flip-flop 290 and to one input terminal of a NAND gate 292. The second input terminal of NAND gate 292 is connected to the $\overline{Q}$ output terminal of flip-flop 290 and the output terminal of NAND gate 292 is coupled to one input terminal of a negative NOR gate 294. The second input terminal of negative NOR gate 294 is connected for receiving the vertical sync signal (provided by TV sync generator 52 of FIG. 1). As is noted in FIG. 18, the signal supplied at the output terminal of negative NOR gate 294 is the previously-discussed INIT signal and is coupled to the master reset terminal (MR) of FIFO 270 and to the image memory addressing circuits of FIGS. 9 and 10.

In this arrangement, flip-flop 290 remains in the reset state and the Q output of flip-flop 288 remains low during the period of time in which the INSCT signal is high (t₃-t₅ in FIG. 19). Thus, NAND gate 292 supplies a logical high signal to negative NOR gate 294. Since the vertical sync signal supplied by TV sync generator 52 is high except for the brief vertical retrace pulse that is generated at the conclusion of each television frame interval, negative NOR gate 294 maintains the INIT signal at a logical high level during the portion of the horizontal sweep interval that occurs prior to time t₅. Since both flip-flops 288 and 290 are clocked by the PTMCK signal that is provided by the mapping control circuits of FIG. 16, flip-flop 288 causes NAND gate 292 to couple a logical high signal to negative NOR gate 294 in substantial synchronism with the positive transition of the first PTMCK signal (time t₆ in FIG. 19) that follows the time at which the INSCT signal goes low.

This causes negative NOR gate 294 to take the INIT signal low. Since the nextmost positive-going transition of the PTMCK signal causes flip-flop 290 to enter the set state, a logical high signal is coupled to both input terminals of negative NOR gate 294 and the INIT signal returns high (t₇ in FIG. 19). Since the negative-going vertical retrace pulse will cause negative NOR gate 294 to generate a negative-going INIT pulse once during each vertical retrace interval of the television system, proper synchronization between the image memory addressing circuits and the system output logic is ensured each time operating power is supplied to turn the system on.

As was described relative to FIGS. 14 and 15, the ROWSTART signal goes high during each horizontal retrace interval of the television system. As is indicated in the right-hand portion of FIG. 19, if the ROWSTART signal goes high at time t₈, inverter 284 forces flip-flop 286 to the set state, so the next positive-going transition of the DOTCLK will cause flip-flop 280 to take the DATAEND signal low (at time t₉ in FIG. 19). The output control circuits are thus reinitialized and will begin to shift data from FIFO 270 to the system digital-to-analog converter when the ROWSTART signal goes low to indicate the start of the next portion of the system display sector (i.e., the start of the image-bearing portion of the next television line).

Those skilled in the art will recognize that implementation of the mapping strategy employed in this invention is not limited to the previously-described detailed embodiment. For example, FIG. 20 is a block diagram of an alternative embodiment of the invention that utilizes a random access memory arrangement to effect signal processing described relative to output processor 44 of FIG. 1 rather than using the limited access memory (FIFO) of the previously-detailed embodiment. As shall be described in the following paragraphs, the random access memory arrangement of FIG. 20 transfers a row of image information from the system image memory 24 to a first memory unit of a row buffer memory 302 while a row of image information that was transferred to buffer memory 302 during the previous signal processing interval is being mapped from a second memory unit of row buffer 302 to a pixel buffer memory 304 so that each word of stored image information occupies the number of sequentially-addressable pixel buffer storage locations that will provide proper polar perspective when data is sequentially read from pixel buffer 304 at a constant clock rate. In this regard, each word of image information that is stored in row buffer 302 is mapped into a number of consecutive storage locations within pixel buffer 304 that is identically equal to the previously-defined pixel count for that particular word of image information (i.e., the mapping value associated with the corresponding row and column address within system image memory 24). To permit the reading of data in a manner that provides a video signal for producing one line of television display, pixel buffer 304 is organized in a manner similar to row buffer 302 and includes two independently addressable memory units with data that is written into a memory unit of pixel buffer 304 during a signal processing interval (i.e., one sweep interval of the television system) being read from buffer memory 304 during the next signal processing interval while data for the next line of television display is being written into the second pixel buffer memory unit. As is known to those skilled in the art, such an arrangement is often referred to as a "Ping- Pong" memory and, with respect to the present invention, permits a sequence of digital signals that correspond to a line of television display to be coupled from pixel buffer 304 to the system DAC 50 (FIG. 1) at a rate that is established by the system output clock 48 of FIG. 20 and is determined by the horizontal dimension ($\Delta x$) of the system pixel geometry while signal information is being simultaneously loaded into pixel buffer 304 from row buffer 302 to form the nextmost line of television display at a rate that is determined by a mapping clock 314 of FIG. 20. To ensure that all necessary image information is processed, mapping clock 314 operates at a pulse repetition rate which will map a row of stored image information into pixel buffer 304 during a time interval that is equal to or less than the horizontal sweep interval of the associated television system.

To implement the above-discussed buffer memory and mapping operation the embodiment of FIG. 20 includes an address multiplexer 306 that supplies an address signal to an address bus A that is associated with the first row buffer memory unit and supplies a second address signal to an address bus B that is associated with the second row buffer address unit. As is indicated in FIG. 20, address multiplexer 306 is responsive to the least significant bit (LSB) of a digital signal that indicates the line of television display being formed. In this regard, when the LSB of the current television line is at a first logic level (e.g., high), address multiplexer 306 couples an address signal that is supplied to a write input port (WR) thereof to address bus A of row buffer 302 and couples a signal supplied to a read input port (RD) to address bus B of row buffer 302. When the LSB of the television row signal changes states (e.g., goes low) to indicate the beginning of the next signal processing interval, the address signal coupled to the WR input of address multiplexer 306 is coupled to address bus B of row buffer 302 to thereby write the next row of image information into the second row buffer address unit. Simultaneously therewith, the address signal coupled to the RD input port of address multiplexer 306 is coupled to address bus A of row buffer 302 to thereby access image information that was written into the first memory unit of row buffer 302 during the previous signal processing interval (i.e., during the nextmost antecedent sweep interval of the associated television system).

Present realizations of the embodiment depicted in FIG. 20 utilize an image memory control circuit (numeral 35 in FIG. 1) that is similar to the previously discussed arrangement of FIG. 12 in that the image memory write operation has priority over a read operation and two words of stored image information are written into row buffer 302 from image memory 24 during each read cycle. Thus, it can be recognized that the address signal supplied to the WR input port of address multiplexer 306 simultaneously accesses two storage locations within the memory unit of row buffer 304 that is receiving image information from image memory 24 during that particular processing interval. Although various techniques can be employed, the above-mentioned present realizations of the embodiment of FIG. 20 are arranged to, in effect, organize image memory 24, row buffer 302 and pixel buffer 304 into left-half plane and right-half plane memory segments wherein the signal supplied to the WR input port of address multiplexer 306 and the other address signals discussed herein consist of a pair of address signals that result in the storing or accessing of corresponding right-half plane and left-half plane image information. In this regard, the arrangement depicted in FIG. 20 includes a transfer counter 308, which supplies the WR input port of address multiplexer 306 with an address signal that corresponds to two surveillance system scanning paths (16 in FIGS. 1 through 4) that are equally disposed about the $\theta = 0$ axis of the polar coordinate system. (See, e.g., FIG. 2). That is, in a surveillance system having n scanning paths wherein n is an even integer and the column addresses of each row of image information that is stored in image memory 24 corresponds to the sequence (0, (n−1)), transfer counter 308 of FIG. 20 supplies a sequence of address signals (0, 1, . . . , (n/2−1) with each such signal simultaneously accessing the image information associated with a pair of memory addresses (n/2−i); (n/2+i−1) (i ranging between 1 and n/2) and addressing two corresponding storage locations within row buffer 302.

To provide a sequence of addresses of the above-discussed type, transfer counter 308 is reset by the horizontal sync signal (supplied by TV sync generator 52 of FIG. 1) to initialize the count or address provided by transfer counter 308 at a decimal equivalent value of (n/2−1). In the depicted arrangement transfer counter 308 is clocked downwardly by a signal denoted as the READ cycle signal which includes a single signal pulse during each image memory read cycle (e.g., a signal such as the READ or READY signals generated by the image memory control circuit of FIG. 12). When the n/2 image memory read cycles required to process a complete row of stored image information are complete, transfer counter 308 reaches a count of zero to couple a terminal count signal (TC), i.e., a "borrow signal", to an enable terminal (EN) of the transfer counter in a manner which disables transfer counter 308 until the occurrence of the nextmost horizontal sync pulse, which reinitializes transfer counter 308 for operation during the next signal processing interval, i.e., returns transfer counter 308 to a count of n/2−1 in preparation for transfer of the next row of image information from image memory 24 to row buffer 302.

Turning now to the manner in which image information is read from row buffer memory 302 (i.e., transferred to pixel buffer 304) so as to implement the mapping strategy of this invention, the arrangement of FIG. 20 includes a pixel counter 312 that operates in substantially the same manner as pixel counter 218 of the previously-described detailed embodiment. In this regard, an initialization signal (hereinafter referred to as the START signal) causes an initial pixel count that corresponds to the number of pixels to be occupied by the (n/2−1)th and the (n/2)th elements of the row of image information being transferred to pixel buffer 304 to be loaded into pixel counter 312 from the system initial value ROM 62 (FIG. 1) in the previously-discussed manner (via selector 64 of FIG. 1). To maximize the time available for the mapping of image information into pixel buffer 304, the START signal is generated at the conclusion of each signal processing interval that produces signal information for a single line of the television display. For example, a satisfactory START signal can be provided by a type D flip-flop (not shown in FIG. 20) that has the data input terminal (D) connected for receiving the horizontal sync signal provided by television sync generator 52 (FIG. 1) and the clock terminal thereof connected for receiving a relatively high frequency clock signal such as that supplied by the hereinafter-described mapping clock 314 of FIG. 20 or the system output clock 48.

Regardless of the exact structural arrangement utilized, the START signal is also coupled to the reset terminal of an input counter 316, which generates the read address signal that is coupled to row buffer 302 by address multiplexer 306 and to the reset terminal of an output counter 318, which supplies a write address to pixel buffer 304 via a second address multiplexer 320. In the particular arrangement being described wherein the two words of image information that are associated with the left-half plane and right-half plane scanning paths that exhibit the same angular coordinate value in the original polar coordinate system are stored at a pair of image memory storage locations having a common or single address (i.e., the image information associated with scanning paths $(n/2-i)$ and $(n/2+i-1)$ for $i=1, 2, \ldots, n/2$ are stored at column n, addresses of $i-1$, input counter 316 is initialized at a count of $(n/2-1)$ and output counter 318 is initialized at a count of one less than half the number of storage locations utilized in pixel buffer 304 to represent a line of television display. For example, in one realization of the embodiment being described, output clock 48 operates at a pulse repetition rate that subdivides the image-producing portion of each television horizontal sweep interval into 640 pixels and pixel buffer 304 utilizes a 1 K memory unit to store a single line of television display. Thus, counter 318 of such a realization is initialized at a count of 511 and counts downwardly with each clock pulse that is supplied by mapping clock 314.

Regardless of the exact arrangement employed, the signal provided by output counter 318 is coupled directly to a first input port of address multiplexer 320 (denoted as the write (WR) input port in FIG. 20). As is symbolically indicated by the single inverter 324 of FIG. 20, the 1's complement of the signal supplied by output counter 318 is also coupled to the WR input port of address multiplexer 320. Since the address supplied by output counter 320 is given in general terms by the expression $s/2-j$; $j=1, 2, \ldots p/2$, where s denotes the number of storage locations used to store a row of television display and p represents the number of pixels in each line of television display, it can be recognized that the signal provided to the WR port of address multiplexer 320 is a pair of address signals $(s/2-j)$, $(s/2+j-1)$ which sequentially accesses pairs of memory locations within one of the memory units of pixel buffer 304 with simultaneously accessed memory units being symmetrically displaced from the center of the TV display.

In view of the above-discussed arrangement of FIG. 20, it can be seen that each clock pulse supplied by mapping clock 314 clocks pixel counter 312, input counter 316 and output counter 318. Since, however, the terminal count signal of pixel counter 312 (i.e., the pixel counter carry or borrow signal) is utilized to enable input counter 316, input counter 316 will continue to supply a particular address signal to the memory unit of row buffer 302 that is supplying image information to pixel buffer 304 and thus access the same two words of image information until a number of clock pulses identically equal to the pixel count for that address has been supplied to pixel counter 312 by mapping clock 314. When pixel counter 312 has reached its terminal count, the next clock pulse supplied by mapping clock 314 loads the pixel count for the next pair of words of image information into pixel counter 312 from mapping ROM 60 (FIG. 1) and advances the address signal provided by input counter 316 to row buffer 302 (via address multiplexer 306) to thereby select the next pair of words of image information.

To cause each word of image information within the pair of words of image information that is selected by input counter 316 to be coupled into a number of consecutive storage locations within pixel buffer 304 that is equal to the pixel count associated with that particular memory address while simultaneously providing the previously-discussed "skip" operation, the arrangement of FIG. 20 includes a negative NAND gate 326 and an AND gate 328. As is shown in FIG. 20, the output terminal of negative NAND gate 326 is commonly connected to the enable (EN) terminal of output counter 318 and to one input terminal of AND gate 328, with the second input terminal of AND gate 328 being connected for receiving the clock signal provided by mapping clock 314 and the output terminal thereof being connected to the write enable terminal (WE) of pixel buffer 304. One input terminal of negative NAND gate 326 is connected for receiving the terminal count signal (e.g., borrow signal) that is provided by input counter 316 when a complete row of image information has been read from row buffer 302 to form a sequence of digital words which represents a line of television display. The second input terminal of negative NAND gate 326 is connected for receiving the SKIP signal that is supplied by the system decoder (68 in FIG. 1 and 68-1 in FIG. 16). In the depicted arrangement, the SKIP signal is high (e.g., equal to a logical 1) when the pair of words of image information accessed by input counter 316 is to be eliminated from the television display and the pixel count that is coupled to pixel counter 312 is equal to 1 for all such words of image information.

In operation, the signal supplied to negative NAND gate 326 by input counter 316 remains low unless the entire row of image information has been processed. Thus, unless a SKIP signal is provided to the second input terminal of negative NAND gate 326, output counter 318 is enabled and AND gate 328 permits the clock signals provided by mapping clock 314 to be coupled to the write enable (WE) terminal of pixel buffer 304. This means that each clock pulse supplied by mapping clock 314 causes the count held by pixel counter 312 to change by 1 and causes the two words of image information accessed in row buffer 302 (by input counter 316) to be written into two storage locations of pixel buffer 304 that are selected by output counter 318 so as to be symmetrically disposed about the center of the accessed row of storage locations and hence symmetrically disposed relative to the center of the television display. Thus, each word of image information will be written into pixel buffer 304 a number of times that is identically equal to the pixel count (mapping value) associated with the image memory row and column location (in image memory) 24) that originally held that particular word of image information.

On the other hand, if the two accessed words of image information are to be eliminated from the display, the SKIP signal goes high to disable output counter 318 and AND gate 328. Thus, the write enable (WE) terminal of pixel buffer 304 remains low to prevent the words of image information being skipped from being written into pixel buffer 304. Since output counter 318 is disabled during the skip operation, the address signal supplied by output counter 318 does not advance and the next two words of image information that are to contribute to the display signal are stored at addresses of pixel buffer 304 during the next clock period of mapping clock 314 that does not include a SKIP command. Thus, it can be recognized that the above-discussed portion of FIG. 20 effects the method of this invention wherein each word of stored image information is either skipped or transformed into a specific number of pixels in accordance with a predetermined mapping strategy that restores proper polar perspective when the image information is displayed with a conventional television system (or another type of display system having a Cartesian display format).

In the arrangement of FIG. 20, the initial value ROM 62 (FIG. 1) is not utilized to store information for establishing the boundary edges of the displayed surveillance sector by generating the ROWSTART signal of FIG. 5 in the manner discussed relative to FIG. 14. In this regard, the arrangement of FIG. 20 includes a pair of cascade-connected registers 330 and 332 for respectively storing the addresses of the first word of image information that forms a portion of the system display sector for each of the two lines of television display information that are written into pixel buffer 304. More specifically, in the arrangement of FIG. 20, output counter 318 holds the pixel buffer address of the first word of image information that contributes to the display sector each time the depicted arrangement completes the mapping sequence for a row of stored image information (i.e., each time input counter 316 reaches its terminal count). Thus, by coupling the address signal provided by output counter 318 to the data input terminals (D) of register 330 and by loading register 330 in substantial synchronism with the transition in the terminal count signal of input counter 316, the address of the first pixel that is within the system display sector (referred to herein as the initial pixel address) is stored. Since the associated line of television image is not formed until the next signal processing interval (i.e., the next horizontal sweep interval of the associated television system), it is necessary to hold the initial pixel address in storage until the next signal processing interval begins and data is read from the associated memory unit of pixel buffer 304. In the arrangement of FIG. 20 this is accomplished by transferring the initial pixel address stored in register 330 to register 332 in substantial synchronism with the previously-discussed START signal.

With digital signals representative of a line of television display stored in a memory unit of pixel buffer 304 and the associated initial pixel address stored by registers 330 and 332 in the above-discussed manner, it can be recognized that the digital signal information required for forming a complete line of television display is made available for coupling to the system DAC 50 in the manner discussed relative to the embodiment of FIG. 1 while information for the next line of television display is being loaded into the other memory unit of pixel buffer 304. In the depicted arrangement, the address signals for sequentially accessing the storage locations of pixel buffer 304 during the reading of display information are supplied by a pixel read counter 336 that is reset by the horizontal sync signal provided by television sync generator 52 of FIG. 1. As is also indicated in FIG. 20, pixel read counter 334 is clocked by output clock 48 so that the initial address signal (e.g., the address having a decimal equivalent of zero) is supplied to the pixel buffer memory unit being read (via address multiplexer 320) at a time that corresponds to the first pixel of the line of television display being generated. Such synchronization can be effected, for example, by initializing the count of output counter 318 so that a number of output clock periods that is equal to the time that elapses between the horizontal sync signal (i.e., time of pixel read counter reset) and the initial pixel of the television display line must occur for output counter 318 to attain its previously-discussed initial value. Use of such a technique is described, for example, with respect to row counter 100 of FIG. 7 and read column counter 124 of FIG. 10.

With pixel read counter 334 thus initialized, the clock pulses supplied by output clock 48 at a rate that corresponds to the horizontal dimension ($\Delta x$) of the system pixel geometry advances the pixel buffer read address signal by 1 to thereby sequentially access storage locations within the pixel buffer memory unit that is being read to supply a line of television display. In this regard, the arrangement of FIG. 20 includes a digital comparator circuit 336 which compares the address signal supplied by pixel read counter 334 with the initial pixel address that is stored in register 332. As is indicated in FIG. 20, comparator 336 controls a data selector or two-to-one multiplexer 338 which is interposed between pixel buffer memory 304 and DAC 50. In operation, comparator 336 causes multiplexer 338 to suppy a digital signal representative of the desired display background shade (e.g., black) to DAC 50 as long as the signal supplied by register 332 is greater than the address supplied by pixel read counter 334. Thus, comparator 336 in effect enables multiplexer 338 so that image information that was stored in pixel buffer 304 during the previous signal processing interval is coupled to DAC 50 with each subsequent clock pulse of the signal supplied by output clock 48. If desired or necessary, comparator 336 can be augmented with additional circuitry to cause selector 338 to supply signals representative of the display background shade when the final word of image information that contributes to that particular display line is read from pixel buffer 304.

It will be recognized by those skilled in the art that the embodiments of the invention disclosed and described herein are exemplary in nature and that various changes and modifications can be made without departing from the scope and spirit of the invention.

The embodiments of the invention in which an exclusive property or privilege is claimed are defined as follows:

1. A digital scan converter for use with a scanning system which supplies a sequence of n return signals having a one-to-one correspondence with n radially extending scanning paths that are angularly spaced apart from one another about the azimuthal axis of a polar coordinate system to define a sectorial surveillance region, each of said return signals representing signal reflection occurring along said corresponding scanning path, said digital scan converter for supplying output signal information representative of at least a portion of said sectorial surveillance region relative to a Cartesian coordinate system wherein the first axis thereof is substantially parallel to said azimuthal axis of said polar coordinate system and the second axis of said Cartesian coordinate system is perpendicular to the first axis thereof, said digital scan converter comprising:

signal sampling means connected for receiving said sequence of n return signals, said signal sampling means including means for sampling each of said return signals at a rate proportional to the cosine of the angle between said corresponding scanning path and said azimuthal axis of said polar coordinate system to supply n ordered sets of signal values, the successive signal values of each said ordered set of signal values representing signal reflection occurring from incremental regions of said surveillance region that are located along said corresponding scanning path at equally spaced apart positions relative to said first axis of said Cartesian coordinate system;

memory means connected for receiving and storing said n ordered sets of signal values, said memory means being addressable for accessing those ones of said signal values that are associated incremental regions of said surveillance region that lie along m equally spaced apart traces that are substantially parallel to said second axis of said Cartesian coordinate system to form m ordered sets of signal values in which successive signal values of each ordered set are associated with the successive scanning paths of said surveillance system;

output processor means for sequentially receiving a first sequence of signal values that is formed from an associated one of said m ordered sets of signal values, and for supplying a second sequence of digital signals that represents signal reflection occurring at substantially equally spaced apart locations along that one of said m traces that is associated with the sequence being receiving by said output processor means; and mapping means for controlling said output processor means, said mapping means including addressing means for sequentially accessing the sets of said m ordered sets of signal values, means for sequentially accessing the n signal values within each of said m ordered sets and individually supplying the sequentially accessed n signal values to said output means as said first sequence of signal values, said mapping means further including means for operating said output processor means to establish a predetermined number of consecutive elements within said second sequence of digital signals equal to that one of said n signal values currently being supplied to said output processor means, the predetermined number associated with each of said stored signal values being determined on the basis of the location of the associated one of said m traces and the associated one of said n scanning paths.

2. The digital scan converter of claim 1 wherein said memory means is addressable as an array of storage locations having n columns and m rows with consecutive ones of said n ordered sets of signal values being stored at consecutive ones of said columns of storage locations and wherein said mapping means includes a second memory means for storing mapping command signals representative of said predetermined number of times, each of said n elements within each of said m ordered sets of signal values is utilized as consecutive elements of said second sequence of digital signals, said mapping means further including means for accessing the mapping command associated with each element of said m ordered sets of elements as that element is accessed by said addressing means.

3. The digital scan converter of claim 2 wherein second memory means is addressable as an array of storage locations having n/2 columns and m rows and a set of m mapping command signals that is associated with two of n scanning paths that are equally displaced relative to said azimuthal axis of said polar coordinate system is stored in a corresponding one of said n/2 column addresses of said second memory means.

4. The digital scan converter of claims 2 or 3 wherein each mapping command signal is a two-bit binary word indicating: whether the associated signal value is to form the same number of elements in said second sequence of digital signals as did the nextmost antecedent one of said sequentially accessed elements within the same ordered set of said m ordered sets; whether the associated signal value is to form one less element in said second sequence than said nextmost antecedent element; whether the associated signal value is to form one more element in said second sequence than said nextmost antecedent element; or, whether said associated signal value is to be eliminated from said second sequence; said mapping means further including a third memory means for storing an initial mapping command value for the initial element of each set of said m ordered sets of signal values, means for accessing the initial mapping value for each of said m ordered sets of signal values when the first element of each particular ordered set is utilized to control said output processor means, and means for accumulating each subsequentially accessed mapping command signal of that particular ordered set to provide a signal for controlling said output processor means.

5. A digital scan converter for supplying an analog signal representing signal information that is supplied by a scanning system of the type wherein said scanning system provides a sequence of discrete analog signals that are associated with a plurality of radially extending scanning paths which are angularly spaced apart from one another and referenced to a polar coordinate system, said digital scan converter comprising:

signal sampling means connected for receiving said sequence of analog signals, said signal sampling means including means for digitizing each of said analog signals at a rate that is determined by the pulse repetition rate of an applied first clock signal to supply an ordered set of digitally encoded signals representative of each of said analog signals;

first signal generating means for supplying said first clock signal to said signal sampling means, said first signal generating means including means for supplying said first clock signal at a pulse repetition rate proportional to the cosine of the azimuthal angle of the scanning path associated with the analog signal currently being supplied to said signal sampling means by said scanning system;

image memory means connected for receiving said ordered sets of digitally encoded signals supplied by said signal sampling means, said image memory means for storing values representative of each digitally encoded signal of said sequences of digitally encoded signals, said image memory means being addressable to partition said image memory means as a rectangular array of storage locations having a predetermined number of columns and a predetermined number of rows;

image memory control means operably interconnected with said image memory means for loading values corresponding to successive sets of digitally encoded signals into column locations of said rectangular array of storage locations with values corresponding to each particular ordered set of digitally encoded words being loaded into the successive row locations of a single column of said rectangular array of storage locations, said image memory control means further including means for sequentially accessing said image memory means on a row-by-row basis relative to said rectangular array of storage locations;

digital-to-analog signal conversion means connected for receiving a sequence of digitally encoded signals representative of each of said rows of stored values, said digital-to-analog signal conversion means for supplying said analog output signal representative of said signal information; and logic means for forming said sequence of digitally encoded signals representative of each of said rows of stored values, said logic means including means for sequentially accessing successive row locations of said image memory means and means for utilizing a value stored at each image memory location as a predetermined number of consecutive elements within said sequence of digitally encoded words representative of each of said rows of said stored values; said predetermined number for each particular one of said stored values being dependent on the image memory means row and column location associated with that particular one of said stored values.

6. The digital scan converter of claim 5 wherein said logic means includes:

mapping memory means for storing ordered sets of mapping values representative of the predetermined number of consecutive elements within said signal representative of each of said rows of stored values that is occupied by each said stored value, each said ordered set of mapping values including mapping values for at least one corresponding column of storage locations within said image memory means, said mapping memory means being addressable to partition said mapping memory means as a rectangular array of storage locations having a predetermined number of columns and a predetermined number of rows, each said ordered set of mapping values being stored within a column of said storage locations of said mapping memory means with the consecutive row locations within each such column being occupied by mapping values that are associated with the corresponding row locations within said one or more columns of image memory that corresponds with that particular set of mapping values;

means for sequentially addressing the storage locations within each row of said image memory means and for simultaneously accessing the corresponding mapping value within said mapping memory means;

output memory means for storing said sequence of digitally encoded signals representative of each of said rows of stored values, said output memory means including a plurality of consecutively addressable storage locations;

means for coupling the value stored in each sequentially addressed location of said image memory means into a number of consecutive storage locations of said output memory means that is identically equal to the mapping value simultaneously accessed with that particular value; and means for sequentially coupling the sequence of digitally encoded signals stored in said output memory means to said digital-to-analog signal conversion means.

7. The digital scan converter of claim 6 wherein said scanning system supplies a plurality of n discrete analog signals that are associated with n scanning paths which are symmetrically disposed about the axis of said polar coordinate system, said image memory means includes n addressable columns of storage locations and said mapping memory means includes n/2 addressable columns of storage locations with the ordered set of mapping values of each particular column address being associated with two columns of image memory that correspond to scanning paths which are equally disposed about said axis of said polar coordinate system.

8. The scan converter of claims 5, 6 or 7 wherein said analog signal supplied by said system is arranged for controlling a raster scan display unit with each row of said stored values being utilized to form a corresponding line in said raster scan display; said scan converter further comprising timing means for controlling the time at which the sequence of digitally encoded words representative of each row of said stored values is coupled to said digital-to-analog converter means to establish the placement of the display that corresponds to the first digitally encoded word within the sequence of digitally encoded words that corresponds to that particular display line.

9. The scan converter of claims 6 or 7 wherein said output memory means comprises a first-in-first-out memory connected for receiving a digitally encoded signal representative of the value being accessed in said image memory means and connected for supplying stored digitally encoded signals to said digital-to-analog converter means; said means for coupling said value accessed in said image memory to said first-in-first-out memory including clock means for clocking each accessed value into said first-in-first-out memory a number of times identical to the mapping value associated with the storage location of said image memory means which stores that particular accessed value; and said means for sequentially coupling the sequence of digitally encoded signals contained in said first-in-first-out memory includes a second clock means operating at a predetermined pulse repetition rate.

10. The scan converter of claim 9 wherein said analog signal supplied by said system is arranged for controlling a raster scan display unit with each row of said stored values being utilized to form a corresponding line of said raster scan display; said scan converter further comprising timing means for controlling the time at which the sequence of digitally encoded words representative of each row of said stored values is coupled to said digital-to-analog converter means to establish the placement of the display that corresponds to the first digitally encoded word within the sequence of digitally encoded words that corresponds to that particular display line.

11. The scan converter of claim 10 wherein said timing means includes an initial value memory means for storing initial value signals indicative of the time at which each sequence of digital words representative of a row of stored values should be coupled to said digital-to-analog converter means to provide proper display placement relative to said raster scan display unit; means for accessing each said initial value signal as the sequence corresponding to the same row of stored values is being supplied to said digital-to-analog converter means; and means for controlling said second clock means to couple the signals contained in said first-infirst-out memory to said digital-to-analog converter at a time established by said associated initial value.

12. The scan converter of claims 6 or 7 wherein: said output memory means includes a random access memory having first and second independently addressable memory units, each of said memory units including a plurality of consecutively addressable storage locations; said means for coupling said value accessed in said memory means including means for addressing one of said memory units of said random access memory and means for coupling said accessed value into a number of consecutive storage locations of said addressed one of said memory units that is identically equal to the mapping value associated with the storage location of said image memory means which stored that particular value; and said means for sequentially coupling the sequence of digitally encoded signals to said digital-to-analog signal converter means includes means for sequentially accessing the storage locations of that one of said first and second random access memory units that is not being addressed for receiving accessed values and means for supplying the digitally encoded signal stored in said sequentially accessed storage locations to said digital-to-analog converter means at a relatively constant rate.

13. The scan converter of claim 12 wherein said output memory means comprises a first-in-first-out memory connected for receiving a digitally encoded signal representative of the value being accessed in said image memory means and connected for supplying stored digitally encoded signals to said digital-to-analog converter means; said means for coupling said value accessed in said image memory to said first-in-first-out memory including clock means for clocking each accessed value into said first-in-first-out memory a number of times identical to the mapping value associated with the storage location of said image memory means which stores that particular accessed value; and said means for sequentially coupling the sequence of digitally encoded signals contained in said first-in-first-out memory includes a second clock means operating at a predetermined pulse repetition rate.

14. The scan converter of claim 13 wherein said timing means includes means for counting the number of storage locations of each of said first and second random access memory units that contain digitally encoded signals as a memory unit is loaded with accessed values of said image memory means and means for coupling the digitally encoded word stored at the first occupied storage location of each of said first and second random access memory units to digital-to-analog converter means at a time that is established by said count determined when that tone of said first and second memory units was loaded with values accessed from said image memory means.

* * * * *

UNITED STATES PATENT AND TRADEMARK OFFICE
CERTIFICATE OF CORRECTION

PATENT NO. : 4,387,365

DATED : June 7, 1983

INVENTOR(S) : Berry et al.

It is certified that error appears in the above-identified patent and that said Letters Patent is hereby corrected as shown below:

| | | |
|---|---|---|
| Column 2, | line 17: | "bean" should be —beam— |
| Column 4, | line 46: | "fromed" should be —formed— |
| Column 5, | line 22: | "compartor" should be —comparator— |
| Column 7, | line 62: | insert —the— after "of" |
| Column 12, | line 21: | "converts" should be —converters— |
| Column 13, | line 32: | "pule" should be —pulse— |
| Column 14, | line 1: | "therebty" should be —thereby— |
| Column 15, | lines 34 & 35: | "above described" should be —above-described— |
| Column 16, | line 48: | "respective" should be —respectively— |
| Column 17, | line 62: | insert —precise— after "fairly" |
| Column 18, | line 51: | "coorespondence" should be —correspondence— |
| Column 19, | line 20: | "establish" should be —establishes— |
| Column 21, | line 18: | insert —,— after "functions" |
| | line 28: | delete "half" (2nd occurrence) |
| | line 63: | "meory" should be —memory— |
| Column 22, | line 14: | "are" should be —and— (2nd occurrence) |
| | line 63: | "simplication" should be —simplification— |
| Column 27, | line 17: | "abovemention" should be —above-mentioned— |
| Column 30, | line 38: | insert —to— after "relative" |
| Column 31, | line 10: | "now" should be —row— |
| Column 32, | line 17: | "bit" should be —bits— |
| Column 33, | line 6: | "have" should be —has— |
| | line 16: | "sognal" should be —signal— |
| | line 33: | insert —,— after "i.e." |
| Column 35, | line 24: | "INT" should be —INIT— |
| | line 56: | "count-down" should be —countdown— |
| | line 58: | "imput" should be —input— |
| Column 36, | line 11: | "odd-values" should be —odd-valued— |
| | line 46: | "signal" should be —signals— |
| Column 37, | line 32: | "count-down" should be —countdown— |
| | line 42: | "count-down" should be —countdown— |

UNITED STATES PATENT AND TRADEMARK OFFICE
CERTIFICATE OF CORRECTION

Page 2 of 3

PATENT NO. : 4,387,365
DATED : June 7, 1983
INVENTOR(S) : Berry et al.

It is certified that error appears in the above-identified patent and that said Letters Patent is hereby corrected as shown below:

| | |
|---|---|
| Column 38, | line 39: "type D" should be —type-D— (for consistency) |
| | line 68: "terminal" should be —terminals— |
| Column 39, | line 3: "terminal" should be —terminals— |
| Column 42, | line 3: "type D" should be —type-D— (for consistency) |
| Column 45, | line 25: "have" should be —has— |
| Column 46, | line 13: "mapping" should be —mapped— |
| | line 33: "indicate" should be —indicates— |
| Column 48, | line 32: "an" should be —a— |
| | line 37: "it" should be —as— |
| | line 41: delete —of— |
| Column 50, | line 3: "Complement" should be —complement— |
| | line 40: insert —as— before "the" |
| Column 53, | line 30: delete —,— (comma) after "242" |
| Column 54, | line 21: "input ready" should be —INPUT RDY— |
| | line 31: "signal" should be —signals— |
| Column 55, | line 48: "prevent" should be —prevents— |
| Column 57, | line 29: insert —a— before "count" |
| | line 58: "shift-in" should be —SHIFT-IN— |
| Column 59, | lines 56 & 57: "cprresponds" should be —corresponds— |
| Column 61, | line 25: "688" should be —288— |
| | line 59: "iNIT" should be —INIT— |

UNITED STATES PATENT AND TRADEMARK OFFICE
CERTIFICATE OF CORRECTION

Page 3 of 3

PATENT NO. : 4,387,365
DATED : June 7, 1983
INVENTOR(S) : Berry et al.

It is certified that error appears in the above-identified patent and that said Letters Patent is hereby corrected as shown below:

| | |
|---|---|
| Column 63, | line 23: "address" should be —memory— |
| Column 64, | line 14: "simultaneous" should be —simultaneously— |
| | line 63: "type D" should be —type-D— |
| Column 66, | line 57: delete —)— (parenthesis) after "memory" |
| Column 69, | line 29: "receiving" should be —received— |

Signed and Sealed this

Twenty-eighth Day of August 1984

[SEAL]

Attest:

GERALD J. MOSSINGHOFF

Attesting Officer

Commissioner of Patents and Trademarks